United States Patent [19]
Higashiyama et al.

[11] Patent Number: 5,434,720
[45] Date of Patent: * Jul. 18, 1995

[54] MAGNETIC RECORDING AND REPRODUCTION APPARATUS WITH PLURAL HEADS

[75] Inventors: Yasushi Higashiyama, Yokohama; Takanori Furusawa; Akira Maekawa, both of Tokyo, all of Japan

[73] Assignee: Kabushiki Kaisha Toshiba, Kawasaki, Japan

[ * ] Notice: The portion of the term of this patent subsequent to Jan. 4, 2011 has been disclaimed.

[21] Appl. No.: 966,014
[22] Filed: Oct. 23, 1992

Related U.S. Application Data

[63] Continuation-in-part of Ser. No. 525,831, May 18, 1990, Pat. No. 5,276,565.

[30] Foreign Application Priority Data

| | | | |
|---|---|---|---|
| May 23, 1989 | [JP] | Japan | 1-127906 |
| May 23, 1989 | [JP] | Japan | 1-127911 |
| Nov. 8, 1989 | [JP] | Japan | 1-288754 |
| Oct. 25, 1991 | [JP] | Japan | 3-280006 |

[51] Int. Cl.$^6$ .................. G11B 15/14; G11B 5/52
[52] U.S. Cl. .................. 360/64; 360/60; 360/67; 360/108
[58] Field of Search .......... 360/64, 60, 67, 66, 360/27, 10.1-10.3, 35, 77.15, 73.06, 73.11, 108

[56] References Cited

U.S. PATENT DOCUMENTS

| | | | |
|---|---|---|---|
| 3,911,486 | 10/1975 | Hibbard . | |
| 4,614,985 | 9/1986 | Tsuruta | 360/64 |
| 4,851,935 | 7/1989 | Ohyama et al. | 360/64 |
| 4,926,273 | 5/1990 | Tabuchi et al. | 360/108 |
| 5,051,847 | 9/1991 | Philipps | 360/64 |
| 5,159,500 | 10/1992 | Oguro et al. | 360/77.15 |
| 5,276,565 | 1/1994 | Higashiyama et al. | 360/64 |

FOREIGN PATENT DOCUMENTS

| | | | |
|---|---|---|---|
| 3403150 | 10/1975 | Germany . | |
| 3715884 | 11/1987 | Germany . | |
| 3805438 | 8/1989 | Germany . | |
| 61-34753 | 2/1986 | Japan . | |
| 62-165711 | 7/1987 | Japan | 360/60 |
| 64-21701 | 1/1989 | Japan . | |
| 1106301 | 4/1989 | Japan . | |
| 2173341 | 10/1986 | United Kingdom | 360/64 |

OTHER PUBLICATIONS

Patent Abstracts of Japan, vol. 8, No. 194, (E-264) (1631), Sep. 6, 1984, & JP-A-59-084410, T. Inchi, et al., "Rotary Transformer", May 16, 1984.
Patent Abstracts Of Japan, vol. 10, No. 111, (P-451) (2168), Apr. 25, 1986, & JP-A-60-242501, M. Hayashi, et al., "Rotery Head Cylinder", Dec. 2, 1985.
Patent Abstracts of Japan, vol. 13, No. 59, (P-826) (3407), Feb. 10, 1989, & JP-A-63-249902, H. Sekiguchi, et al., "Rotary Head Device", Oct. 17, 1988.
Patent Abstracts of Japan, vol. 7, No. 282, (P-243) (1427), Dec. 16, 1983, & JP-A-58-159203, A. Yoshioka, et al., "Magnetic Video Recording and Reproduction Device", Sep. 21, 1983.
National Convention Record of the Institute of Television Engineers of Japan, vol. 10, No. 41, VR87-5, J. Eguchi et al, Jan. 1987.
"Wide Band RF Playback Circuit for VTR using Pre-amplifier Built-in Head Drum", T. Uehara et al.
Abstract of M in English Language List at Above.

*Primary Examiner*—W. R. Young
*Assistant Examiner*—Varsha A. Kapadia
*Attorney, Agent, or Firm*—Oblon, Spivak, McClelland, Maier & Neustadt

[57] ABSTRACT

A rotary scanning-type magnetic recording and reproduction apparatus comprises a plurality of magnetic heads installed on a rotary drum, and being in contact with a magnetic tape running on the peripheral surface of the rotary drum, for recording the information signal onto the magnetic tape and/or reproducing the information signal from the magnetic tape, a plurality of recording circuits connected to the magnetic heads respectively, for processing the information signal to be recorded on the magnetic tape transferred from outside the rotary drum and output it to the magnetic head, a rotary transformer for transferring the information signal sent from outside the rotary drum to the recording circuits, and a control circuit for sequentially selectively bringing the recording circuits into an active state according to the rotational position of the rotary drum, and bringing the recording circuits into an active state only during a period of time when the information signal is detected.

15 Claims, 50 Drawing Sheets

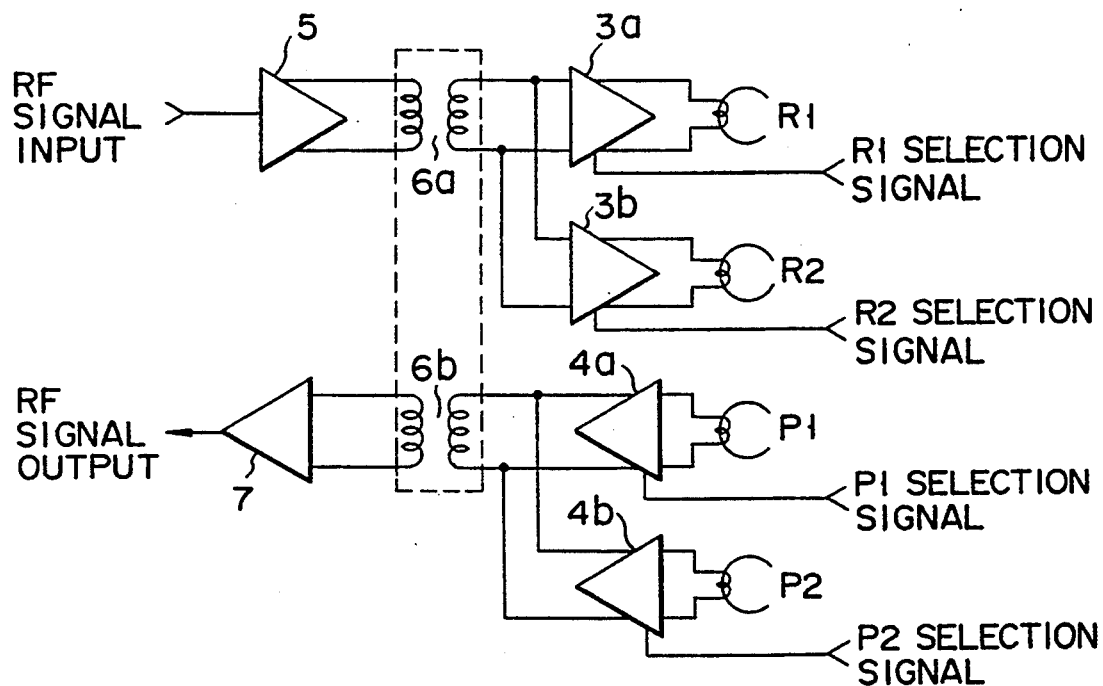
F I G. 3
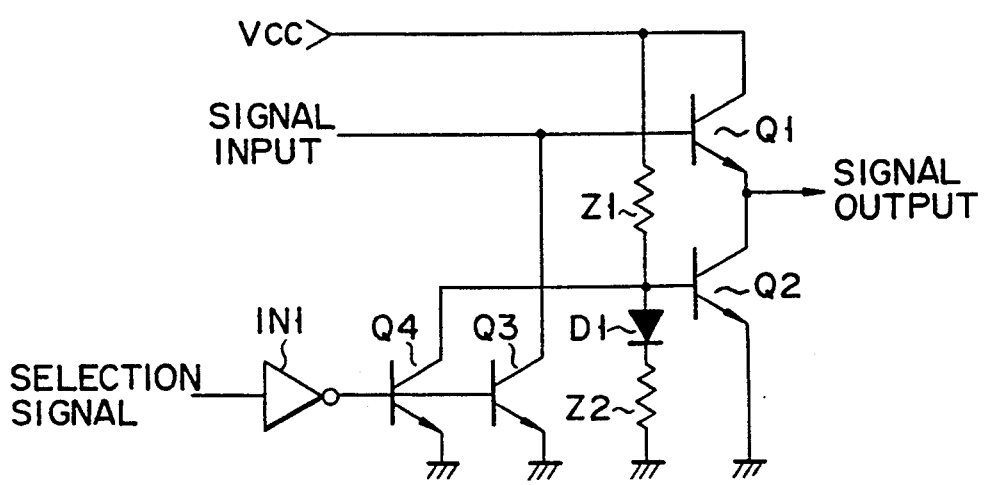
F I G. 5

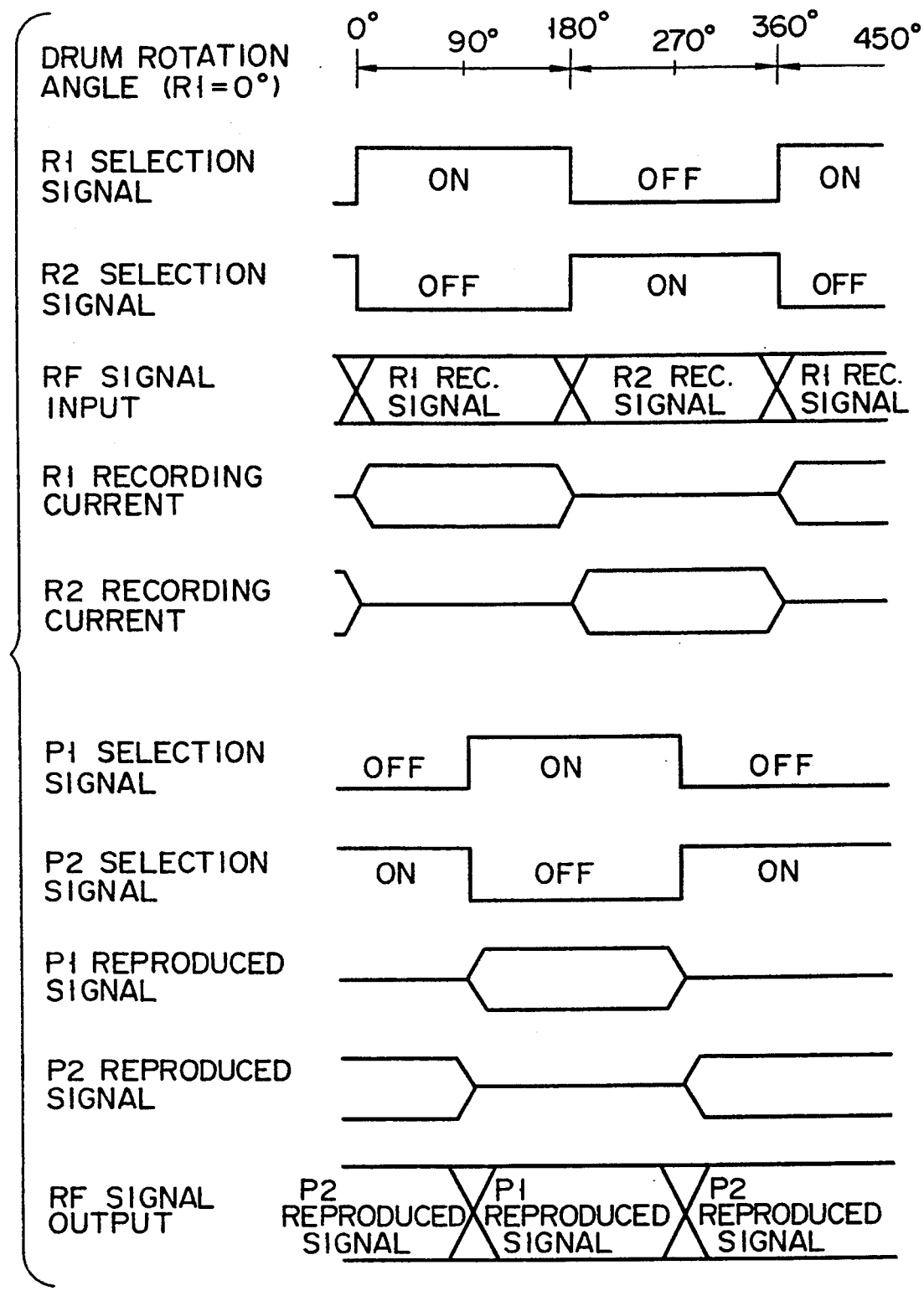
F I G. 4

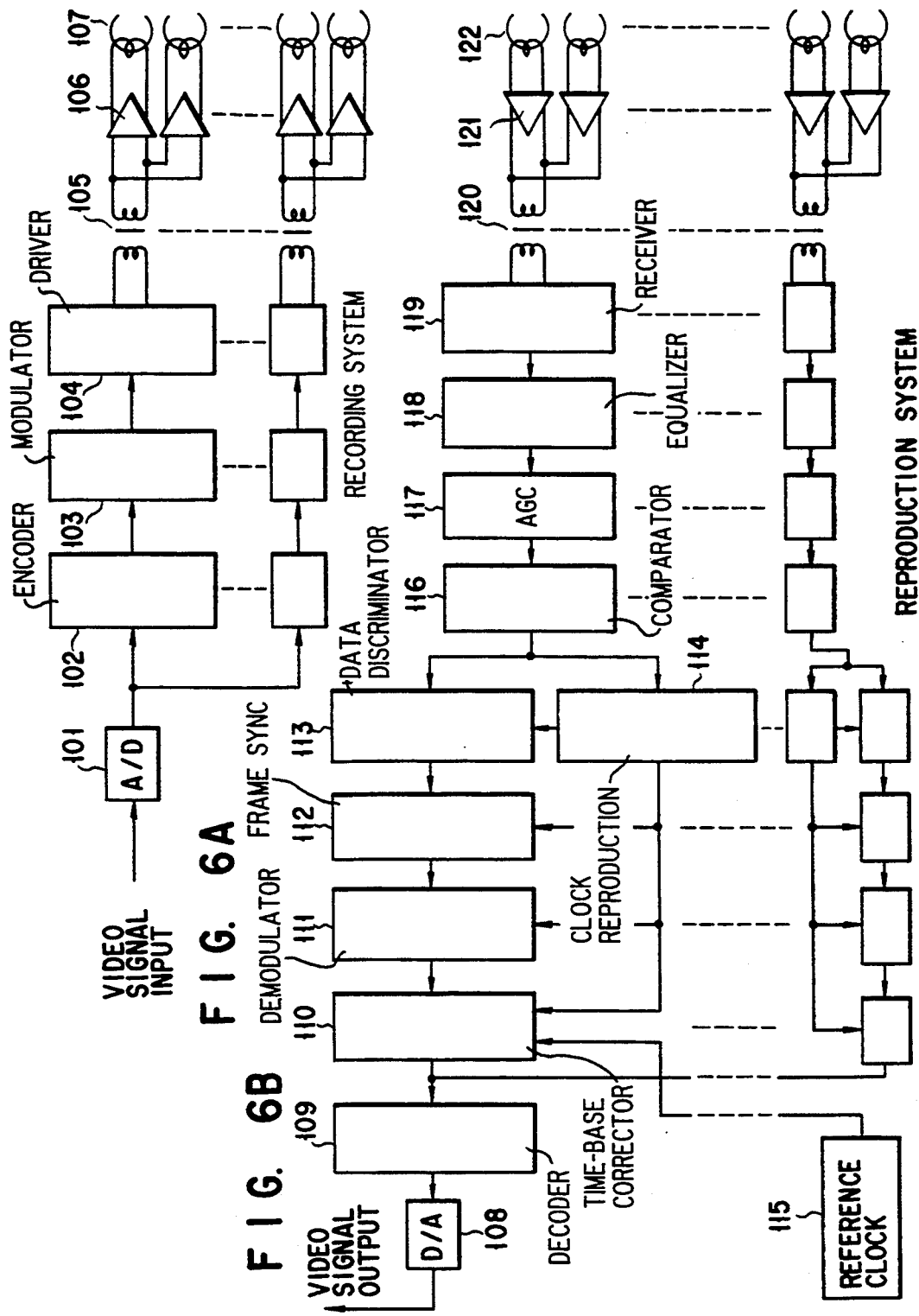

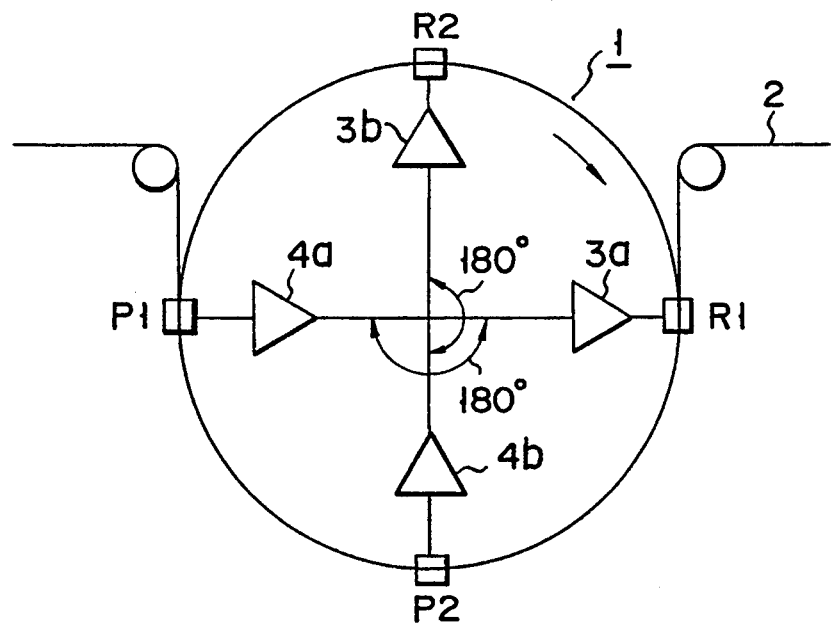
F I G. 8
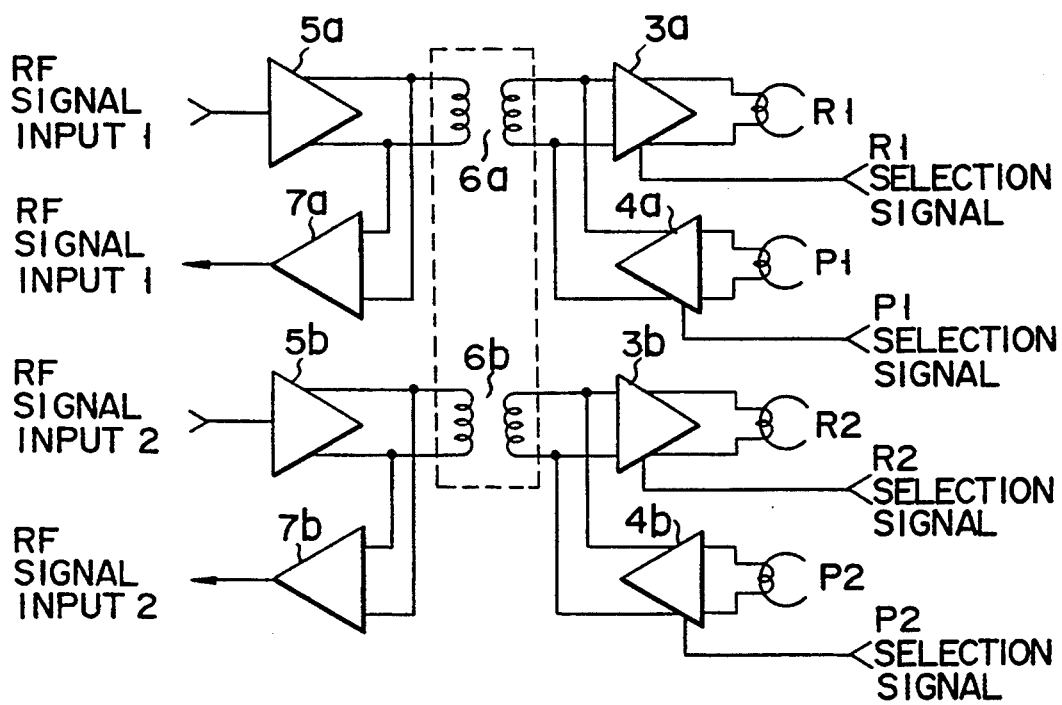
F I G. 9

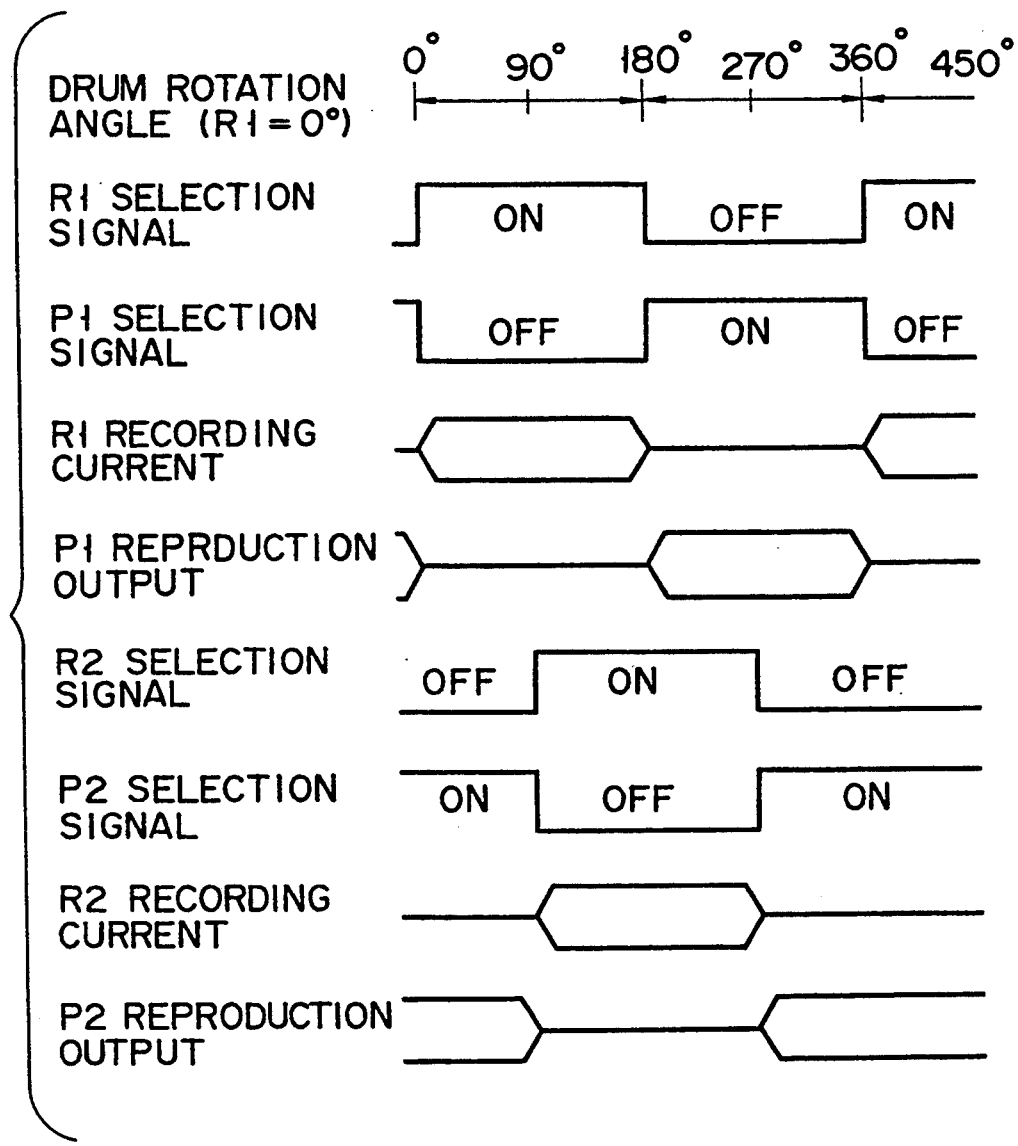
F I G. 10

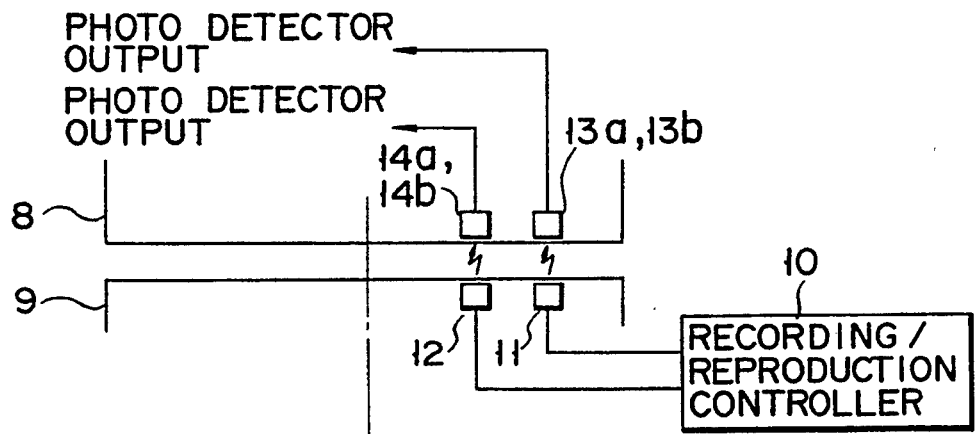
F I G. 11A
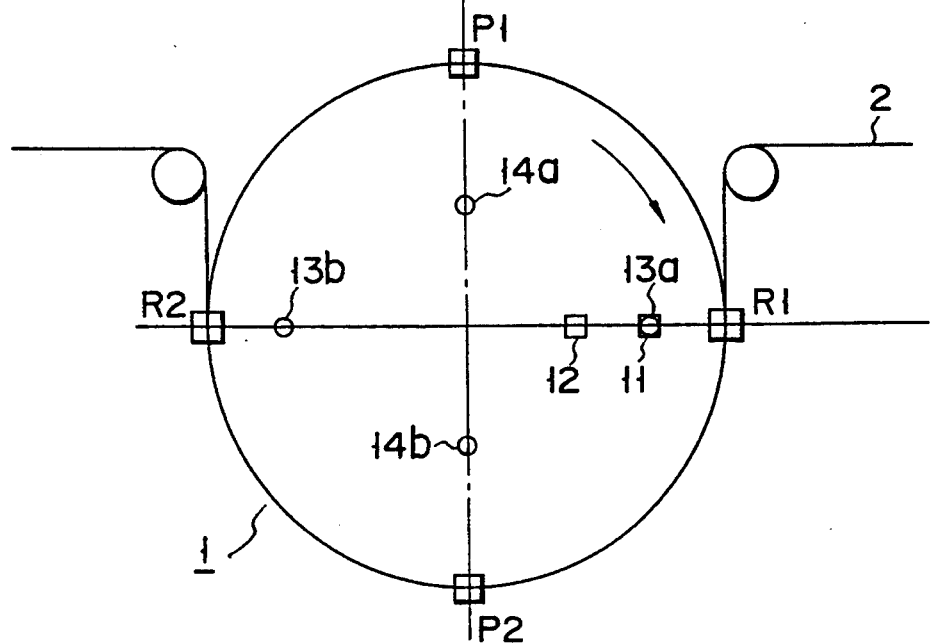
F I G. 11B

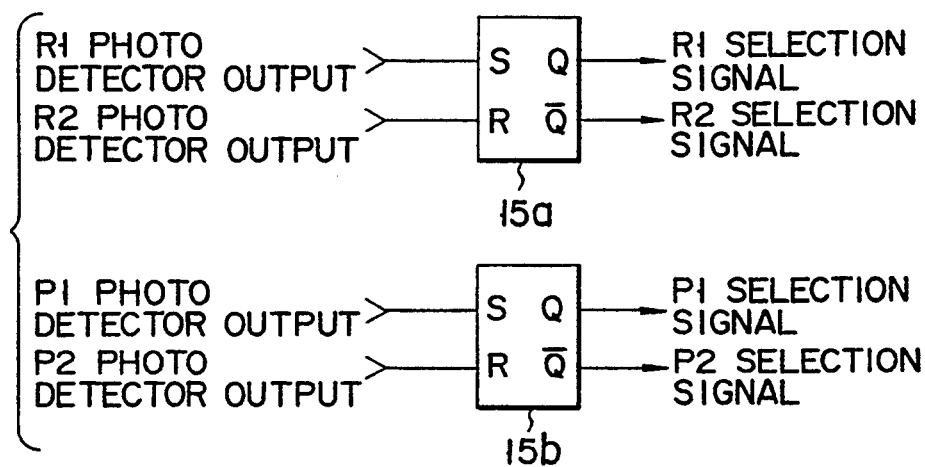
F I G. 12
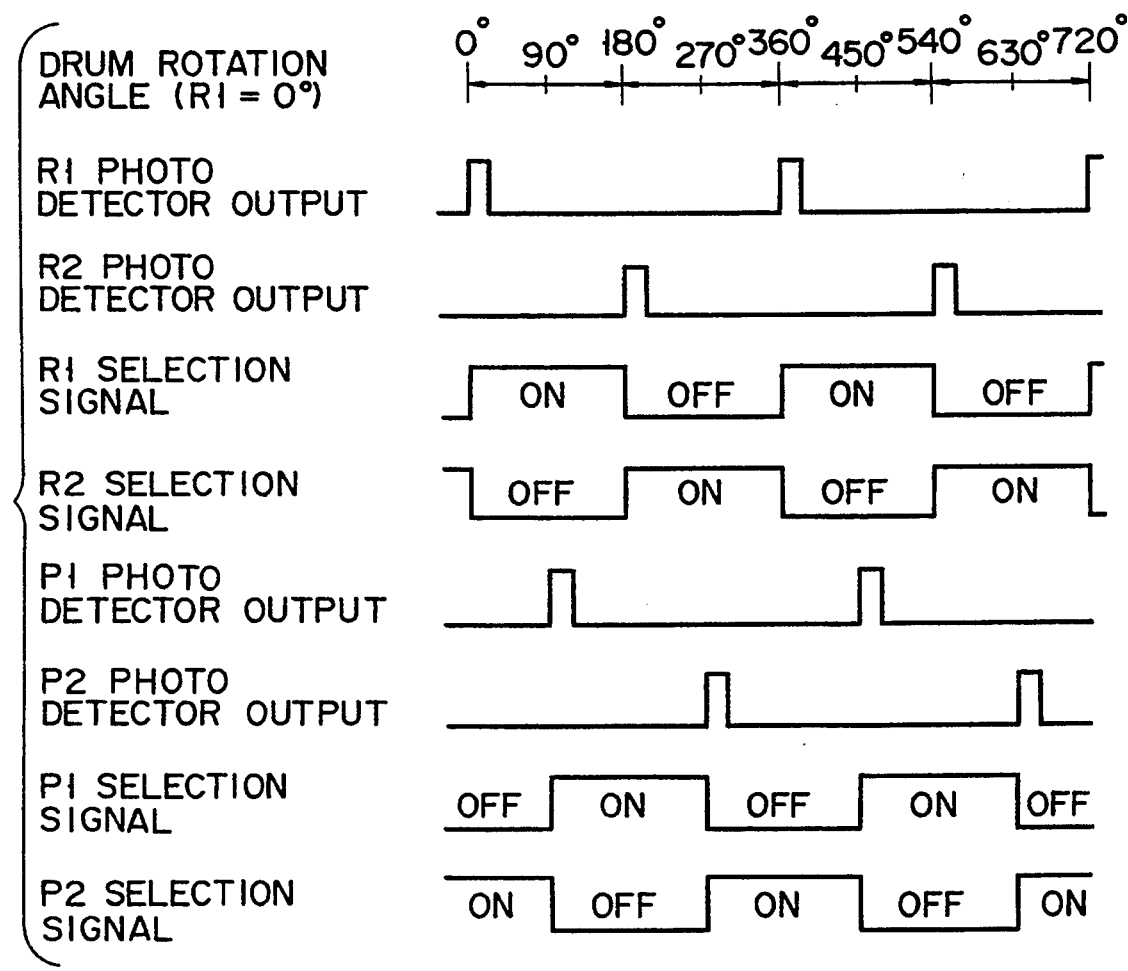
F I G. 13

FIG. 15
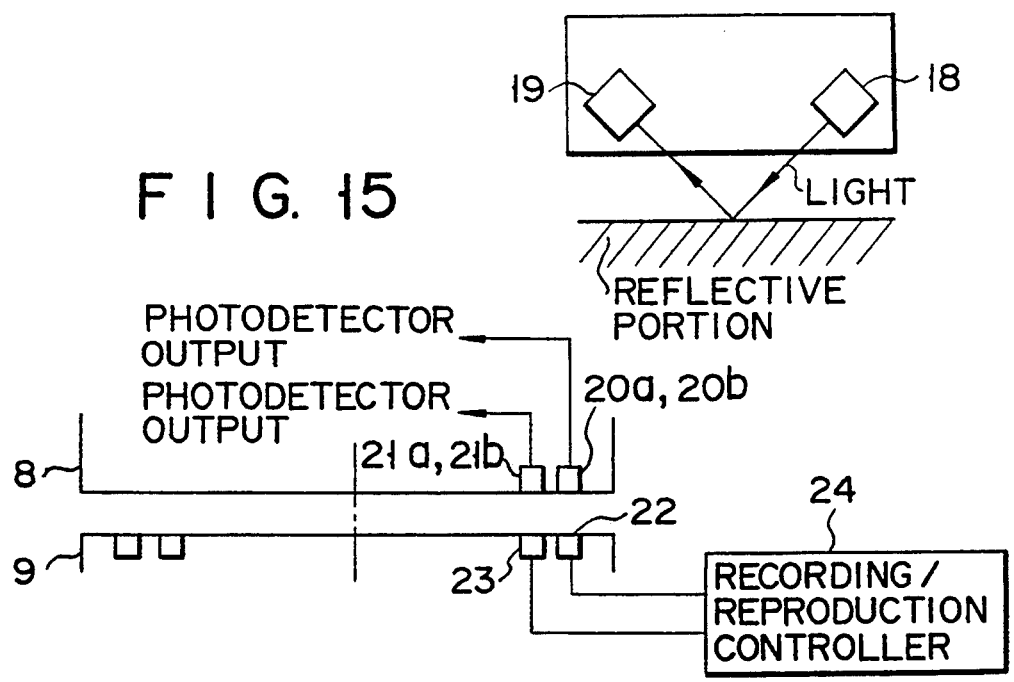
FIG. 16A
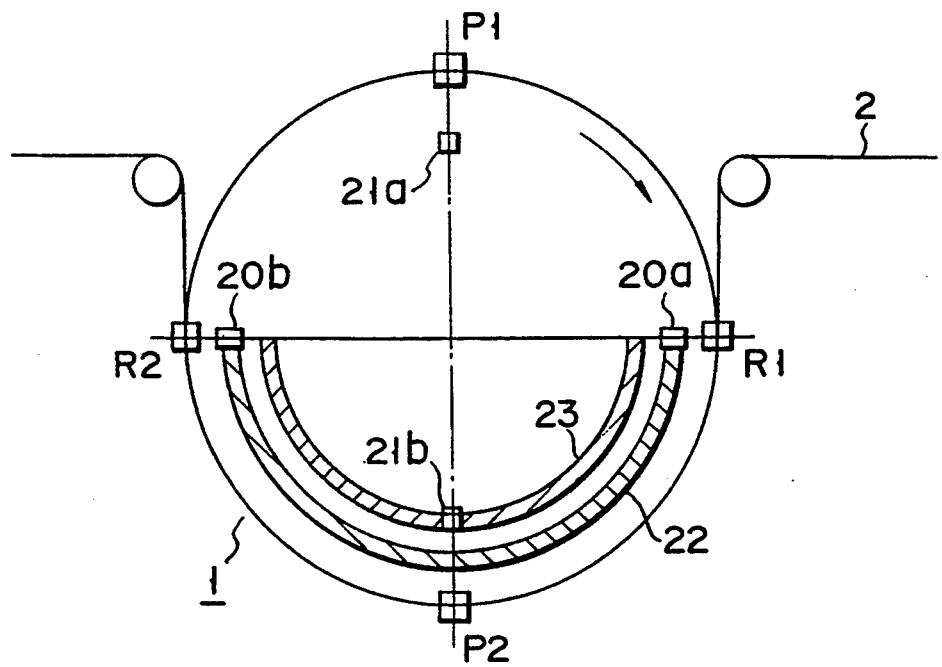
FIG. 16B

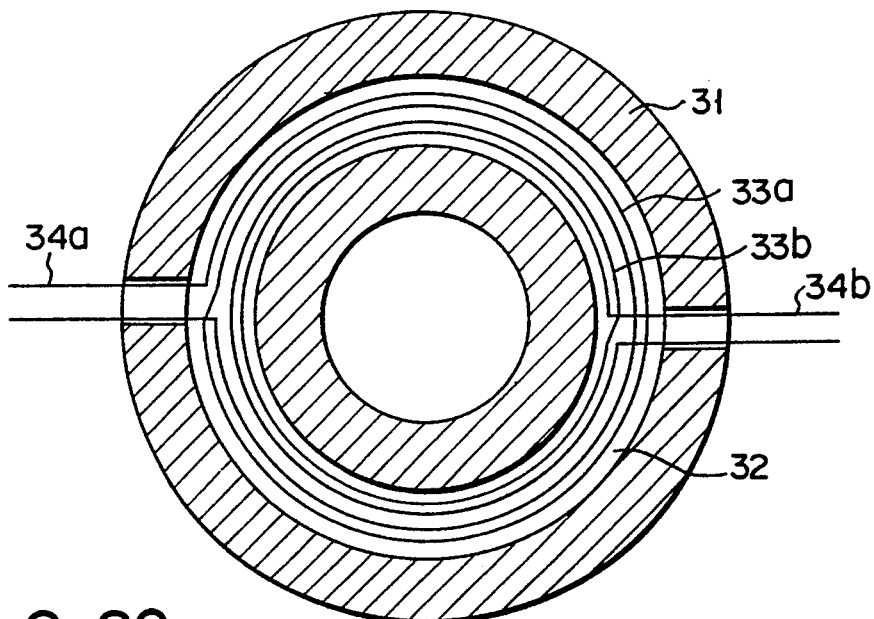
F I G. 20
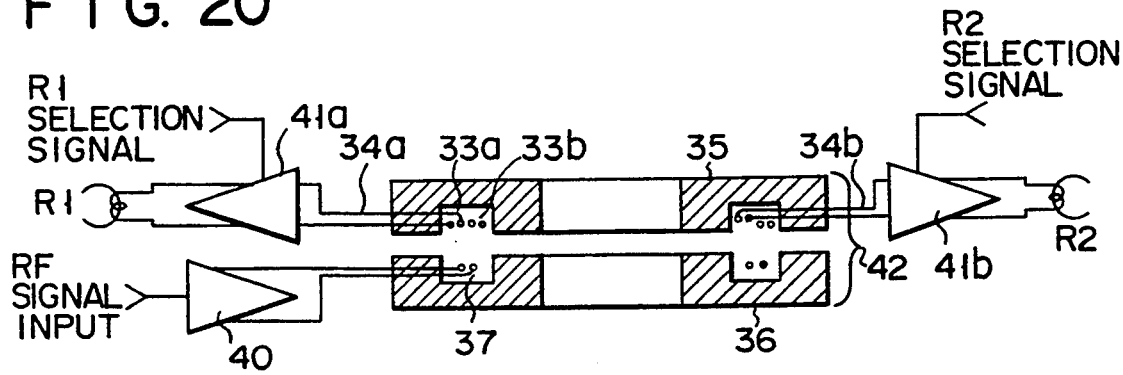
F I G. 21
FIG. 22
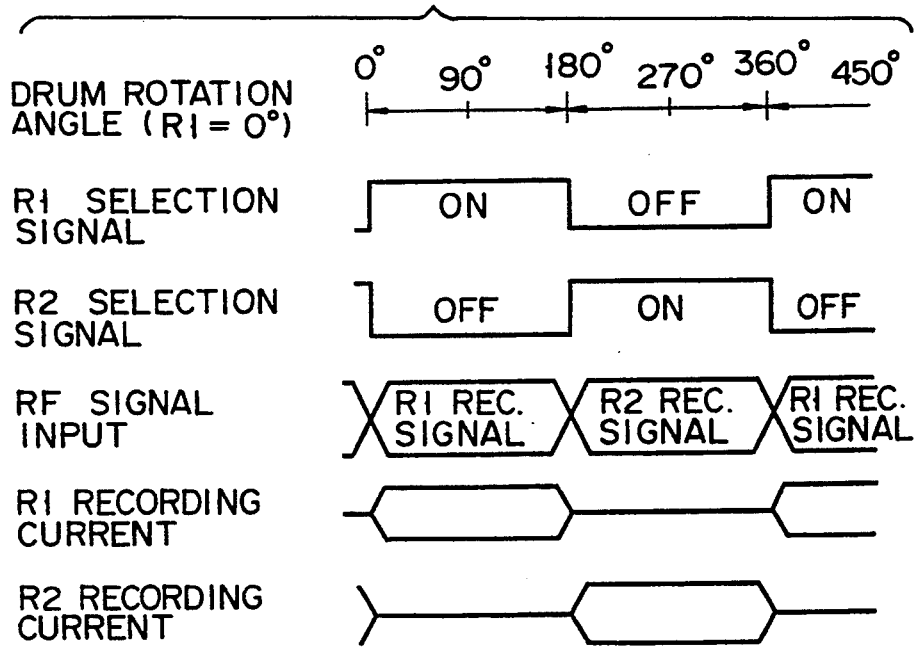

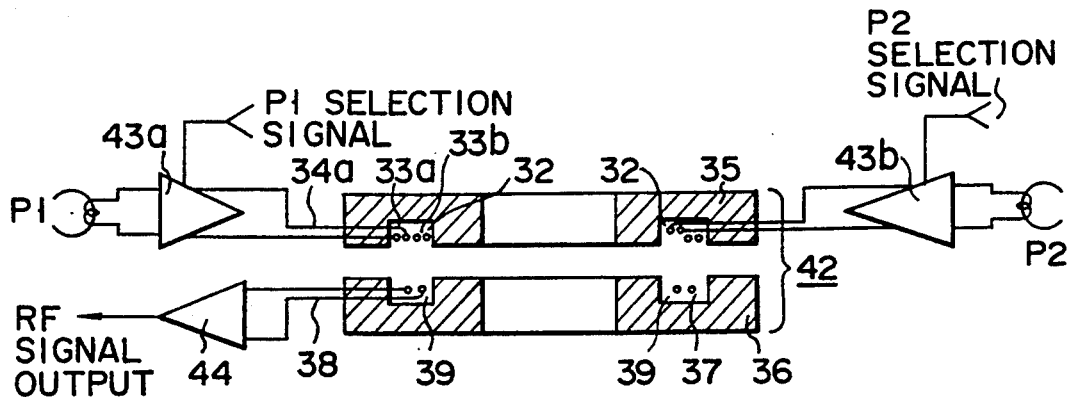
F I G. 23
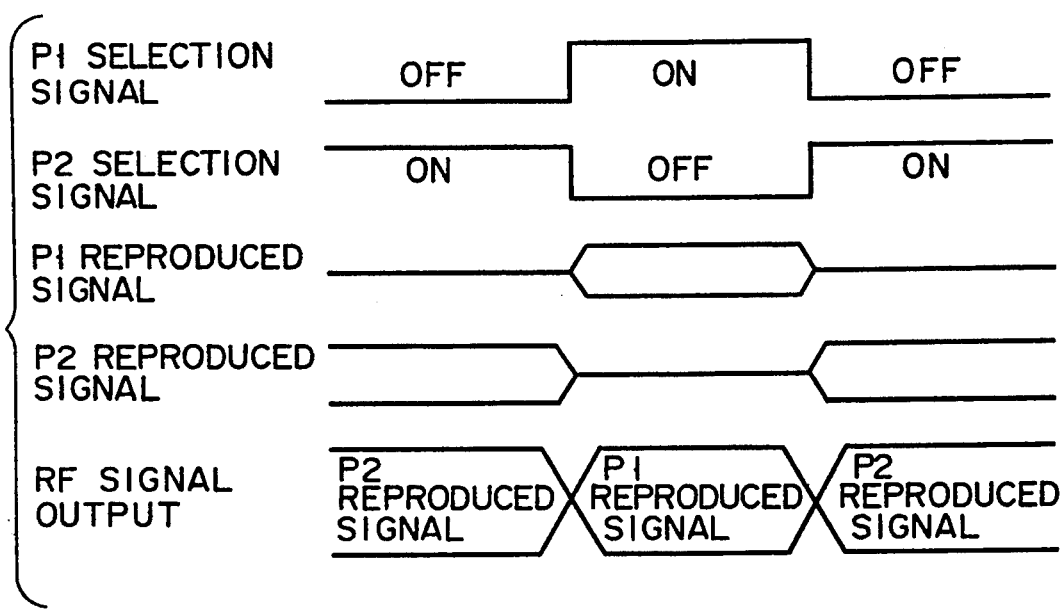
F I G. 24

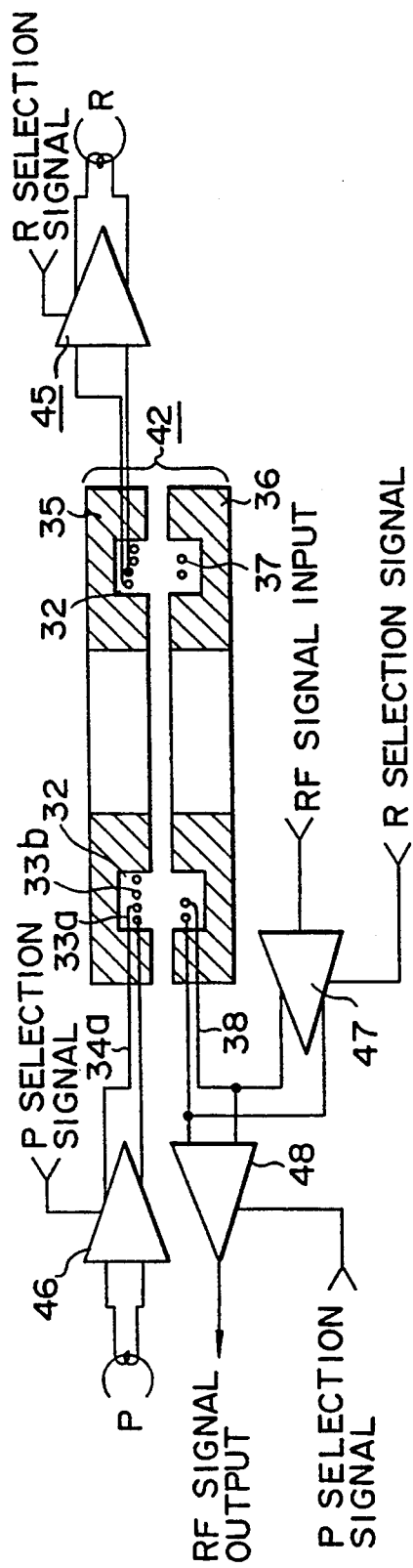
F I G. 25
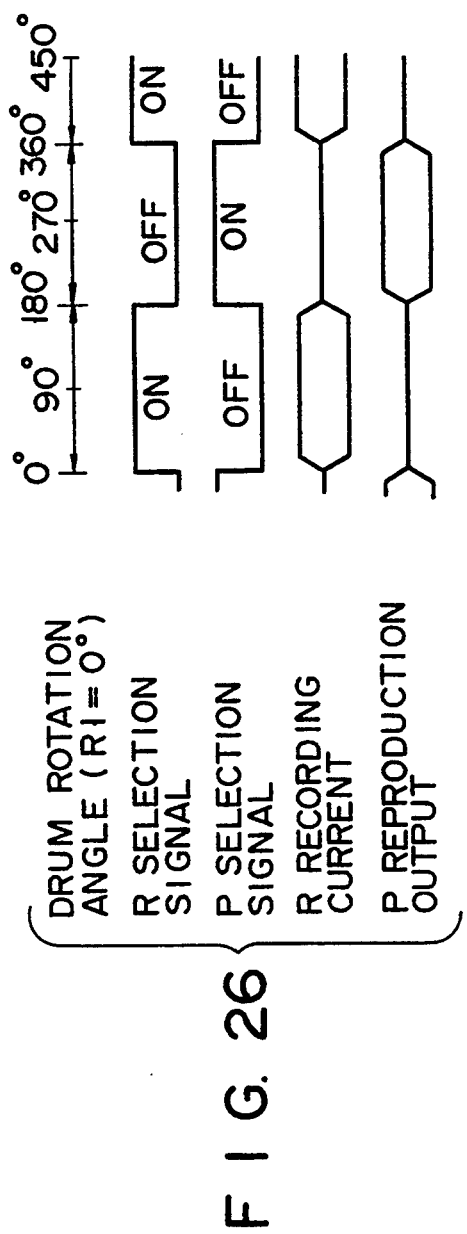
F I G. 26

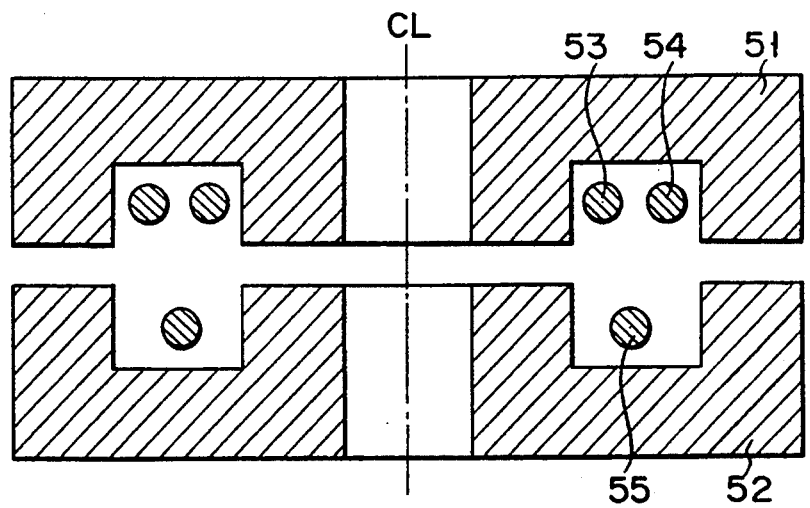
F I G. 27
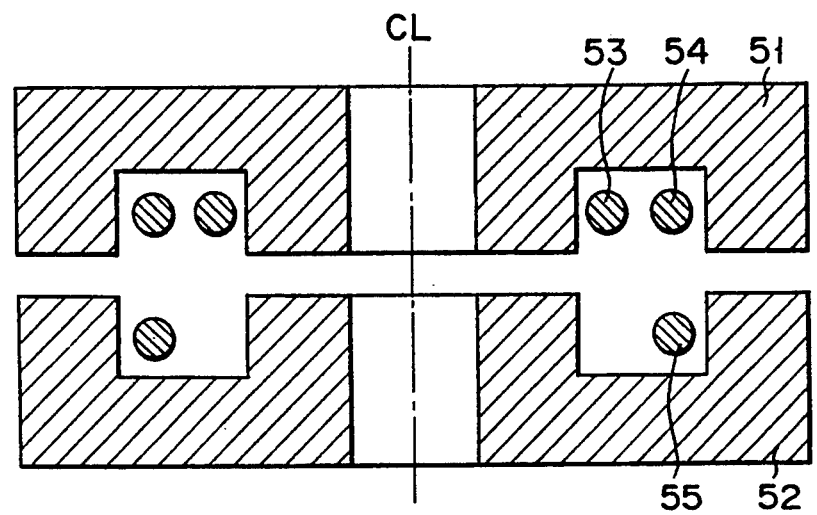
F I G. 28
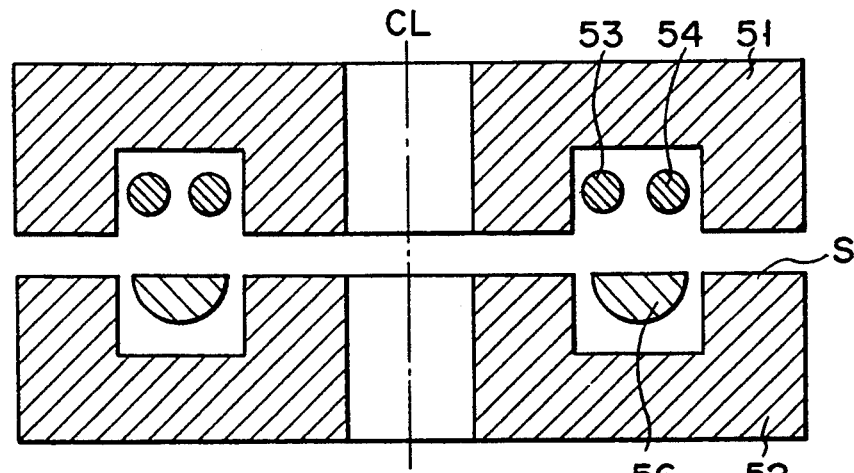
F I G. 29

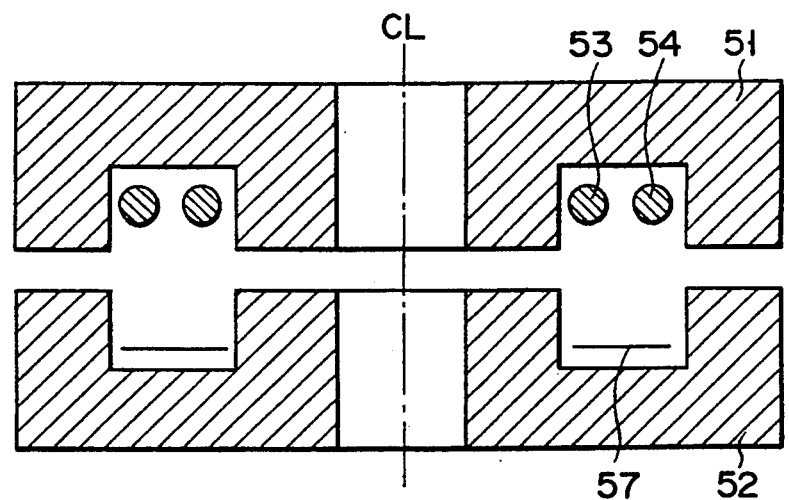
F I G. 30
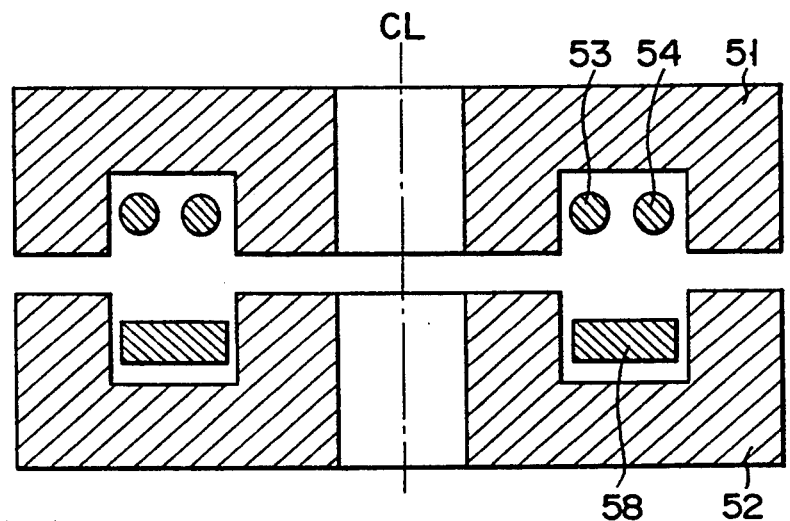
F I G. 31
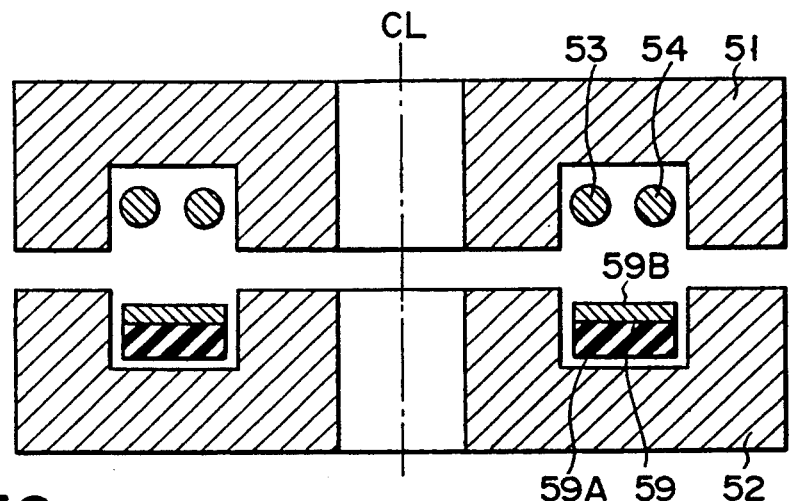
F I G. 32

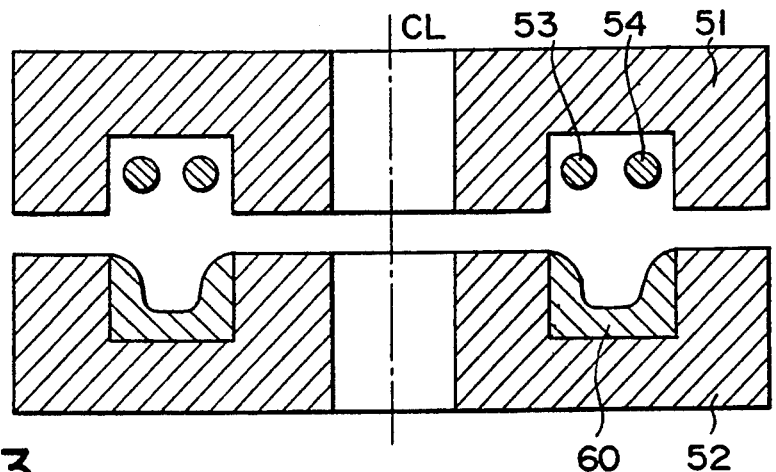
F I G. 33
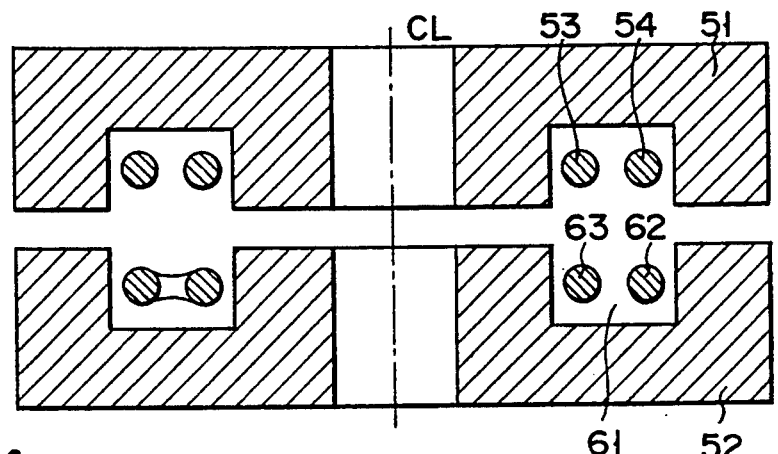
F I G. 34
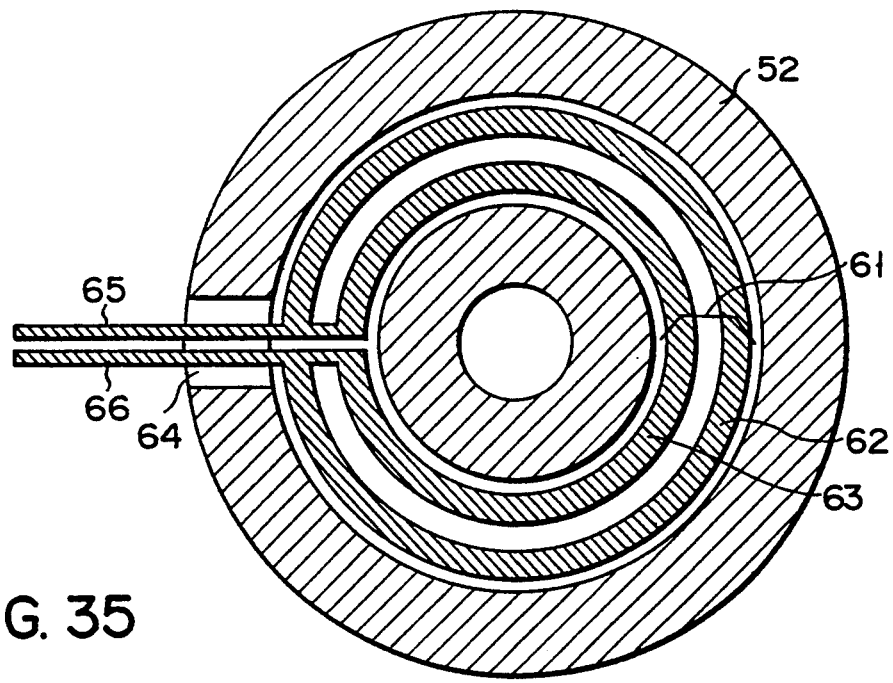
F I G. 35

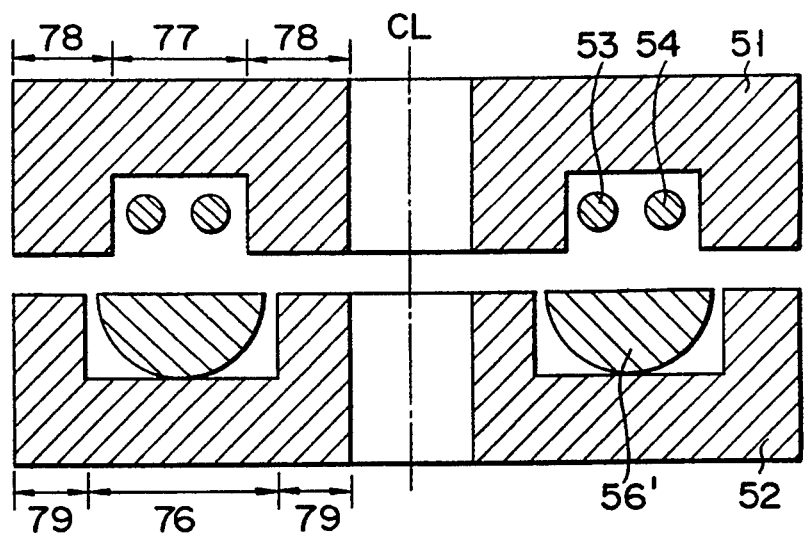
F I G. 36
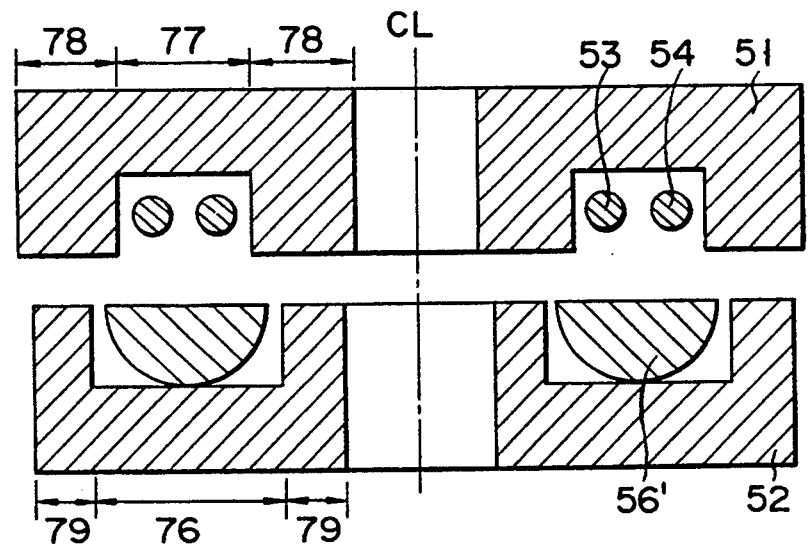
F I G. 37
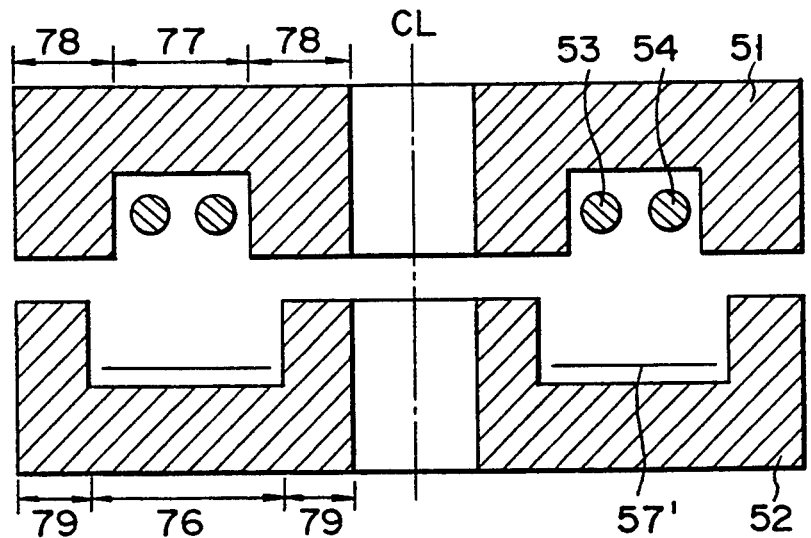
F I G. 38

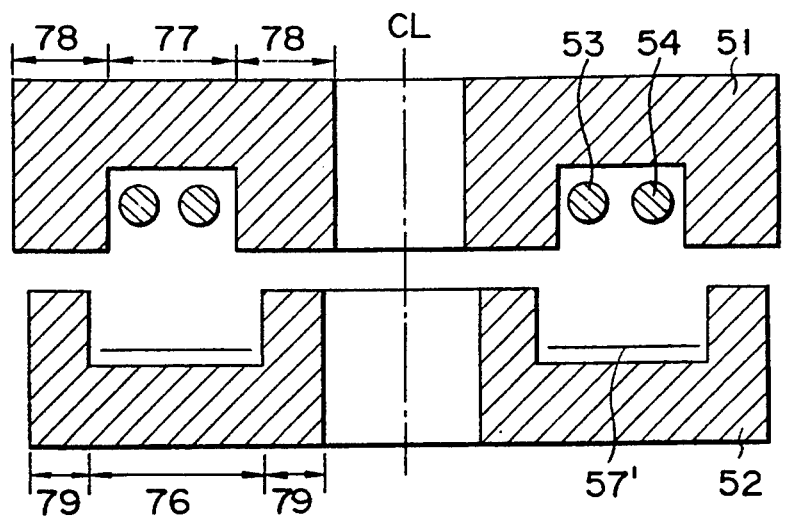
F I G. 39
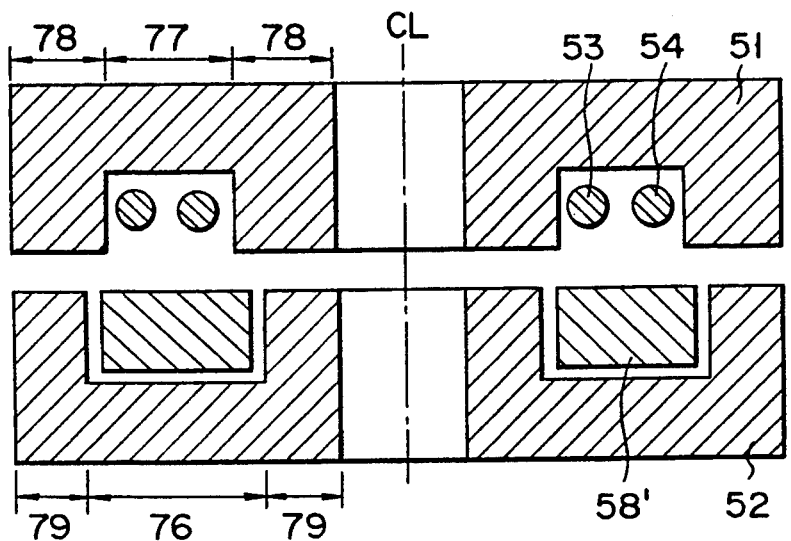
F I G. 40
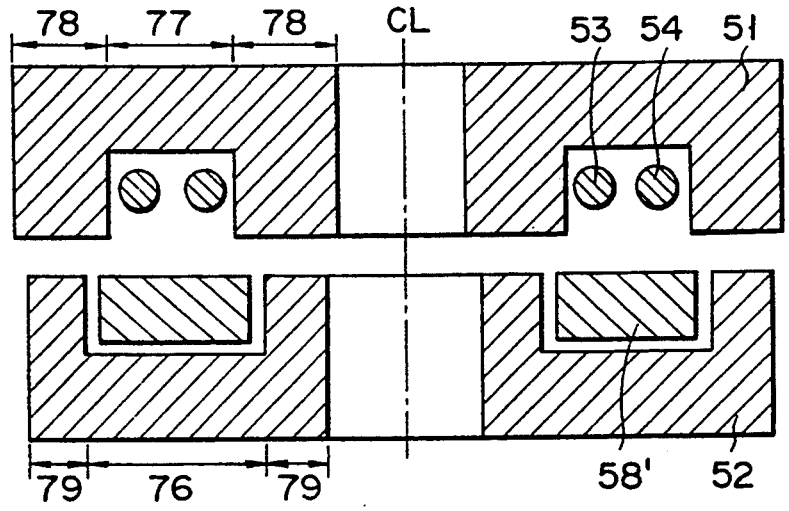
F I G. 41

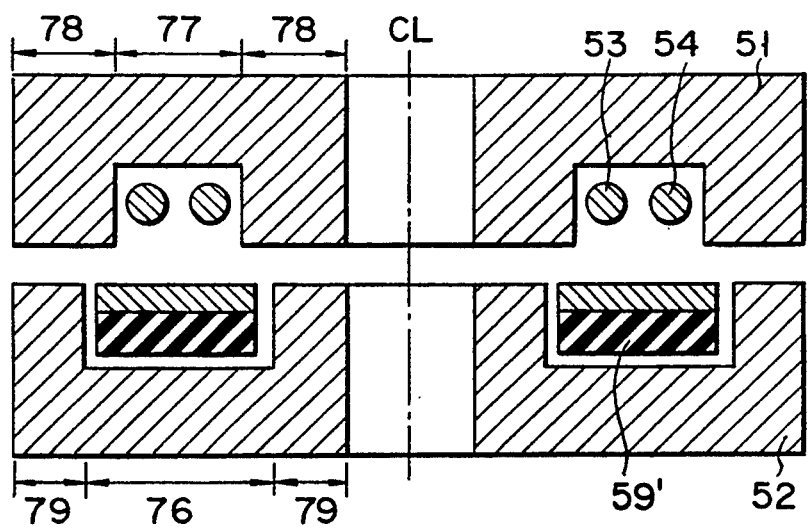
F I G. 42
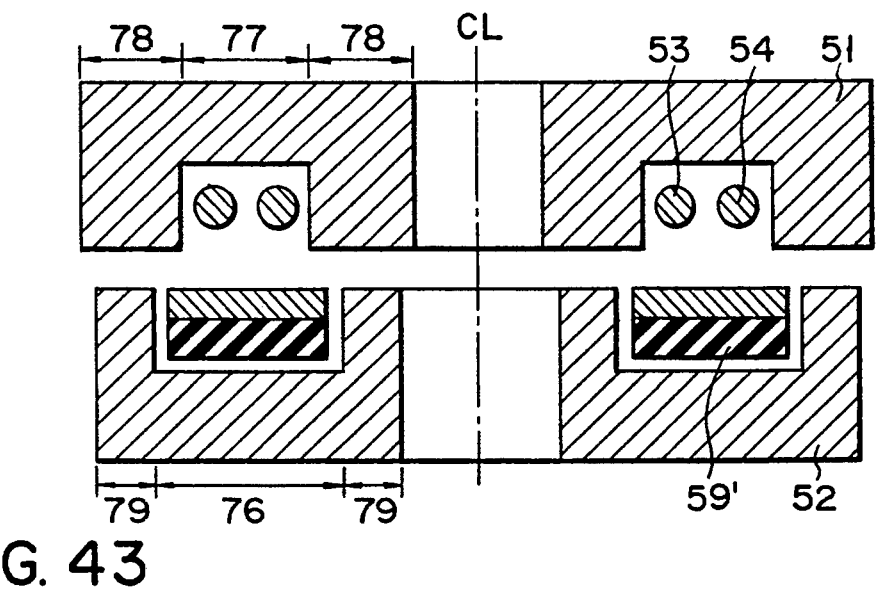
F I G. 43
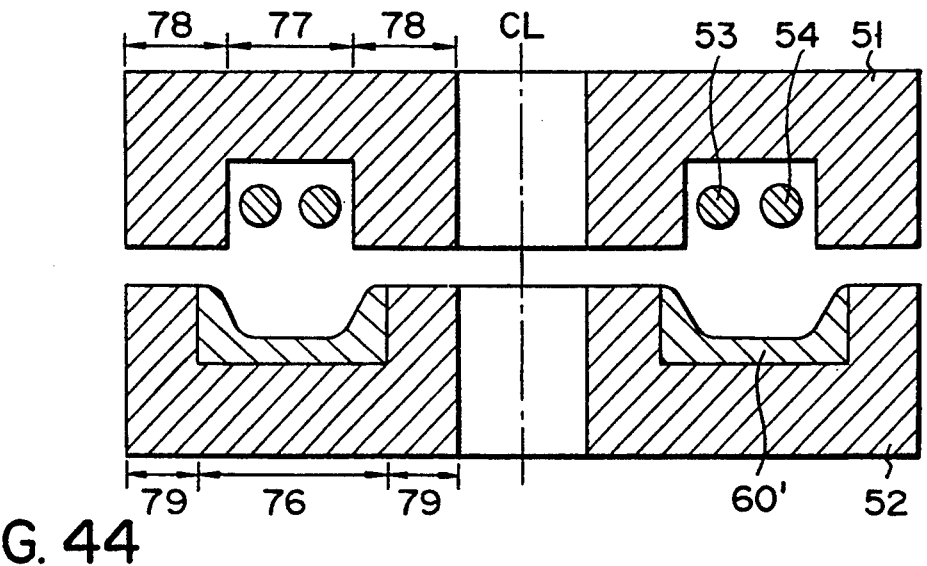
F I G. 44

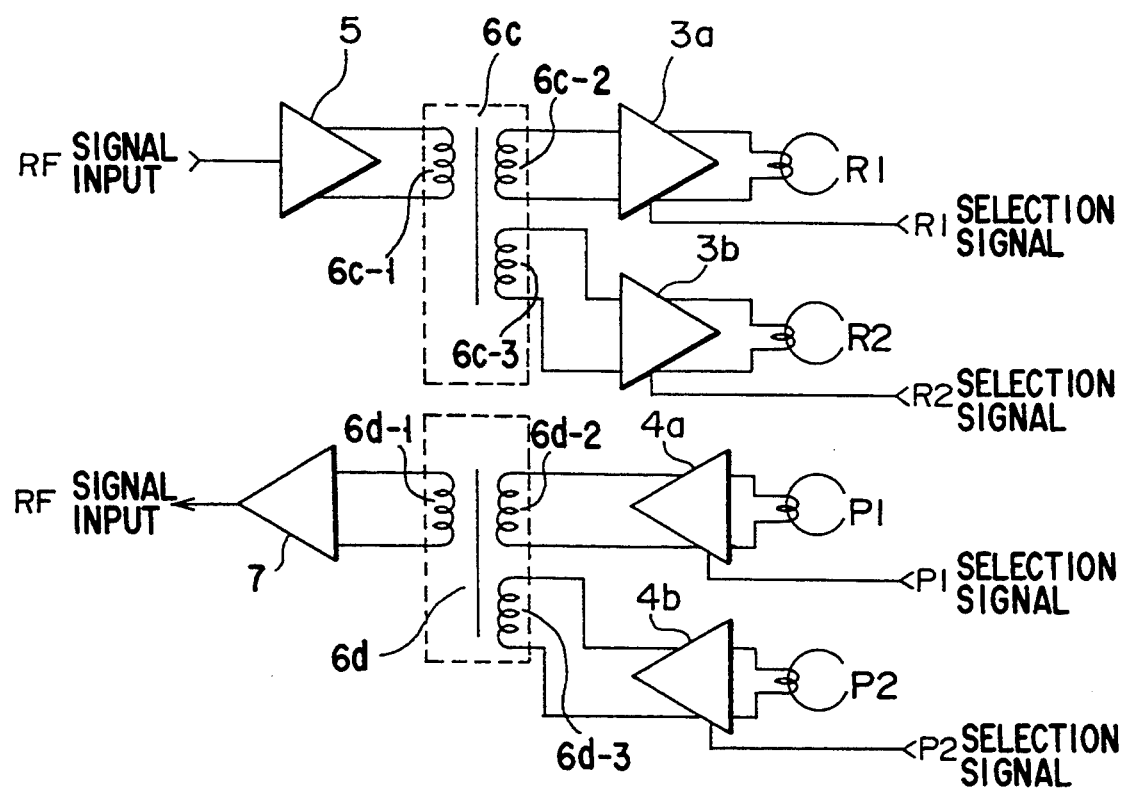
F I G. 48

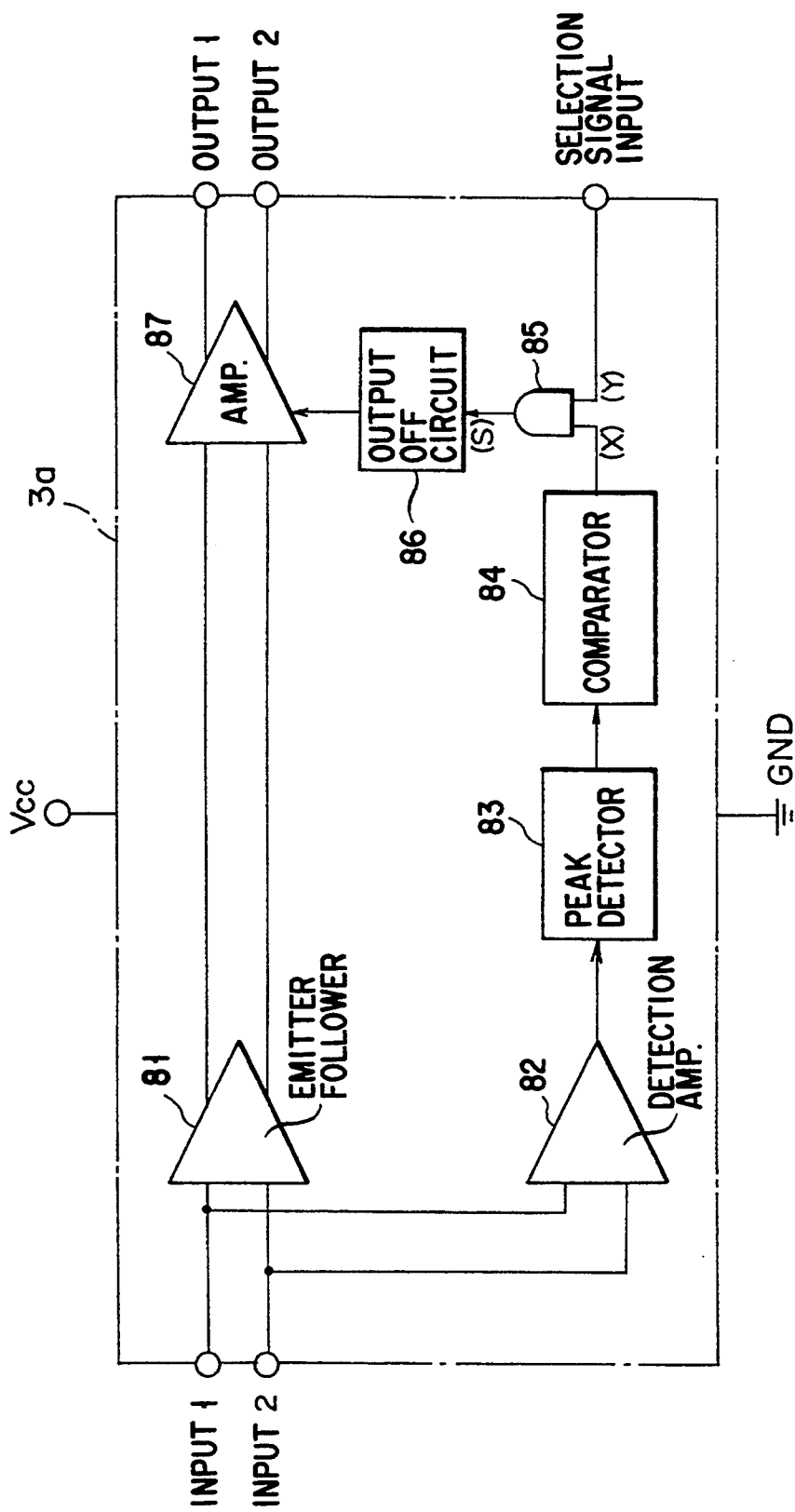
F I G. 49

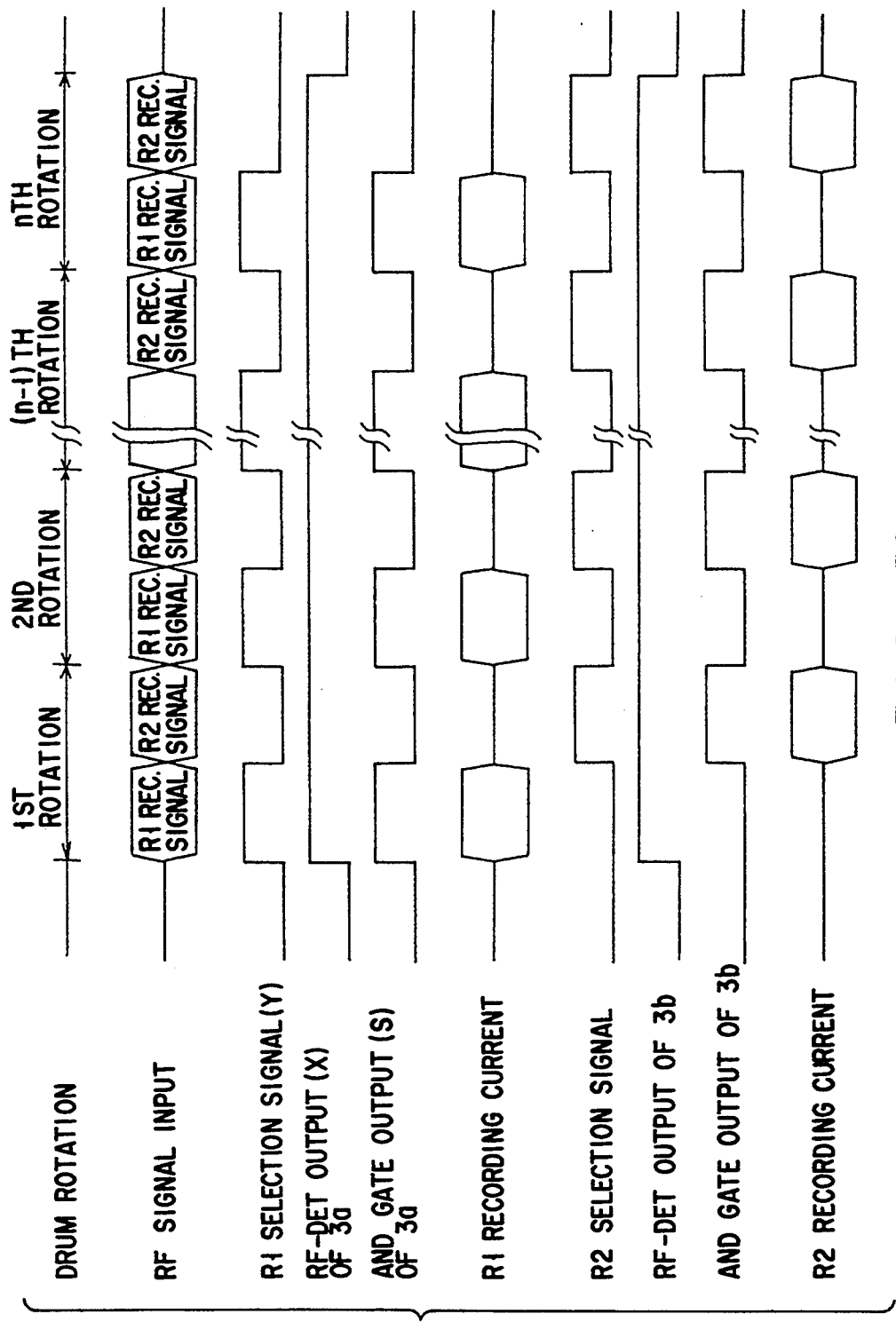
F I G. 50

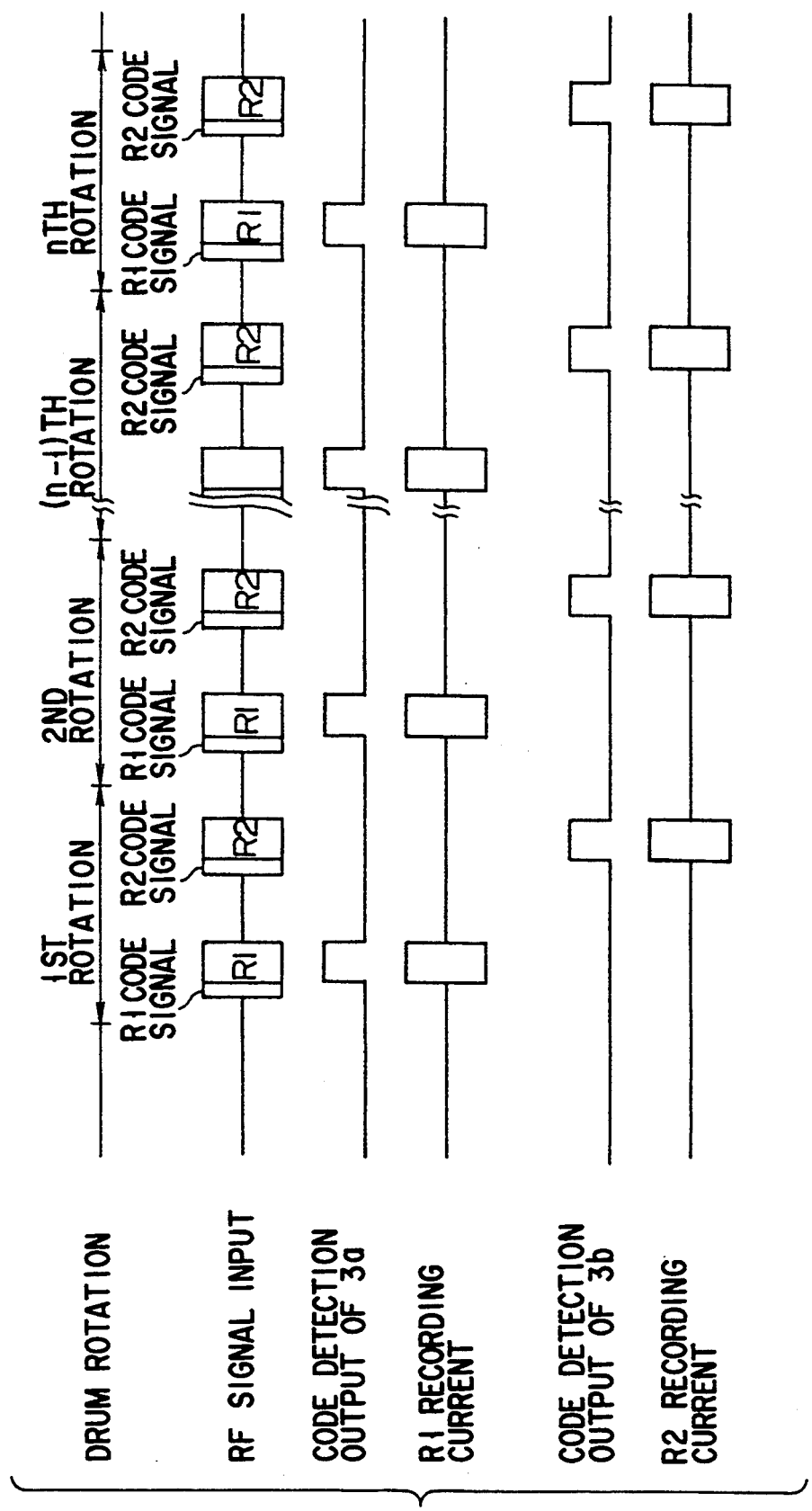
F I G. 56

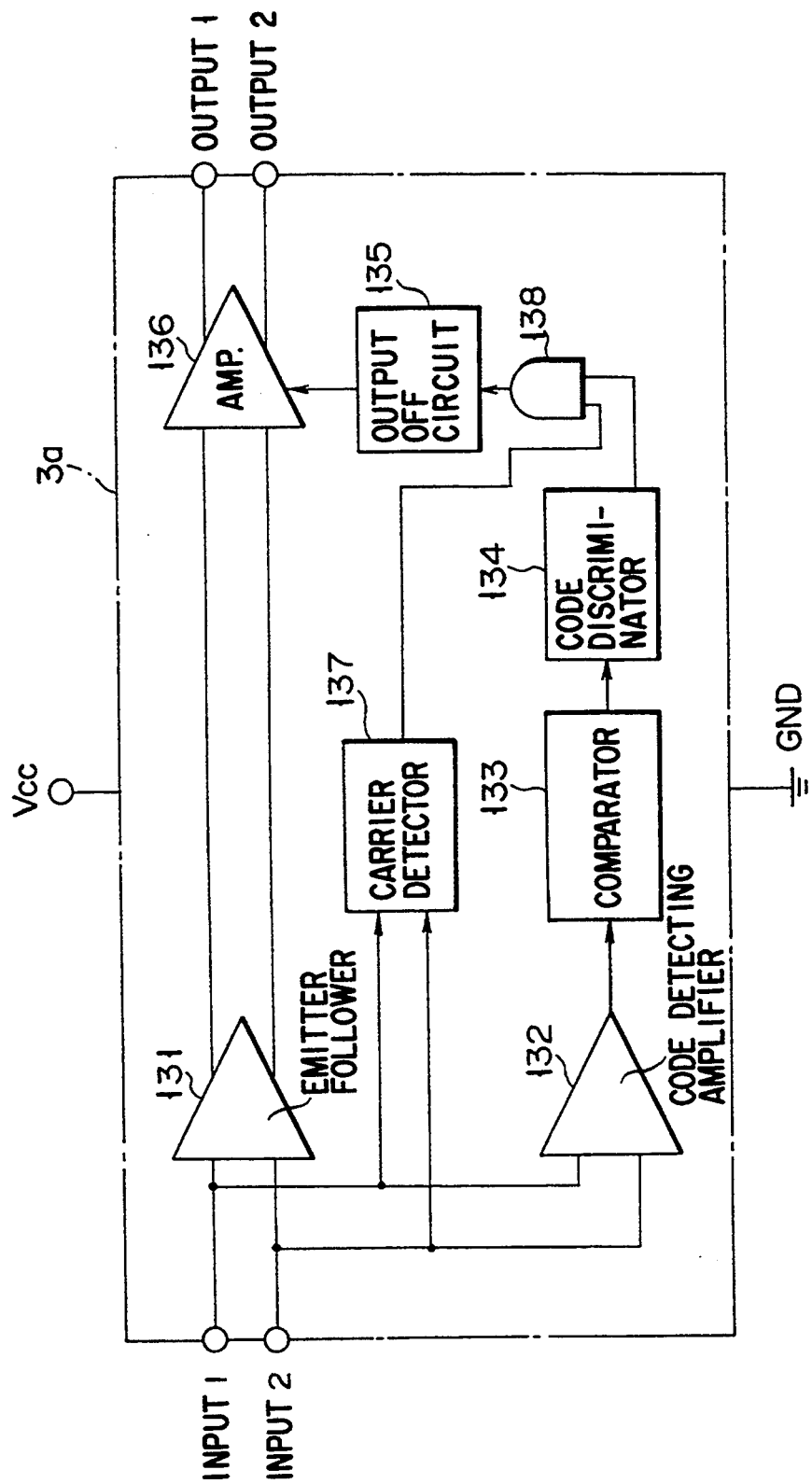
F I G. 57

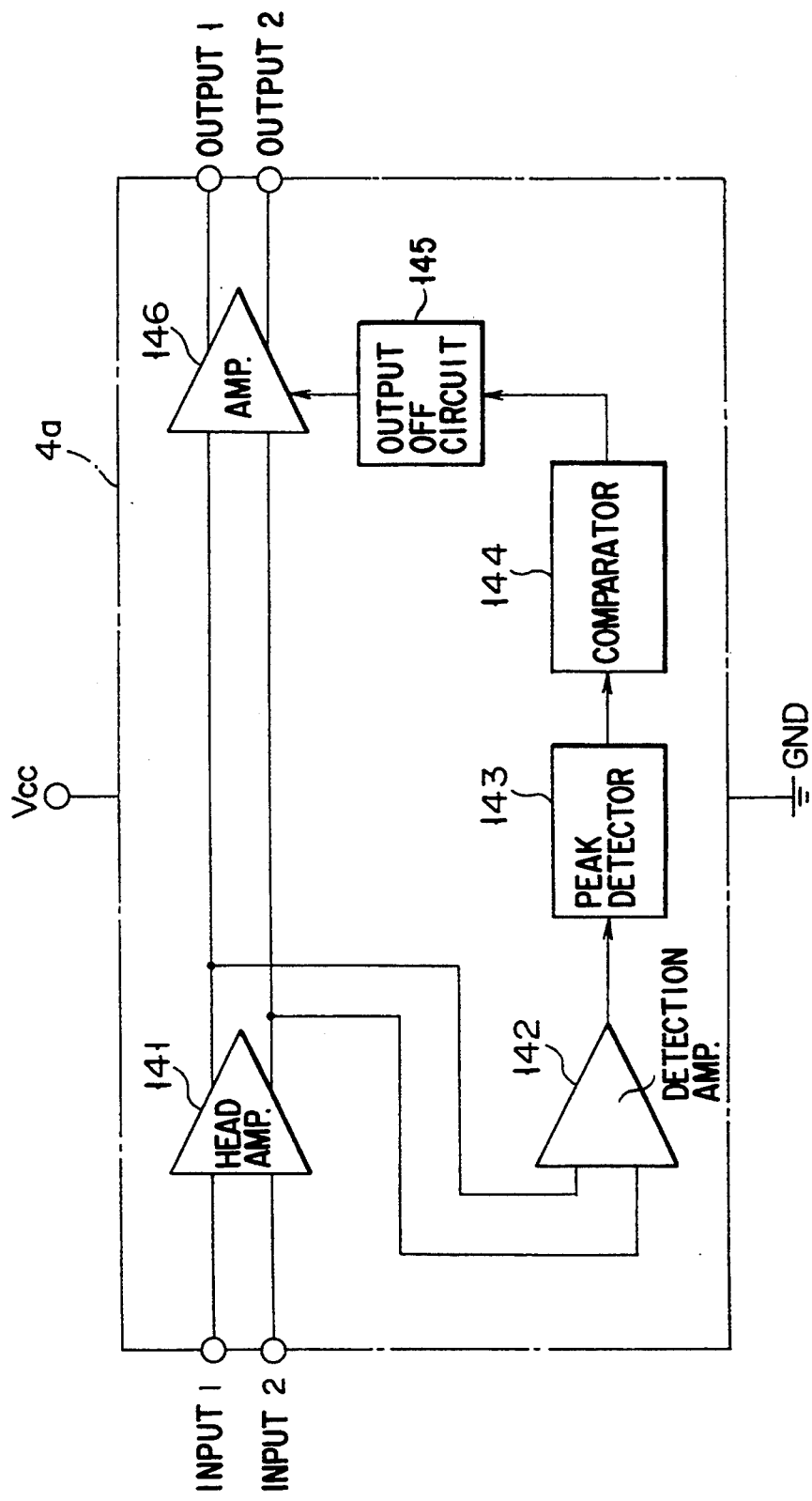
F I G. 58

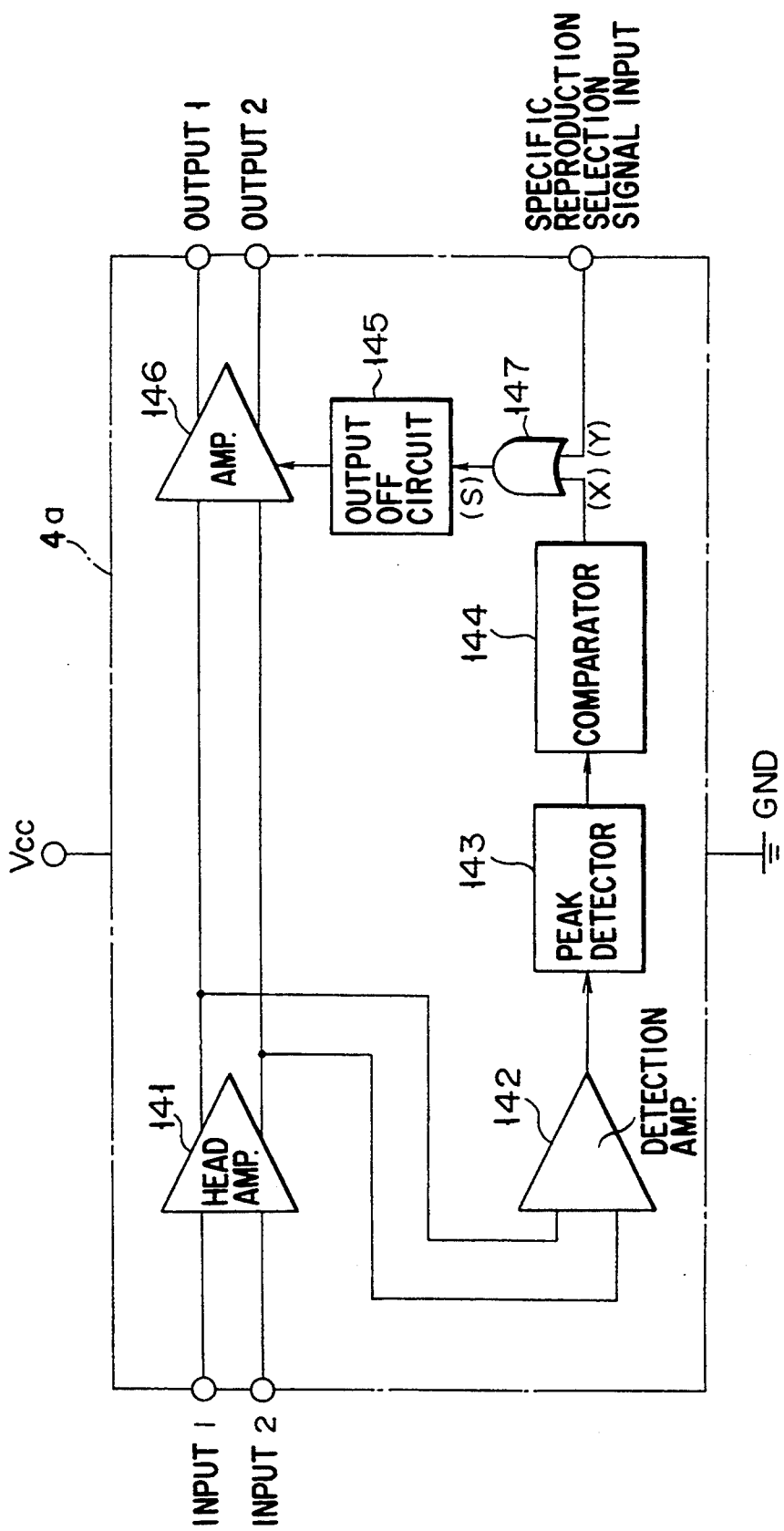
F I G. 60

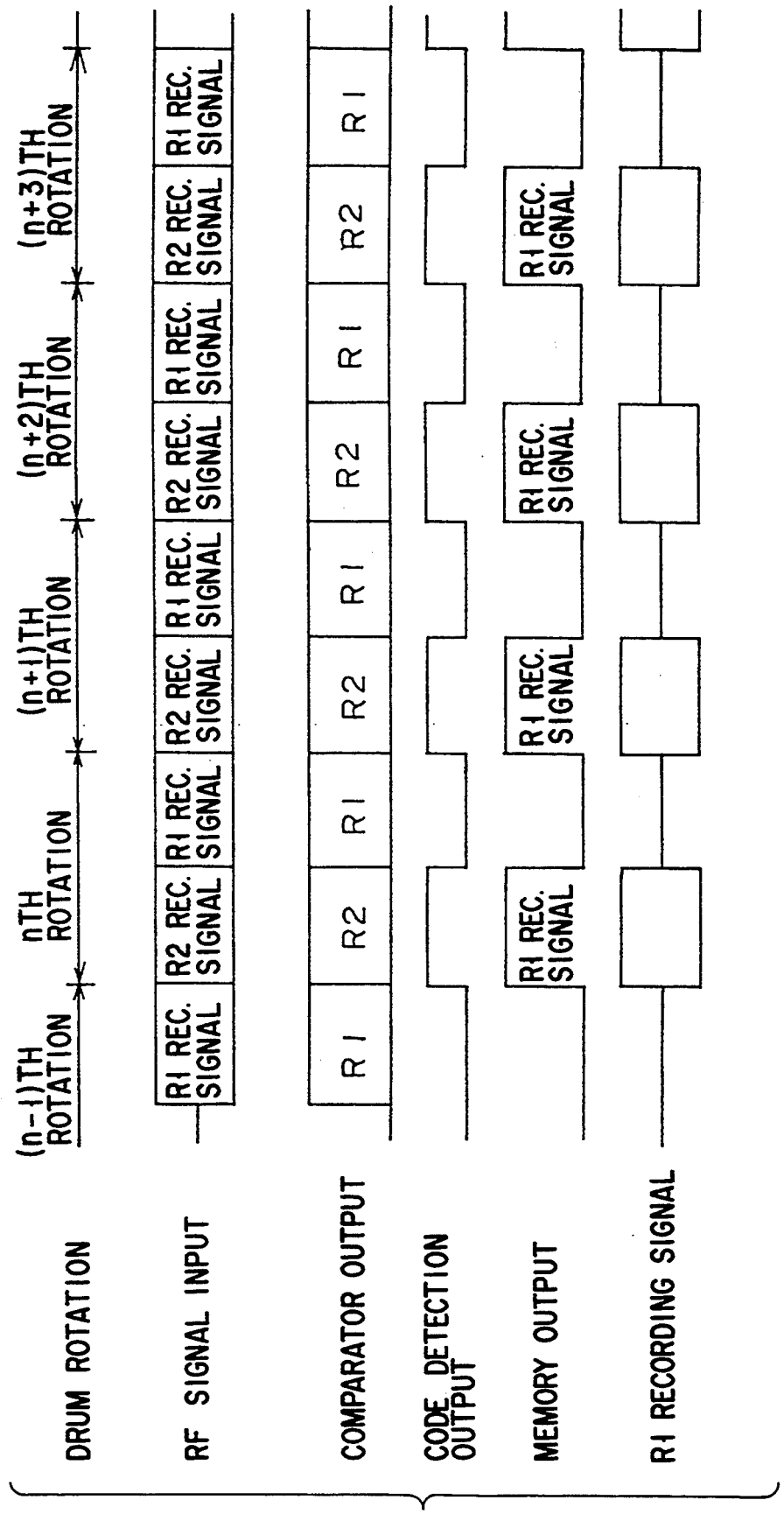
F I G. 64

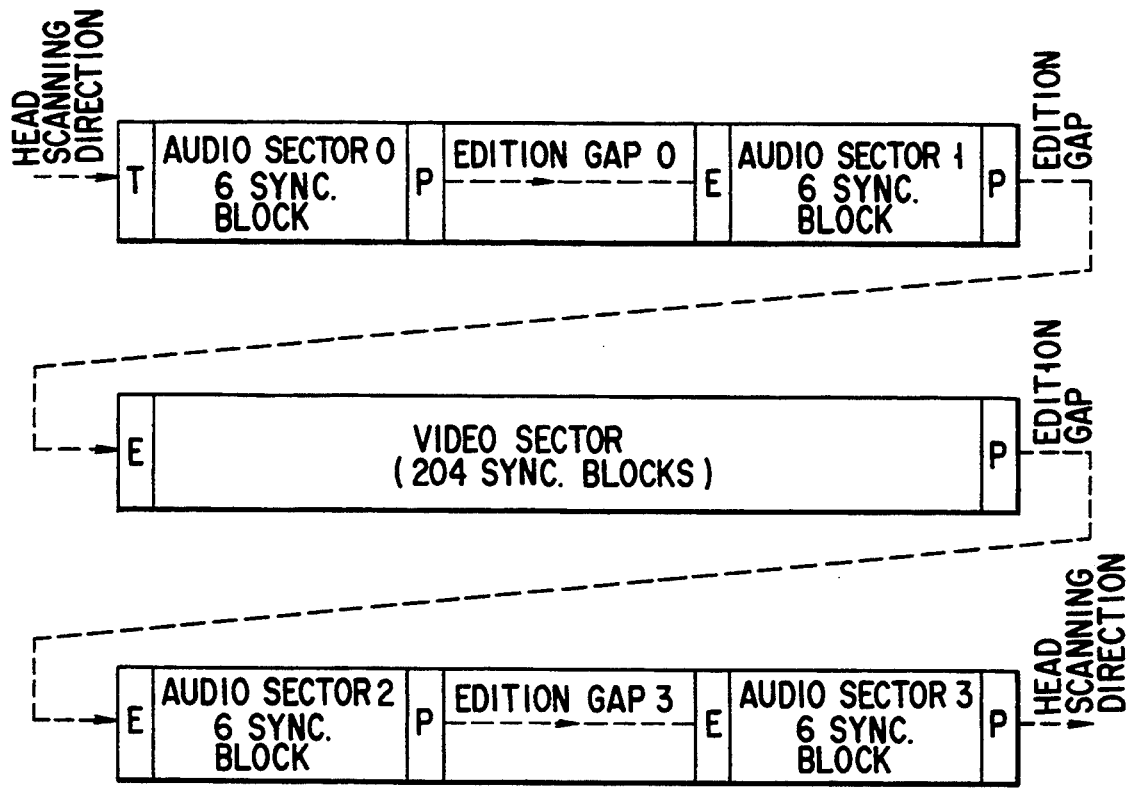
T: TRACK PREAMBLE (62 BYTES)
E: EDITION GAP PREAMBLE (28 BYTES)
P: POSTAMBLE (6 BYTES)
SYNC. BLOCK (190 BYTES)
EDITION GAP (NOMINAL VALUE 156 BYTES)
F I G. 66

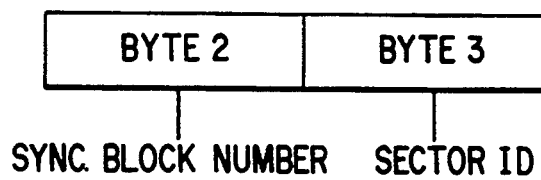
F I G. 67A
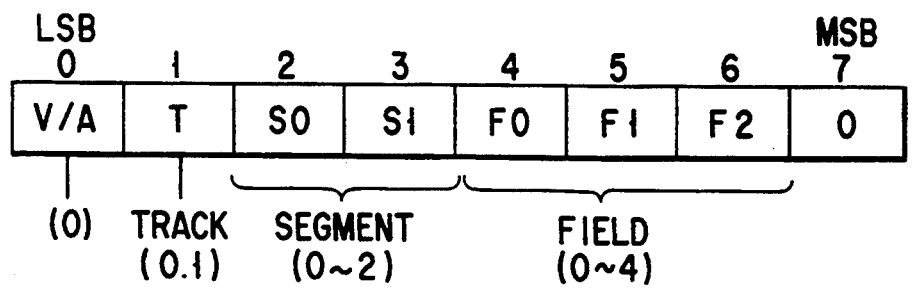
F I G. 67B
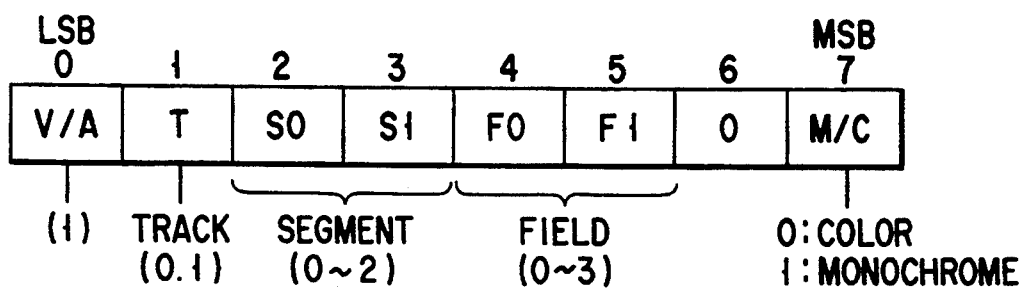
F I G. 67C

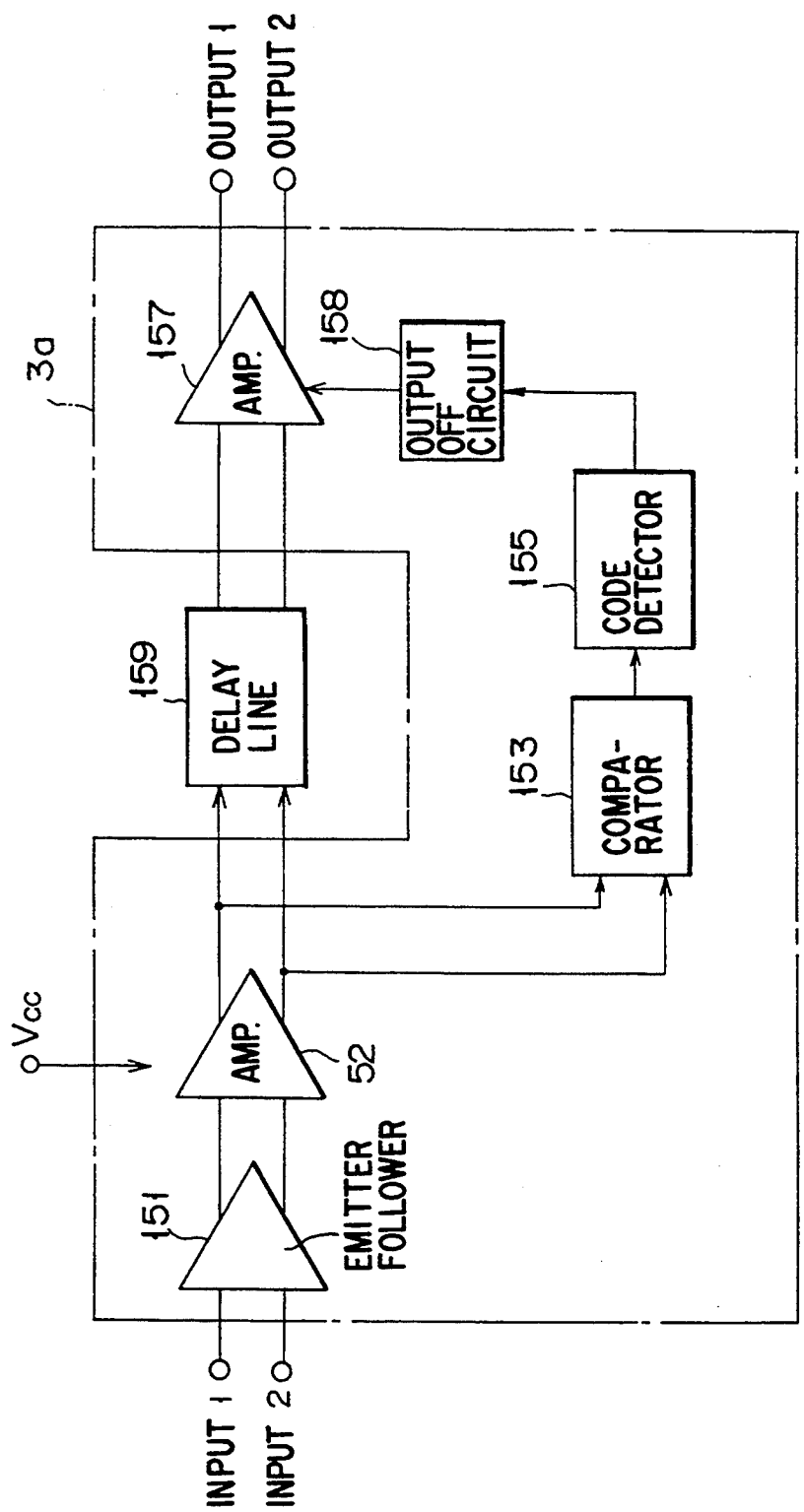
F I G. 69

|  | BIT 0 | BIT 7 | BIT 19 | | | | |
|---|---|---|---|---|---|---|---|
| 0 | 0 | 8 | | | | | 264 |
| 1 | 6 | 14 | | | | | AUX2 |
| 2 | PV0 | PV0 | | | | PV0 | PV0 |
| 3 | 2 | 10 | | | | | 266 |
| 4 | PV1 | PV1 | | | | PV1 | PV1 |
| 5 | 4 | 12 | | | | | AUX0 |
| 6 | 7 | 15 | | | | | AUX3 |
| 7 | PV2 | PV2 | | | | PV2 | PV2 |
| 8 | 1 | 9 | | | | | 265 |
| 9 | PV3 | PV3 | | | | PV3 | PV3 |
| 10 | 3 | 11 | | | | | RESERVED (=0) |
| 11 | 5 | 13 | | | | | AUX1 |

ROW: INTER CODE BLOCK (rows 0–11), 85 BYTES wide
COLUMN: OUTER CODE BLOCK (0,1,2,3,4 ... 80,81,82,83,84)

NUMERAL: AUDIO SAMPLING NUMBER
SAMPLE 266 HAS DEAD BLOCK EVERY 5 FIELDS

FIG. 71

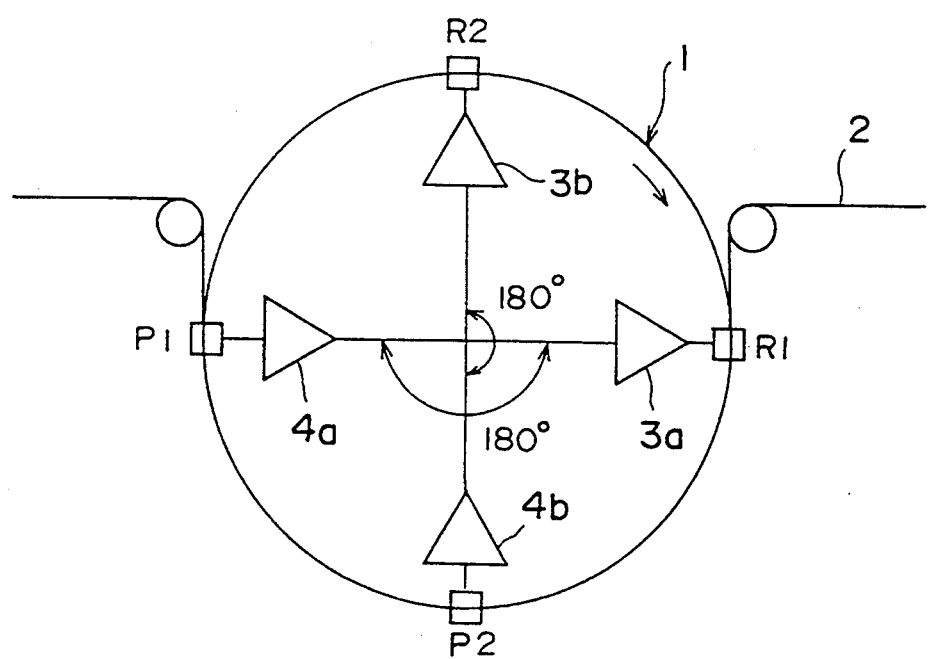
F I G. 72

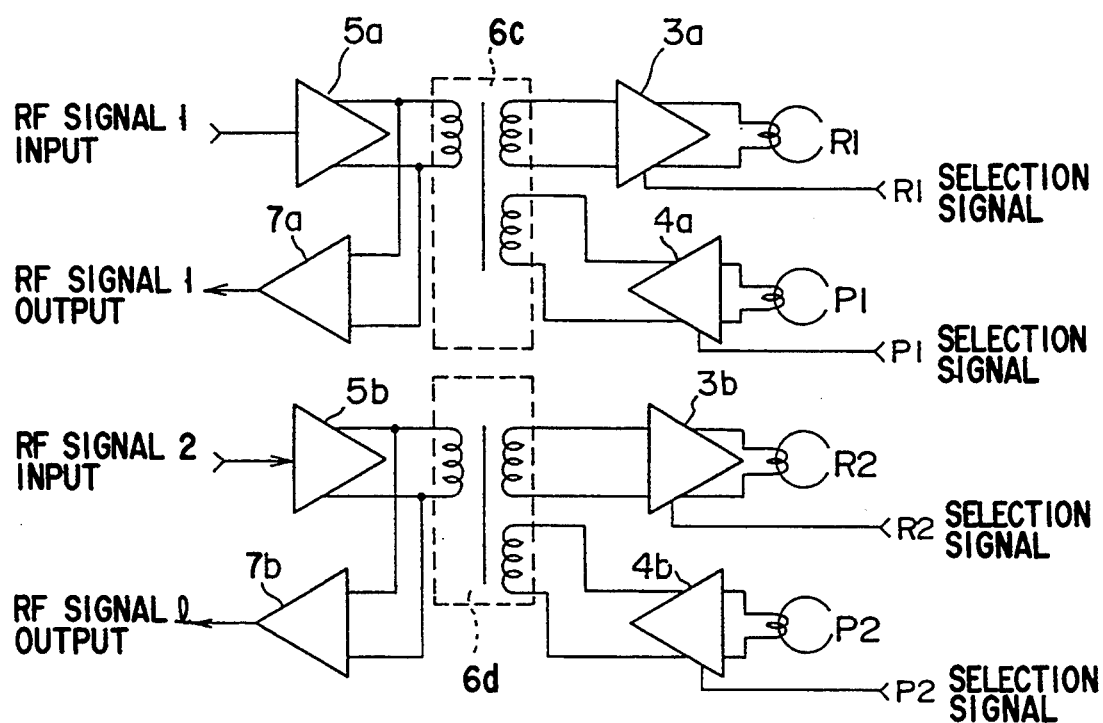
F I G. 73

MAGNETIC RECORDING AND REPRODUCTION APPARATUS WITH PLURAL HEADS

CROSS-REFERENCE TO THE RELATED APPLICATION

This application is a continuation-in-part, of U.S. patent application Ser. No. 525,831, filed on May 18, 1990, now U.S. Pat. No. 5,276,565.

BACKGROUND OF THE INVENTION

1. Field of the Invention

The present invention relates to a magnetic recording and reproduction apparatus for magnetically recording and/or reproducing information by using a magnetic tape as a recording medium.

2. Description of the Related Art

As shown in FIG. 1, in a video tape recorder (to be referred to as a "VTR" hereinafter) for current standard television systems (a term "television" will be abbreviated to as a "TV" hereinafter) such as an NTSC system, a PAL system, and an SECAM system, a recording circuit 25 and a reproduction circuit 29 provided at arbitrary positions except for a position of a rotary drum portion are coupled to a magnetic head 27 (in FIG. 1, a recording and reproduction head to be used in both recording and reproduction is shown) provided in the rotary drum portion via a rotary transformer 26. A recording current is supplied from the recording circuit 25 to the magnetic head 27 via the rotary transformer 26, and a reproduced signal extracted from the magnetic head 27 is supplied to the reproduction circuit 29 via the rotary transformer 26, thereby performing recording and reproduction for a magnetic tape 28.

In recent years, wide-band, high-transmission rate VTRs (to be referred to as "wide-band/high-transmission rate VTRs" hereinafter) such as a high-resolution VTR and a digital VTR of a current TV system have been developed and put into practical use. In these wide-band/high-transmission rate VTRs, an inductance of a rotary transformer, a stray capacitance, and a cable coupling capacitance between the rotary transformer and a magnetic head, which are not so problematic in conventional VTRs, have been considered as problems. That is, transmission characteristics of an electromagnetic conversion system in magnetic recording are determined by a resonance frequency obtained by inductances of a magnetic head and a rotary transformer and the stray capacitance, including an input capacitance of a reproduction circuit in a recording system, and is determined by a resonance frequency obtained by an inductance of the magnetic head, an inductance of the rotary transformer. and the stray capacitance including the input capacitance of the reproduction circuit in a reproduction system. In order to realize a wide-band/high-transmission rate VTR, therefore, no rotary transformer is desirably interposed between the magnetic head and the recording and reproduction circuits.

In a VTR of this type. therefore, as described in "Technical Bulletin of Institute of Electronics, Information and Communication Engineers", MR85 54, a recording circuit and a reproduction circuit are mounted in a rotary drum portion and connected directly to a magnetic head without using a rotary transformer, thereby widening recording and reproduction bands.

In addition, bands of a rotary transformer for transmitting signals between the rotary drum portion and an external portion (between the rotary drum portion and the other portion), a driver circuit for driving the rotary transformer, and a receiver circuit for receiving signals from the rotary transformer must be simultaneously widened. That is, as the recording and reproduction bands are determined in accordance with the input capacitances of the magnetic head and the reproduction circuit, a transmission band of the rotary transformer is determined in accordance with the inductance of the rotary transformer and the input capacitance or the stray capacitance of the receiver circuit. Therefore, a cable having a large capacitance, e.g., a coaxial cable having a large capacitance cannot be used to couple the driver and receiver circuits to the rotary transformer. In order to realize a wide band of the rotary transformer, therefore, the driver and receiver circuits must be mounted close to the rotary transformer. As a result, a scanner (an entire drum mechanism portion including a "rotary drum" and a "stationary drum" will be referred to as a "scanner" hereinafter) is complicated and enlarged since the driver and receiver circuits of the rotary transformer are mounted. In addition, as described in "National Convention Record of the Institute of Television Engineers of Japan", Vol. 10, No. 41; VR87-5; T. Eguchi et al.; January, 1987, a VTR of this type must have at least six magnetic heads including those for normal reproduction and special-purpose reproduction. For example, a D-1 format 525 digital VTR employs 16 magnetic heads.

A rotary transformer is normally used for signal transmission between a rotary drum portion and an external portion (between the rotary drum portion and the other portion), and the number of channels of the rotary transformer must correspond to the number of magnetic heads mounted in the rotary drum. If, however, rotary transformers are mounted in a scanner in a number corresponding to the number of multi-channel magnetic heads, a mechanism of the scanner is enlarged and complicated, resulting in insufficient mechanical precision of each portion. Although a recording or reproduction circuit must be provided in a number corresponding to the number of magnetic heads similar to the rotary transformer, it can be made compact and light by adopting an IC arrangement. Since, however, the rotary transformer must have a wide range and a low crosstalk between channels, its miniaturization is limited.

In order to simplify an arrangement of the mechanism of the scanner and that of an electronic circuit including the recording and the reproduction circuits. therefore, the number of channels of the rotary transformer must be reduced.

In addition, since the recording and reproduction circuits corresponding to the multi-channel magnetic head are mounted, power consumption is increased. Furthermore, since thermal expansion is caused in each mechanism portion of the scanner due to heat generated by circuit elements, precision of the mechanism is degraded. Therefore, low power consumption is also required for the recording and reproduction circuits to be mounted in the rotary drum and a circuit portion at the stationary drum side.

SUMMARY OF THE INVENTION

As described above, in a wide-band/high-transmission rate VTR. if a recording or reproduction circuit corresponding to a multi-channel magnetic head is mounted in a rotary drum, power consumption of the circuit is increased. In addition, thermal expansion is caused in each mechanism portion of a scanner due to heat generated by circuit elements, thereby degrading mechanism precision.

In addition, if a transformer corresponding to the multi-channel magnetic head is mounted in the scanner, the mechanism of the scanner is complicated and enlarged to make it difficult to maintain satisfactory mechanical precision of each portion. Furthermore, a driver and a receiver for the rotary transformer must be mounted in the scanner in order to widen the band of the rotary transformer. As a result, the scanner mechanism is further complicated and enlarged.

It is, therefore, an object of the present invention to provide a magnetic recording and reproduction apparatus which can reduce the number of channels of a rotary transformer without degrading frequency characteristics, reduce power consumption of the entire circuit mounted on a rotary drum, and simplify and miniaturize a mechanism of a scanner portion.

A magnetic recording and reproduction apparatus of the present invention comprises a rotary drum to be driven to rotate, a first head provided in the rotary drum, a second head provided in the rotary drum to be activated when the first head is inactivated, first and second amplifying circuit systems connected to said first and second head, respectively, to be activated or inactivated by a selection signal, a rotary transformer commonly connected to the first and second amplifying circuit systems, and selection signal generating means for supplying the selection signal to the first and second amplifying circuit systems in synchronism with rotation of the rotary drum.

By selecting between active and inactive states of n amplifying circuit systems mounted in the rotary drum and commonly coupled to the rotary transformer, the amplifying circuit systems being included in a recording or reproduction circuit or a recording and reproduction circuit, an essential number of channels of the rotary transformer can be set to be 1/n the number of the magnetic heads and the amplifying circuit systems. In addition, since the active and inactive states are set by selecting among the n amplifying circuit systems mounted in the rotary drum and constituting the recording or recording circuit or the recording and reproduction circuit, power consumption of the entire circuit can be reduced.

Since the essential channel number of the rotary transformer can be set to be 1/n, a mechanism of a scanner can be simplified to improve reliability, thereby realizing a compact size, a light weight, and a low manufacturing cost of the system.

According to the present invention, the number of channels of the rotary transformer can be reduced without degrading frequency characteristics, power consumption of the circuit mounted in the rotary drum can be reduced., and the mechanism of the scanner can be simplified and miniaturized.

Further, according to the present invention, it is possible to provide a magnetic recording and reproduction apparatus containing a plurality of recording circuits connected to the respective recording heads, and output stages that are made active only during the period of time that each of the recording circuits is to record the information signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a circuit diagram showing a practical circuit having the basic arrangement shown in FIG. 2;

FIG. 4 is a timing chart showing a series of time sequences of a selection operation for recording and reproduction circuits in the apparatus shown in FIGS. 2 and 3;

FIG. 5 is a circuit diagram showing a basic arrangement of a circuit for increasing an impedance of an output from the reproduction circuit;

FIGS. 6A and 6B are block diagrams showing basic circuit arrangements of recording and reproduction systems, respectively, of the magnetic recording and reproduction apparatus according to the first embodiment of the present invention;

FIG. 8 is a schematic view showing a basic arrangement of a scanner portion of a magnetic recording and reproduction apparatus according to the second embodiment of the present invention;

FIG. 9 is a circuit diagram showing a practical circuit having the arrangement shown in FIG. 8;

FIG. 10 is a timing chart showing a series of time sequences of a selection operation for recording and reproduction circuits of the apparatus shown in FIGS. 8 and 9;

FIGS. 11A and 11B show a basic arrangement according to a first arrangement of a selecting device, used in the first embodiment of the present invention shown in FIGS. 2 and 3, for generating a timing signal for performing selection upon each 180° rotation, in which FIG. 11A is a schematic sectional view of a cylinder system and FIG. 11B is a schematic plan view thereof;

FIG. 12 is a block diagram showing an arrangement of a circuit for performing selective control in the embodiment shown in FIGS. 11A and 11B;

FIG. 13 is a timing chart showing a series of sequences of a selection operation in the embodiment shown in FIGS. 11A and 11B;

FIGS. 14A and 14B show a basic arrangement according to a second arrangement of the selecting device for generating a timing signal for performing selection upon each 180° rotation, in which FIG. 14A is a schematic sectional view of a cylinder system and FIG. 14B is a schematic plan view thereof;

FIG. 15 is a schematic view showing an arrangement of a reflection type photo sensor for explaining a principle of the present invention;

FIGS. 16A and 16B show a basic arrangement according to a third arrangement of the selecting device for generating a timing signal upon each 180° rotation;

FIG. 20 is a schematic plan view for explaining an arrangement of a rotary member or a stationary member of a rotary transformer unit for use in the third, fourth, and fifth embodiments of the present invention;

FIG. 21 is a schematic view for explaining an arrangement of a main part of the third embodiment of the present invention using, for recording, a rotary transformer unit having a rotary member as shown in FIG. 20 and a stationary member in which a winding is wound in a winding slot;

FIG. 22 is a timing chart showing a series of sequences of an operation associated with selection of a recording circuit according to the embodiment shown in FIG. 21;

FIG. 23 is a schematic view for explaining an arrangement of a main part of the fourth embodiment of the present invention using, for recording, a rotary transformer unit having a rotary member as shown in FIG. 20 and a stationary member in which a winding is wound in a winding slot;

FIG. 24 is a timing chart showing a series of sequences of an operation associated with selection of a reproduction circuit according to the embodiment shown in FIG. 23;

FIG. 25 is a schematic view for explaining an arrangement of a main part of the fifth embodiment of the present invention using, for recording and reproduction, a rotary transformer unit having a rotary member as shown in FIG. 20 and a stationary member in which a winding is wound in a winding slot;

FIG. 26 is a timing chart showing a series of sequences of an operation associated with selection of the recording and reproduction circuits of the embodiment shown in FIG. 25;

FIGS. 27 and 28 are sectional views for explaining problems of a rotary transformer apparatus for performing signal transmission between a rotary member and a stationary member in which a plurality of windings are wound in a single slot of one member while a single winding is wound in a slot of the other member;

FIG. 29 is a sectional view schematically showing an arrangement of the sixth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 30 is a sectional view schematically showing an arrangement of the seventh embodiment of the present invention for solving problems of a rotary transformer apparatus for performing signal transmission between a rotary member and a stationary member in which a plurality of windings are wound in a single slot of one member while a single winding is wound in a slot of the other member;

FIG. 31 is a sectional view schematically showing an arrangement of the eighth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 32 is a sectional view schematically showing an arrangement of the ninth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 33 is a sectional view schematically showing an arrangement of the tenth embodiment of the present invention for solving problems of a rotary transformer apparatus for performing signal transmission between a rotary member and a stationary member in which a plurality of windings are wound in a single slot of one member while a single winding is wound in a slot of the other member;

FIG. 34 is a sectional view schematically showing an arrangement of the 11th embodiment of the present invention for solving problems of a rotary transformer apparatus for performing signal transmission between a rotary member and a stationary member in which a plurality of windings are wound in a single slot of one member while a single winding is wound in a slot of the other member;

FIG. 35 is a plan view schematically showing an arrangement of one member shown in FIG. 33;

FIG. 36 is a sectional view schematically showing an arrangement of the 12th embodiment of the present invention;

FIG. 37 is a sectional view schematically showing an arrangement of the 13th embodiment of the present invention;

FIG. 38 is a sectional view schematically showing an arrangement of the 14th embodiment of the present invention;

FIG. 39 is a sectional view schematically showing an arrangement of the 15th embodiment of the present invention:

FIG. 40 is a sectional view schematically showing an arrangement of the 16th embodiment of the present invention:

FIG. 41 is a sectional view schematically showing an arrangement of the 17th embodiment of the present invention;

FIG. 42 is a sectional view schematically showing an arrangement of the 18th embodiment of the present invention;

FIG. 43 is a sectional view schematically showing an arrangement of the 19th embodiment of the present invention;

FIG. 44 is a sectional view schematically showing an arrangement of the 20th embodiment of the present invention;

FIG. 48 is a circuit diagram of a primary portion of a magnetic recording and reproduction apparatus according to another embodiment of the present invention;

FIG. 49 is a block diagram illustrating an example of a construction of a recording circuit with a carrier detecting function;

FIG. 50 is a time chart of the operation of the recording circuit of FIG. 49 during normal recording;

FIG. 56 is a time chart of the operation of the recording circuit of FIG. 54 during insert recording;

FIG. 57 is a block diagram of another recording circuit with a function for detecting a recording circuit specifying code;

FIG. 58 is a block diagram illustrating an example of a construction of a reproduction circuit with a carrier detecting function;

FIG. 60 is a block diagram illustrating another example of a construction of a reproduction circuit with a carrier detecting function;

FIG. 64 is a time chart of the operation of the recording circuit of FIG. 63 during normal recording;

FIG. 66 is a diagram showing the data structure of a helical track in D-2 format;

FIGS. 67A to 67C are diagrams showing the sync block ID format in D-2 format;

FIG. 69 is a block diagram illustrating another example of a construction of a recording circuit with a numerical code detecting function;

FIG. 71 is a diagram showing the data structure of a audio sector in D-2 format;

FIG. 72 is a schematic diagram of the scanner section of a magnetic recording and reproduction apparatus according to another embodiment of the present invention;

FIG. 73 is a circuit diagram of a primary portion of the recording and reproduction apparatus of FIG. 72.

DETAILED DESCRIPTION OF THE PREFERRED EMBODIMENTS

Embodiments of the present invention will be described in detail below with reference to the accompanying drawings.

Figure 1:
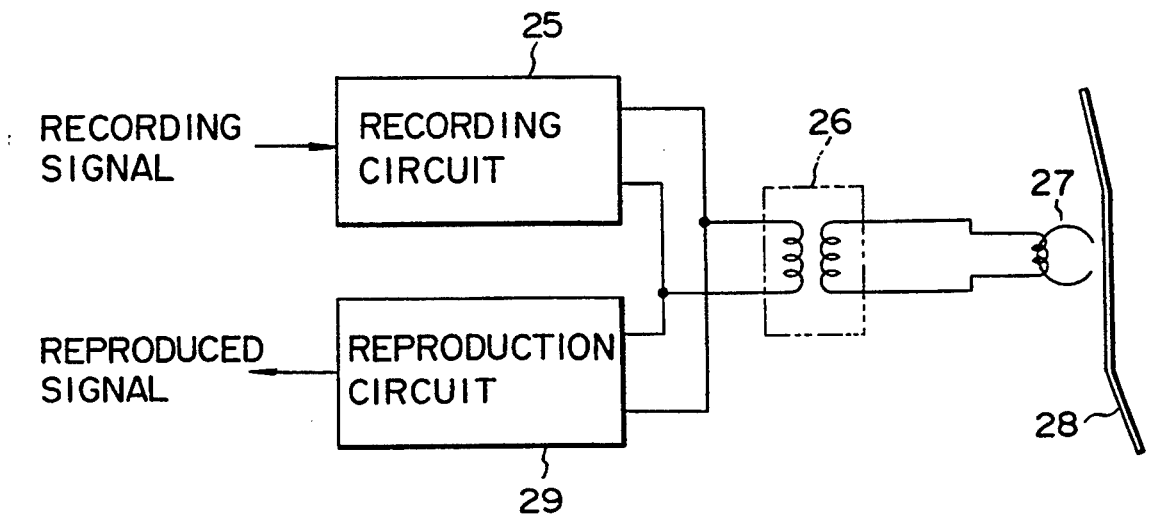
FIG. 1 is a block diagram schematically showing an arrangement of a recording and reproduction system of a conventional VTR.
Figure 2:
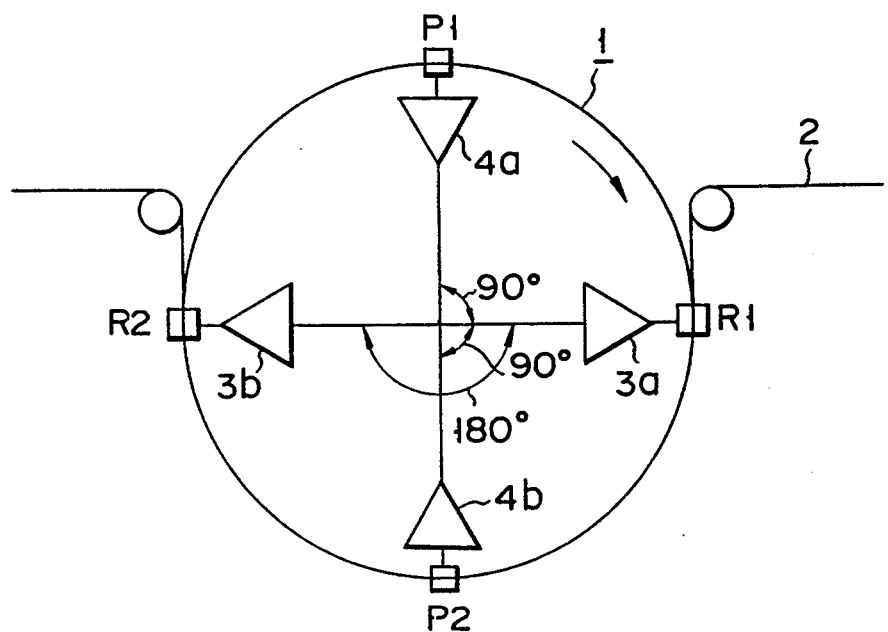
FIG. 2 is a schematic view showing a basic arrangement of a scanner portion of a magnetic recording and reproduction apparatus according to the first embodiment of the present invention.

FIG. 2 schematically shows a basic arrangement of a scanner portion of a magnetic recording and reproduction apparatus according to the first embodiment of the present invention. FIG. 3 shows a practical circuit having the arrangement shown in FIG. 2, and FIG. 4 shows a series of time sequences of a selection operation of the recording and reproduction circuits.

In the first embodiment, assume that an effective recording area angle of a magnetic type 2 is 180°. The magnetic tape 2 is wound around the circumferential surface of a rotary drum of a scanner 1. The tape 2 is in contact with the circumferential surface of the rotary drum through 180°. This contact portion serves as an effective recording area of an information signal of the tape 2.

A recording circuit 3a amplifies an information signal supplied from a rotary transformer 6a (shown in FIG. 3) and supplies the amplified signal to a recording magnetic head R1, thereby driving the magnetic head R1. A recording magnetic head R2 is arranged at a position shifted from the magnetic head R1 by 180° so that the rear surfaces of the two heads oppose each other. The magnetic head R2 is driven by a recording circuit 3b having an input side commonly connected to the recording circuit 3a. The information signal is reproduced from the magnetic tape 2 to a reproduction magnetic head P1, amplified by a reproduction circuit 4a, and transmitted outside the rotary drum by a rotary transformer 6b (shown in FIG. 3) connected to the output side of the reproduction circuit 4a. A reproduction magnetic head P2 is arranged at a position shifted from the magnetic head P1 by 180° so that the rear surfaces of the two heads oppose each other. An information signal reproduced by the magnetic head P2 is amplified by a reproduction circuit 4b having an output side commonly connected to the reproduction circuit 4a.

An information signal (to be referred to as an "RF signal" hereinafter) to be recorded in a magnetic tape is amplified by a rotary transformer driving circuit 5 as an amplifier and transmitted to the rotary drum portion by the rotary transformer 6a. The RF signal to be input to the rotary transformer driving circuit 5 includes both information signals to be recorded by the magnetic heads R1 and R2. The recording circuits 3a an 3b have input sides commonly connected to the rotary transformer 6a. As shown in FIG. 4, the recording circuits 3a and 3b are alternately selected to active and inactive states upon each 180° rotation by R1 and R2 selection signals having opposite phases, respectively. The recording circuit 3a (3b) amplifies the input RF signal in its active state and drives the magnetic head R1 (R2) by the amplified RF signal, thereby recording the RF signal corresponding to an R1 (R2) recording current in a magnetic tape.

Reproduction of the RF signal recorded in the magnetic tape will be described below. The RF signals reproduced from the magnetic tape by the magnetic heads P1 and P2 are amplified by the reproduction circuits 4a and 4b, respectively. The rotary transformer 6b commonly connected to the output sides of both the reproduction circuits 4a and 4b is driven to transmit the reproduced RF signals outside the rotary drum portion. As shown in FIG. 4, the reproduction circuits 4a and 4h are alternately selected to active and inactive states upon each 180° rotation by P1 and P2 selection signals having opposite phases, respectively. P1 and P2 reproduced signals as reproduced RF signals reproduced from the magnetic heads P1 and P2 in the active state are transmitted outside the rotary drum portion by the commonly connected rotary transformer 6b. The P1 and P2 reproduced signals transmitted from the rotary transformer 6b are received by a rotary transformer receiving circuit. 7, amplified as needed, and transmitted to the following circuit as an RF signal output. The RF signal output supplied from the rotary transformer receiving circuit 7 upon this selection operation includes both the RF signals reproduced from the magnetic heads P1 and P2, i.e., both the P1 and P2 reproduced signals.

A method of reducing the number of channels of the rotary transformers 6a and 6b will be described below.

The input sides of the recording circuits 3a and 3b are commonly connected to the rotary transformer. Therefore, in order to prevent degradation in frequency characteristics of the recording circuits 3a and 3b, emitter followers or Darlington emitter followers are used as circuits of input stages of the circuits 3a and 3b so as to increase their input impedances. The outputs of the reproduction circuits 4a and 4b are commonly connected to the rotary transformer. Therefore, in order to prevent degradation in frequency characteristics of one of the reproduction circuits 4a and 4b in an active state, an output of the other reproduction circuit in an inactive state is kept in a high-impedance state.

For example, the circuit shown in FIG. 5 is used to cause the output impedance of the reproduction circuit to be high. Although the outputs of the reproduction circuits according to this embodiment are balanced outputs, only one side output is shown to simplify the explanation. In a reproduction circuit of this type, an emitter follower or a Darlington emitter follower is normally used as an output stage in order to obtain sufficient driving power against a load. Referring to FIG. 5, a transistor Q1 having an emitter follower connection is used. A transistor Q2, a diode D1, and resistors Z1 and Z2 constitute a constant current circuit for flowing a constant current to the emitter follower transistor Q1. Switching between active and inactive states of the emitter follower is performed by transistors Q3 and Q4 and an inverter IN1. When a selection signal is at "H" (high level), the bases of the transistors Q3 and Q4 go to "L" (low level). Therefore, the transistors Q3 and Q4 are turned off, and the emitter follower of the transistor Q1 operates to output an RF signal. When the selections signal is at "L", the bases of the transistors Q3 and Q4 go to "H". Therefore, the transistors Q3 and Q4 are turned on, and the base of the emitter follower transistor Q1 goes to "L". Therefore, the transistor Q1 is turned off to set its output in a high-impedance state.

A method of simplifying a circuit by adopting the arrangement of this embodiment will be described below.

Figure 7A:
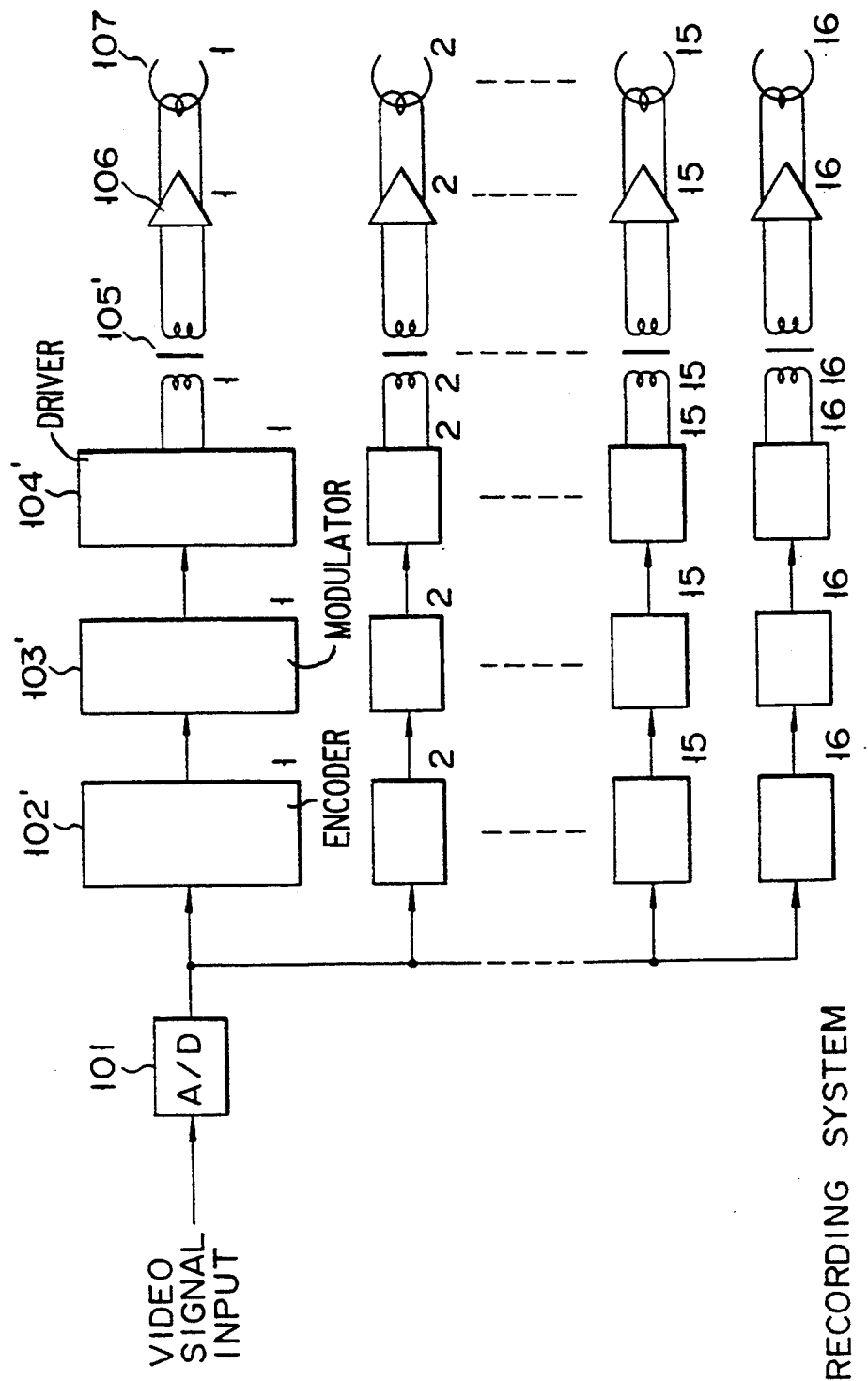
FIGS. 7A and 7B are block diagrams showing basic arrangements of recording and reproduction systems, respectively, of a conventional magnetic recording and reproduction apparatus.
Figure 7B:
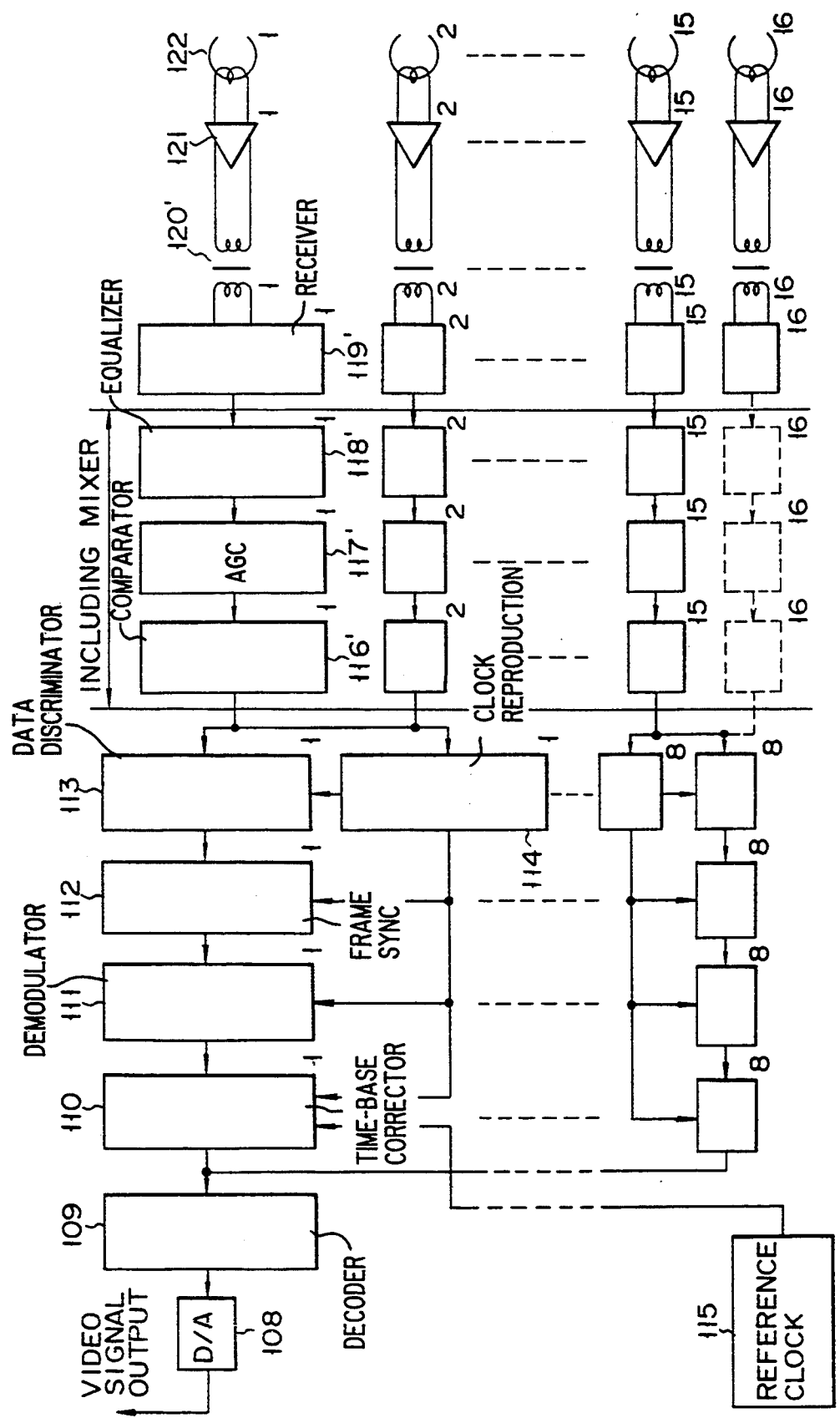

FIGS. 6A and 6B show circuits of recording and reproduction systems adopting this embodiment, respectively, and FIGS. 7A and 7B show circuits of recording and reproduction systems of a conventional apparatus, respectively, for comparison.

Each arrangement has 16 heads by a so-called 180° lap in which two heads of each pair are arranged through 180° so that their rear surfaces oppose each other. Although a difference between the two arrangements is apparent from FIGS. 6A to 7B, a circuit of a recording system shown in FIG. 6A will be described first. An input video signal is converted into a digital signal by an A/D (analog-to-digital) converter 101, and the converted digital signal is distributed to an encoded by eight encoders 102. Each of the eight divided signals is input to a stator side of a corresponding one of eight rotary transformers 105 via a corresponding pair of eight modulators 103 and eight rotary transformer drivers 104. 16 recording heads 107 provided at rotor sides of the rotary transformers 105 are connected to recording amplifiers 106 and to the rotor sides of the eight rotary transformers 105 by the arrangement as described above. In the conventional apparatus shown in FIG. 7A, 16 rotary transformers 105', 16 encoders 102', 16 modulators 103', and 16 drivers 104' are required for 16 heads 107.

In a circuit of the reproduction system according to this embodiment shown in FIG. 6B, only eight rotary transformers 120 are required for 16 reproduction heads 122, and the number of each of rotary transformer receivers 119, equalizers 118, AGC (automatic gain controllers) circuits 117, and comparators 116 for analog-to-digital conversion is only eight. In FIG. 6B D/A (digital-to-analog) converter 108, decoder 109, time-base correctors 110, demodulators 111, frame synchronization circuits 112, data discriminators 113, clock reproduction circuits 114, reference clock generator 115 and reproduction amplifiers 121 are also shown. In the conventional apparatus shown in FIG. 7B, however, the number of each of rotary transformer receivers 119', equalizers 118', AGC circuits 117', and comparators 116' is 16. In addition, if one intend to reduce the number of the circuits 116' to 118', the conventional apparatus requires a mixer (not shown) between the circuits 116' to 118', for mixing pieces of information from the heads opposing through 180°. An arrangement from a data discriminator 113 to a D/A converter 108 of this embodiment is substantially the same as that of the conventional apparatus.

FIG. 8 shows a schematic basic arrangement of a scanner portion of a magnetic recording and reproduction apparatus according to the second embodiment of the present invention. FIG. 9 shows a practical circuit having the arrangement shown in FIG. 8. Similar to the above first embodiment, a magnetic tape 2 is wound around the circumferential surface of a rotary drum of a scanner 1. The tape 2 is in tight contact with the circumferential surface of the rotary drum through 180°, and this contact portion serves as an effective recording area of an information signal of the tape 2. In this embodiment, recording and reproduction circuits are commonly connected to a rotary transformer. A recording circuit 3a amplifies an information signal supplied from a rotary transformer 6a and supplies the amplified signal to a magnetic head R1, thereby driving the recording magnetic head R1 by the information signal. A reproduction magnetic head P1 is arranged at a position on the rotary drum shifted from the magnetic head by 180°. An information signal reproduced from the magnetic tape by the magnetic head P1 is amplified by a reproduction circuit 4a and transmitted outside the rotary drum via the rotary transformer 6a connected to the output of the reproduction circuit 4a. A recording magnetic head R2 is driven by a recording circuit 3b. A reproduction magnetic head P2 is arranged at a position shifted from the magnetic head R2 by 180°. An information signal is amplified by a reproduction circuit 4b having an output side commonly connected to the input side of a recording circuit 3b. A rotary transformer 6b is used to transmit an RF signal to the recording circuit 3b and to transmit an RF signal outside the rotary drum portion from the reproduction circuit 4b.

An information signal to be recorded in a magnetic tape, i.e., an RF signal is amplified by a rotary transformer driving circuit 5a and transmitted into a rotary drum by a rotary transformer 6a. A recording circuit 3a having an input side connected to the rotary transformer 6a is sequentially selected between active and inactive states upon each 180° rotation by an R1 selection signal (to be described later). When the recording circuit 3a is in the active state, a magnetic head R1 is driven to record the RF signal in the magnetic tape.

Reproduction of the RF signal from the magnetic tape will be described below. The RF signal reproduced from the magnetic tape by a magnetic head P1 is amplified by a reproduction circuit 4a and supplied to the rotary transformer 6a to which the output side of the reproduction circuit 4a and the input side of the recording circuit 3a are commonly connected. The rotary transformer 6a transmits the reproduced RF signal supplied from the reproduction circuit 4a to outside the rotary drum. The reproduction circuit 4a is sequentially selected between active and inactive states upon each 180° rotation by a P1 selection signal P1. When the reproduction circuit 4a is in the active state, the RF signal reproduced from the magnetic head P1 is transmitted outside the rotary drum by a rotary transformer 6b. The reproduced RF signal transmitted from the rotary transformer 6b is received by a rotary transformer receiving circuit 7b and transmitted to a circuit at a subsequent stage. Note that an operation of a system of a rotary transformer driving circuit 5b, the rotary transformer 6b, a recording circuit 3b, a reproduction circuit 4b, and the rotary transformer receiving circuit 7b is similar to that of the above circuit.

An arrangement of an output circuit of the reproduction circuit 4 and the rotary transformer receiving circuit 7 may be the same as that of the circuit shown in FIG. 5. Note that a circuit associated with selection of the rotary transformer receiving circuit 7 is not shown.

FIG. 10 shows a series of time sequences of a selection operation of the above recording and reproduction circuits.

A method of sequentially selecting the recording or reproduction circuit upon each 180° rotation and a device therefor (to be referred to as a "selecting device" hereinafter) will be described below.

FIGS. 11A and 11B show a basic arrangement of a first arrangement of a selecting device according to the first embodiment of the present invention described above. FIG. 11A is a schematic sectional view showing a scanner (cylinder system), and FIG. 11B is a schematic plan view of the system.

A rotary drum 8 has photodetectors 13a, 13b, 14a, and 14b, and a stationary drum 9 has a recording LED (light-emitting diode) 11 and a reproduction LED 12. A recording circuit is controlled by the recording LED 11 at the stationary drum 9 side, a reproduction circuit is controlled by the reproduction LED 12, and the recording and reproduction LEDs 11 and 12 are controlled by a recording/reproduction controller 10. The photodetectors at the rotary drum 8 side for directly controlling the recording and reproduction circuits in response to control light from the recording and reproduction LEDs 11 and 12 are mounted in a rotation position corresponding to a rotation position of a recording and reproduction heads. That is, as shown in FIG. 11B. the photodetector 13a for controlling the recording circuit of a magnetic head R1 is provided at the same rotation position as that of the magnetic head R1, and the photodetector 13b for controlling the recording circuit of a magnetic head R2 is provided at the same rotation position as that of the magnetic head R2. The photodetector 14a for controlling the reproduction circuit of a magnetic head P1 is provided at the same rotation position as that of the magnetic head P1, and the photodetector 14b for controlling the recording circuit; of a magnetic head P2 is provided at the same rotation position as that of the magnetic head P2.

An operation of the selecting device described below with reference to FIGS. 11A, 11B, and 12. FIG. 13 shows a series of time sequences of the selection operation of the selecting device.

In order to simplify the explanation, assume that both the recording and reproduction LEDs 11 and 12 are turned on (to emit light) by the recording/reproduction controller 10.

A recording system will be described first. Referring to FIG. 11B. since the rotary drum 8 rotates in a direction indicated by an arrow and the positions of the photodetector 13a and the recording LED 11 coincide with each other, the photodetector 13a outputs an "H" signal. Therefore, since the output of the photodetector 13a is connected to the set input terminal of a set/reset flip-flop 15a, the "H" signal is output from the Q output terminal of the flip-flop 15a. When the rotary drum 8 further rotates in the direction indicated by the arrow shown in FIG. 11B, the output from the photodetector 13a goes to "L", when the rotary drum 8 rotates through 180°, an output from the photodetector 13b connected to the reset input terminal of the flip-flop 15a goes to "H". Therefore, a Q output from the flip-flop 15a goes to "L". Thereafter, Q and $\overline{Q}$ outputs from the flip-flop 15a sequentially, repeatedly go to "H" and "L" upon each 180° rotation of the rotary drum 8. The Q output of "H" level from the flip-flop 15a controls the R1 recording circuit to be in an active state, while the Q output of "L" level controls the R1 recording circuit to be in an inactive state. The $\overline{Q}$ output of "H" level from the flip-flop 15a controls the R2 recording circuit to be in an active state, while the $\overline{Q}$ output of "L" level controls the R2 recording circuit to be in an inactive state.

An operation of a circuit of the reproduction system is basically the same as that of the recording circuit. Note that the photodetector 14a starts its operation 90° after the photodetector 13a and the photodetector 14b starts its operation 90° after the photodetector 13b. Q and $\overline{Q}$ outputs from a set-reset flip-flop 15b sequentially go to "H" and "L" upon each 180° rotation of the rotary drum 8. When the Q output from the flip-flop 15b is at "H" level, the P1 reproduction circuit is set in an active state. When the Q output is at "L" level, the P1 reproduction circuit is set in an inactive state. When the $\overline{Q}$ output from the flip-flop 15b is at "H" level, the P2 reproduction circuit is set in an active state. When the $\overline{Q}$ output is at "L" level, the P2 reproduction circuit is set in a inactive state.

Note that the recording and reproduction LEDs 11 and 12 are ON/OFF-controlled in accordance with a mode of a VTR. That is, only the recording LED 11 is turned on in a recording mode, only the reproduction LED 12 is turned on in a reproduction mode, and both the recording and reproduction LEDs 11 and 12 are turned on in a simultaneous reproduction/recording mode.

Figure 14A:
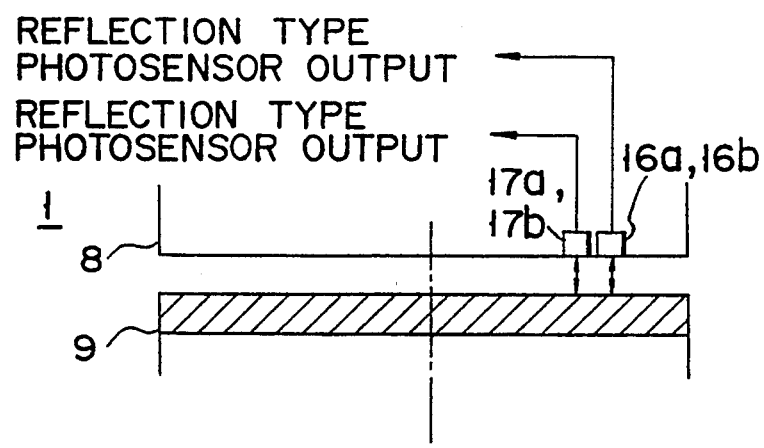
Figure 14B:
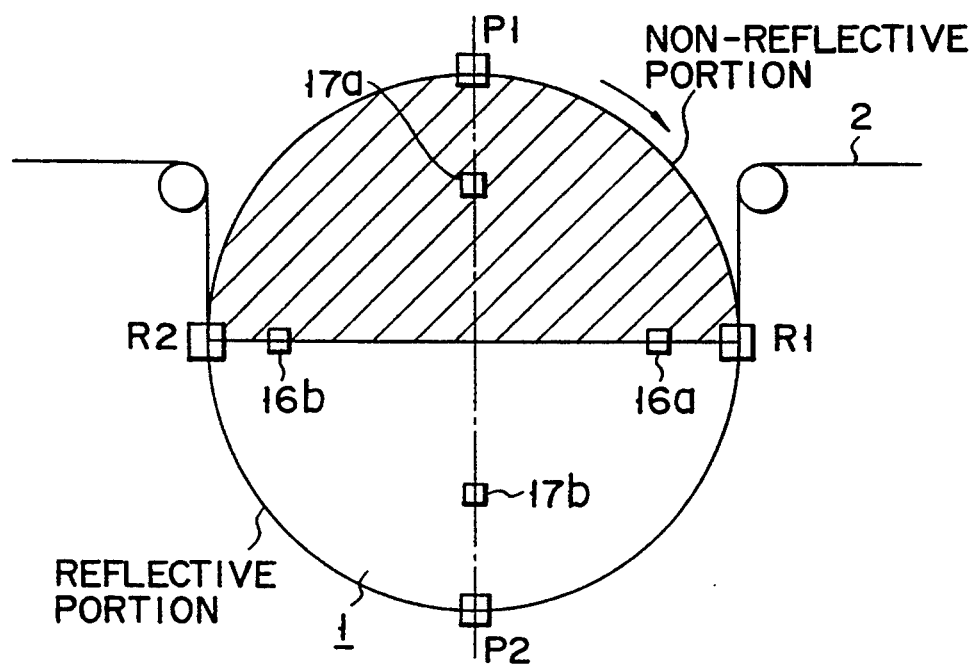

FIGS. 14A and 14B show a basic arrangement of a second arrangement of the selecting device. FIG. 14A is a schematic sectional view showing a scanner system, and FIG. 14B is a schematic plan view of the system. In this arrangement, as shown in FIG. 14B, reflection type photo sensors 16a, 16b, 17a, and 17b for controlling recording and reproduction are mounted at a rotary drum 8 side at positions corresponding to magnetic heads R1, R2, P1, and P2, respectively. If an angle of an effective recording area is 180°, a reflective portion, e.g., a mirror is arranged at a recording side of a stationary drum 9, and a non-reflective portion which cannot be detected by a reflection type photo sensor is arranged at its nonrecording side. Note that each of the reflection type photo sensors 16a, 16b, 17a. and 17b is a unit constituted by an LED 18 and a photodetector 19 such as a photodiode or phototransistor as shown in FIG. 15. Various: types of reflection type photo sensors are available. For example, an "H" signal is output when a reflective portion is present on an opposing surface, and an "L" signal is output when no reflective portion is present.

In this embodiment, an arrangement using a photo sensor which outputs the signals as described above is used. The rotary drum rotates in a direction indicated by an arrow shown in FIG. 14B, and the recording circuit of the magnetic head R1 is controlled by the reflection type photo sensor 16a and set in an active state when it passes through a recording area side having a reflective portion. The recording circuit is set in an inactive state when it passes through a non-reflective portion. Similarly, the recording circuit of the magnetic head R2 is controlled by the reflection type photo sensor 16b, the reproduction circuit of the magnetic head P1 is controlled by the reflection type photo sensor 17b, and the reproduction circuit of the magnetic head P2 is controlled by the reflection type photo sensor 17b. In this embodiment, the reflection type photo sensors 16 16b, 17a, and 17b generate a 180° selection signal which can be input directly to the recording or reproduction circuit. In this case, selection between recording and reproduction is performed by a signal supplied to the photo sensors 16a, 16b, 17a, and 17b via, e.g., a slip ring.

According to the arrangement of this embodiment, in the arrangement of the stationary drum side, a glass mask having a reflective portion corresponding to only an effective recording area need only be arranged, and a mechanism of the scanner is simplified.

FIGS. 16A and 16b show a basic arrangement of a third arrangement of the selecting device. FIG. 16A is a schematic sectional view showing a cylinder system, and FIG. 16B is a schematic plan view of the system. In this arrangement, as shown in FIG. 16B, photodetectors 20d, 20b, 21a, and 21b for recording and reproduction are mounted in a rotary drum 8 at positions corresponding to magnetic heads R1, R2, P1, and P2, respectively. In a stationary drum 9, if an angle of an effective recording area is 180°, a plurality of recording LEDs and reproduction LEDs are densely arranged in an arcuated pattern each within a range corresponding to the effective recording area in correspondence with the photodetectors 20a, 20b, 21a, and 21b. In this embodiment, a plurality of LEDs for recording and reproduction are recording and reproduction LED arrays 22 and 23.

A recording circuit is controlled by the recording LED array 22 at the stationary drum side, a reproduction circuit, is controlled by the reproduction LED array 23, and the recording and reproduction LED arrays 22 and 23 are controlled by a recording/reproduction controller 24. The photodetectors at the rotary drum side for directly controlling the recording and reproduction circuits in response to control light from the recording and reproduction LED arrays 22 and 23 are provided at positions corresponding to recording and reproduction heads as shown in FIG. 16B. The photodetector 20a for controlling the recording circuit of a magnetic head R1 is arranged at a position corresponding to the magnetic head R1 and the photodetector 20b for controlling the recording circuit of a magnetic head R2 at a position shifted from the magnetic head R1 by 180° is arranged at a position corresponding to the magnetic head R2. The photodetector 21a for controlling the reproduction circuit of a magnetic head P1 is provided at a position corresponding to the magnetic head P1, and the photodetector 21b for controlling the reproduction circuit of a magnetic head P2 at a position shifted from the magnetic head P1 by 180° is mounted in a position corresponding to the magnetic head P2.

An operation of the above selecting device will be described below.

The rotary drum 8 rotates in a direction indicated by an arrow shown in FIG. 16B. and the recording circuit of the magnetic head R1 is controlled by the photodetector 20a. That is, the recording circuit of the magnetic head R1 is set in an active state while the photodetector 20a opposes the recording LED array 22 corresponding to the recording area, and set in a disable state while the photodetector 20a passes through a region in which the recording LED array 22 is not present. Similarly, the recording circuit of the magnetic head R2 is controlled by the photodetector 20b. The reproduction circuit of the magnetic head P1 is controlled by the photodetector 21a. That is, the reproduction circuit of the magnetic head P1 is set in an active state while the photodetector 21a opposes the reproduction LED array 23 corresponding to the recording area, and set in an inactive state while the photodetector 21a passes through a region in which the reproduction LED array 23 is not present. The reproduction circuit of the magnetic head P2 is controlled by the photo-detector 21b. In this arrangement, the photodetectors 20a, 20b, 21a, and 21b generate a 180° selection signal which can be input directly to the recording or reproduction circuit.

According to the above arrangement, in the stationary drum, since a plurality of LEDs corresponding to the effective recording area need only be arranged, a mechanism of the cylinder system is simple.

Note that although an LED is used as a light-emitting element for use in recording/reproduction control in each of the above arrangements, another light-emitting element such as an EL (electro-luminescence), a semiconductor laser, or a plasma display may be used.

In the above embodiment, a rotary drum type VTR has been described. The present invention, however, can be applied to a VTR of a disc type or a medium drum type as another magnetic head mounting system.

In the above embodiment, selection is performed between a rotary transformer having one channel and a recording or reproduction circuit having two channels. Switching, however, can be similarly performed for a recording or reproduction circuit or a recording and reproduction circuit having more channels. For example, if a recording head and a recording circuit have eight channels, a reproduction head and a reproduction circuit have eight channels, and an effective recording area angle is 180°, a rotary transformer need only have eight channels.

As has been described above, by sequentially selecting a recording or reproduction circuit or a recording and reproduction circuit between active and inactive states, the number of channels of a rotary transformer can be reduced to be 1/n (n=360/R: where R is the effective recording area angle and n is a natural number) the number of magnetic heads and recording circuits, magnetic heads and reproduction circuits, or magnetic heads and circuits for performing both recording and reproduction.

Since n recording or reproduction circuits or n recording and reproduction circuits are sequentially selected between active and inactive state, power consumption of the circuits can be reduced. In addition, by reducing the number of channels of a rotary transformer to be 1/n, a mechanism of a scanner portion can he simplified to improve reliability. As a result, the system can be made compact and light in weight at a low manufacturing cost, and the numbers of driver circuits and receiver circuits of the rotary transformer can be 1/n.

Furthermore, since the number of channels of the rotary transformer can be reduced to be 1/n, inertia of a rotary drum is reduced to reduce a load on a rotary drum motor, and rotation of the rotary drum can reach a static rotational speed within a short time period, thereby reducing a time required for starting transmission of an image.

As described above, the problems of the conventional apparatuses can be solved by commonly connecting recording or reproduction circuits or recording and reproduction circuits, mounted together with magnetic heads on a rotary drum, for performing recording or reproduction of an information signal to a rotary transformer, and sequentially, selectively selecting the recording or reproduction circuits or recording and reproduction circuits to an active state in accordance with a rotation position of the rotary drum.

The recording or reproduction circuits or recording and reproduction circuits are arranged at different angular positions with respect to a rotation angular direction of a rotary drum, i.e., a rotary member of a rotary transformer. Therefore, if the circuits are commonly connected to a rotary transformer in which a single winding is provided in a single winding slot as in a conventional transformer, the position in a rotation angular direction of lead wires of the rotary member of the rotary transformer differs from that in a rotation angular direction of the circuits by a maximum of 180°. In this case, a circuit having a larger difference with respect to the position in the rotation angular direction of the lead wires of the rotary member of the rotary transformer requires a longer cable for coupling a driver or receiver circuit, i.e., the recording or reproduction circuits or recording and reproduction circuits, and the rotary transformer. Therefore, a coupling capacitance between the driver or receiver circuit and the rotary transformer is increased to degrade transmission characteristics. As a result, a difference may be produced between characteristics of the n recording or reproduction circuits or recording and reproduction circuits.

Figure 17:
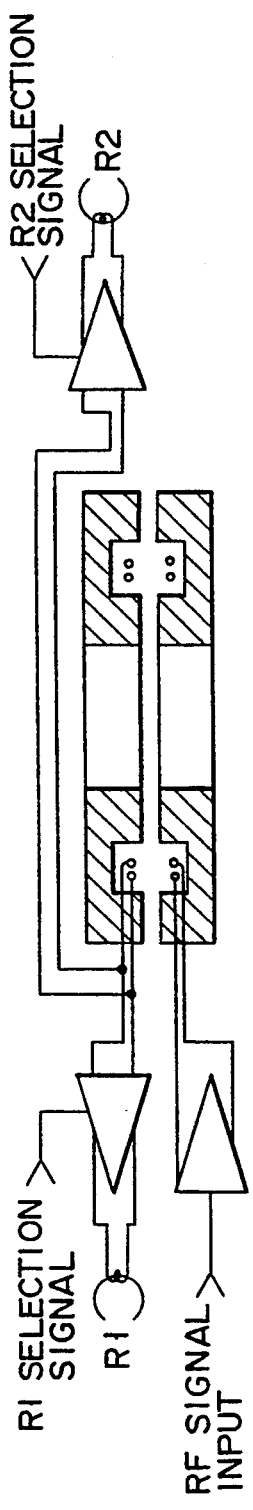
FIG. 17 is a schematic view for explaining an arrangement of a rotary transformer portion of one channel and its peripheral circuit associated with the recording system according to the first embodiment of the present invention.
Figure 18:
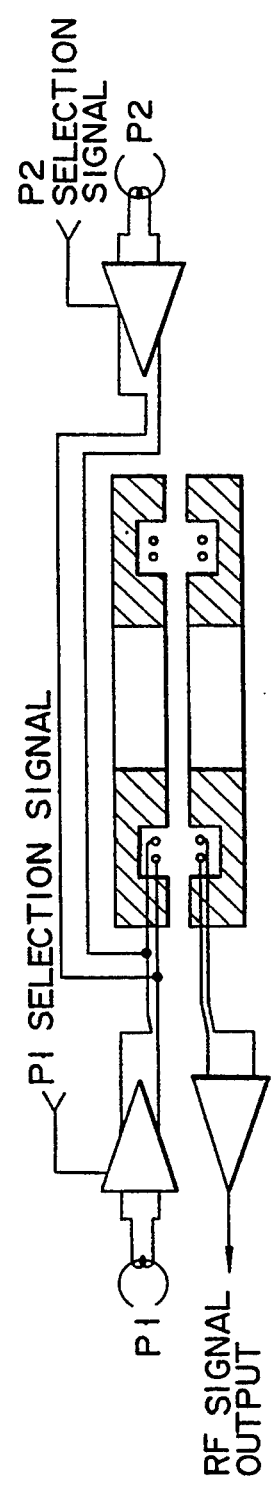
FIG. 18 is a schematic view for explaining an arrangement of a rotary transformer portion of one channel and its peripheral circuit associated with the reproduction system according to the first embodiment of the present invention.
Figure 19:
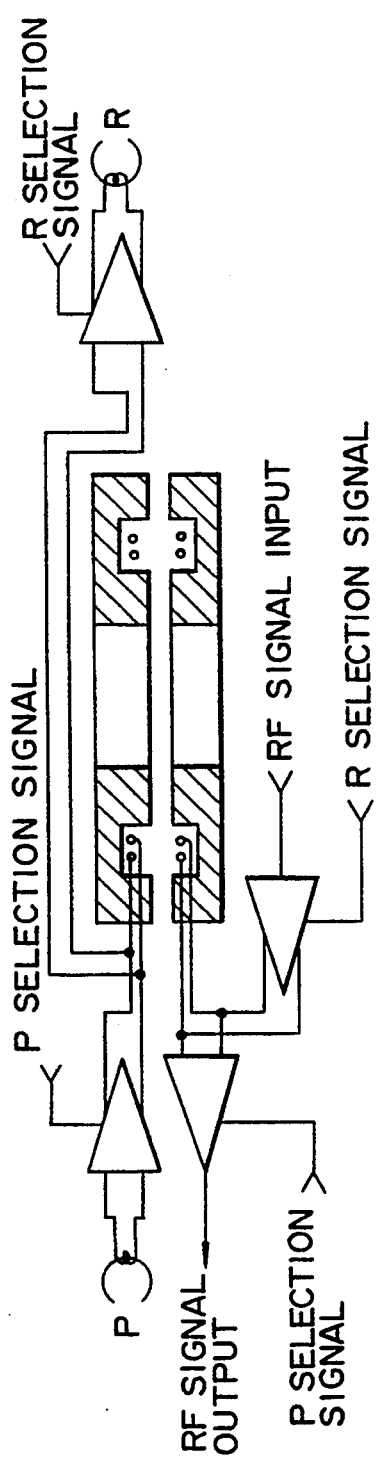
FIG. 19 is a schematic view for explaining an arrangement of a rotary transformer portion of one channel and its peripheral circuit associated with the recording and reproduction systems according to the second embodiment of the present invention.

For example, FIG. 17 shows an arrangement of a rotary transformer portion of one channel according to the above first embodiment in which two recording heads R1 and R2 are arranged in positions shifted by 180°, FIG. 18 shows an arrangement of a rotary transformer portion of one channel according to the above first embodiment in which two reproduction heads P1 and P2 are arranged in positions shifted by 180°, and FIG. 19 shows a rotary transformer portion of one channel according to the above second embodiment in which a recording head R and a reproduction head P are arranged in positions shifted by 180°. As is apparent from FIGS. 17, 18, and 19, the length of wiring must be increased.

As described above. when circuits arranged in different directions with respect to a rotation angular direction of a rotary member of a rotary transformer are to be sequentially selected to an active state, the positions in rotation angular directions of the circuits differ from the position in the rotation angular direction of the lead wires of the rotary member of the rotary transformer by a maximum of 180°. Therefore, a circuit having a larger difference from the position in the rotary angular direction of the lead wires of the rotary member of the rotary transformer requires a longer cable for coupling with respect to the driver or receiver circuit, thereby increasing a coupling capacitance between the driver or receiver circuit and the rotary transformer to degrade transmission characteristics. As a result, a difference may be produced between characteristics of the n recording or reproduction circuits or recording and reproduction circuits.

In an arrangement in which recording or reproduction circuits or circuits for performing both recording and reproduction arranged in different directions with respect to a rotation angular direction of a rotary member of a rotary transformer are sequentially, selectively selected to an active state, thereby reducing the number of channels of the rotary transformer, therefore, a rotary transformer apparatus can be arranged as follows in order to minimize a coupling capacitance between a driver or receiver circuit and the rotary transformer and to minimize a difference between circuits or recording and reproduction circuits.

That is, by arranging a plurality of windings in a single winding slot of a rotary member, a stationary member, or both the rotary and stationary members, a lead position of lead wires of each of a plurality of windings arranged in a single slot can be arranged to coincide with the position of a corresponding recording or reproduction circuit or recording and reproduction circuit in the rotation angular direction of the rotary transformer. In addition, a circuit for setting a high in an output stage of each of n reproduction circuits commonly connected in parallel with the above rotary transformer in an inactive state may be provided to prevent the reproduction circuit in an inactive state from adversely affecting another circuit.

FIG. 20 is a plan view showing a rotary member of a rotary transformer apparatus according to the third to fifth embodiments of the present invention. An arrangement in which an effective recording area angle is 180° will be described. Two windings 33a and 33b are wound around a winding slot 32 annularly formed in a ferrite core 31. Lead wires 34a and 34b of the two windings 33a and 33b, respectively, are led at positions having entirely different rotation angular directions (positions shifted by 180° in FIG. 20) of a rotary transformer.

FIG. 21 shows an arrangement in which a rotary transformer apparatus 42 of the third embodiment of the present invention comprising a rotary member (rotor) 35 having the arrangement shown in FIG. 20 and a stationary member (stator) 36 in which a single winding is wound in a winding slot is used for recording. An information signal (RF signal) to be recorded in a magnetic tape is amplified by a rotary transformer driving circuit 40 and transmitted into a rotary drum via the rotary transformer apparatus 42. Two magnetic heads R1 and R2 are arranged at positions shifted by 180°. Recording circuits 41a and 41b connected to the two magnetic heads R1 and R2, respectively, are arranged at positions in the rotary drum shifted by 180° so as to minimize a cable length to obtain a minimum connection capacitance. Note that the RF signal to be input to the rotary transformer driving circuit 40 includes both information signals to be recorded by the magnetic heads R1 and R2 and these signals must be transmitted to the heads R1 and R2 with minimum degradation in characteristics. One recording circuit 41a, therefore, is connected to the lead wires 34a from the first winding wound in the winding slot of the rotary member 35, and the other recording circuit 41b is connected to the lead wires 34b from the second winding wound in the winding slot of the rotary member 35. A winding 37 provided in a slot formed in the stationary member 36 is positioned at substantially the central portion between the two windings 33a and 33b provided in the rotary member 35 opposing the stationary member 36. With this arrangement, since the lead wires 34a and 34b are arranged in the rotary drum to oppose each other with an angle of 180° therebetween, connection distances from the recording circuits 41a and 41b to the windings 33a and 33b, respectively, can be minimized. Therefore, a coupling capacitance between the circuits and the rotary transformer and a difference between the two recording circuits can be minimized. The recording circuits 41a and 41b are sequentially selected between active and inactive states upon each 180° rotation by R1 and R2 selection signals, respectively. When the recording circuit is in the active state, the magnetic head R1 or R2 is driven to record an RF signal in a magnetic tape (not shown).

In this arrangement, signal transmission is alternately performed between the windings 37 and 33a and between the windings 37 and 33b each time the rotary drum rotates through 180°. If, however, an input impedance of the recording circuit 41b is low while a signal is transmitted between the windings 37 and 33a or an input impedance of the recording circuit 41a is low while a signal is transmitted between the windings 37 and 33b, transmission characteristics are degraded. The input impedance of the recording circuit 41b, therefore, must be high while a signal is transmitted between the windings 37 and 33a, and the input impedance of the recording circuit 41a must be high while a signal is transmitted between the windings 37 and 33b. For this purpose, an emitter follower or a Darlington emitter follower is used as a circuit at an input stage of each of the recording circuits 41a and 41b so as not to cause degradation in transmission characteristics, thereby increasing the input impedance.

FIG. 22 shows a series of time sequences of a selection operation of the recording circuits.

The recording circuits 41a and 41b are sequentially selected between active and inactive states upon each 180° rotation by the R1 and R2 selection signals, respectively. When the recording circuits 41a and 41b are in an active state, input RF signals drive the magnetic heads R1 and R2 to supply R1 and R2 recording currents to the magnetic heads, respectively. As a result, the RF signals corresponding to the currents are recorded in a magnetic tape.

FIG. 23 shows the fourth embodiment of the present invention in which a rotary transformer apparatus 42 comprising a rotary member 35 having the arrangement as shown in FIG. 20 and a stationary member 36 in which a single winding is wound in a winding slot is used for reproduction.

RF signals reproduced from a magnetic tape by magnetic heads P1 and P2 are amplified by reproduction circuits 43a and 43b, respectively. The rotary transformer apparatus 42 is driven by outputs from the reproduction circuits 43a and 43b to transmit the reproduced RF signals outside a rotary drum. As is apparent from a series of time sequences of a selection operation of the reproduction circuits shown in FIG. 24, the reproduction circuits 43a and 43b are sequentially selected between active and inactive states upon each 180° rotation by P1 and P2 selection signals, respectively. When the reproduction circuit is in an active state, an RF signal obtained from a P1 or P2 reproduced signal reproduced from the magnetic head P1 or P2, respectively, is transmitted outside the rotary drum. The reproduced RF signal is received by a rotary transformer receiving circuit 44 and transmitted to a circuit at a subsequent stage.

In this arrangement, the two magnetic heads P1 and P2 are arranged in positions shifted by 180°. In order to minimize a cable length to obtain a minimum connection capacitance, the two reproduction circuits 43a and 43b connected to the magnetic heads P1 and P2, respectively, are arranged in the rotary drum to oppose each other with an angle of 180° therebetween. An RF signal to be input to the rotary transformer receiving circuit 44 must include both information signals to be reproduced by the magnetic heads P1 and P2, and these signals must be transmitted from the heads P1 and P2 with minimum degradation in characteristics. One reproduction circuit 43a, therefore, is connected to lead wires 34a of a first winding 33a wound in a winding slot of the rotary member 35, and the other reproduction circuit 43b is connected to lead wires 34b of a second winding 33b wound in a winding slot of the rotary member 35. With this arrangement, since the lead wires 34a and 34b are arranged at positions in the rotary drum shifted by 180°, connection distances from the reproduction circuits 43a and 43b to the windings 33a and 33b of the rotary transformer, respectively, can be minimized. Therefore, a coupling capacitance between the circuits and the rotary transformer and a difference between the two circuits can be minimized. The reproduction circuits 43a and 43b are sequentially selected between active and inactive states upon each 180° rotation by P1 and P2 selection signals, respectively. A reproduction circuit in an active state drives the magnetic head P1 or P2 to reproduce an RF signal from the magnetic head.

Outputs from the reproduction circuits 43a and 43b are connected to the same rotary transformer apparatus 42. Therefore, in order to prevent degradation in frequency characteristics in a reproduction circuit in an active state, an output from a reproduction circuit in a inactive state is set in a high-impedance state. For this purpose, a circuit similar to that shown in FIG. 5 is used to increase the impedance of an output from the reproduction circuit. Note that although only one output side is shown in FIG. 5, outputs from the reproduction circuits are parallel outputs.

FIG. 25 shows the fifth embodiment of the present invention in which a rotary transformer apparatus 42 comprising a rotary member 35 having the arrangement as shown in FIG. 20 and a stationary member 36 in which single winding is wound in a winding slot is used for both recording and reproduction. In this embodiment, recording and reproduction are alternately performed each time the rotary drum rotates through 180°.

A recording circuit 45 amplifies an information signal from the rotary transformer apparatus 42 and supplies the amplified signal to a magnetic head R, thereby driving the head R. A magnetic head P is arranged in a position shifted by 180° from the magnetic head R. The information signal is reproduced from a magnetic type by the magnetic head P, amplified by a reproduction circuit 46, and transmitted outside the rotary drum by the rotary transformer apparatus 42 connected to the output side of the reproduction circuit 46. An information signal (RF signal) to be recorded in the magnetic tape is amplified by a rotary transformer driving circuit 47 and transmitted into the rotary drum by the rotary transformer apparatus 42. As is apparent from a series of time sequences of a selection operation of the recording and reproduction circuits shown in FIG. 26, the recording circuit 45 is sequentially selected between active and inactive states upon each 180° rotation by an R selection signal. When the recording circuit is in an active state, it drives the magnetic head R by an R recording current to record the RF signal in the magnetic tape.

Reproduction of an RF signal from a magnetic tape will be described below. An RF signal reproduced from a magnetic tape by the magnetic head P is amplified by the reproduction circuit 46 to drive the rotary transformer apparatus 42. The rotary transformer apparatus 42 transmits the RF signal outside the rotary drum. As is apparent from a series of time sequences of the selection operation of the recording and reproduction circuits shown in FIG. 26, the reproduction circuit 46 is sequentially selected between active and inactive states upon each 180° rotation by a P selection signal. When the reproduction circuit is in an active state, it transmits a reproduced output as an RF signal reproduced by the magnetic head P to outside the rotary drum. The reproduced RF signal transmitted from the apparatus 42 is received by a rotary transformer receiving circuit 48 and transmitted to a circuit at a subsequent stage.

In this arrangement, the two magnetic heads R and P are arranged in positions shifted by 180°. In order to minimize a cable length to obtain a minimum connection capacitance, the recording and reproduction circuits 45 and 46 connected to the two magnetic heads are arranged in the rotary drum at positions shifted by 180°.

These signals must be transmitted from an RF signal input to the magnetic head R upon recording and from the magnetic head P to an RF signal output upon reproduction with minimum degradation in characteristics. The recording circuit. 45, therefore, is connected to lead wires 34b of a second winding 33b wound in a winding slot of the rotary member 35, and the reproduction circuit 46 is connected to lead wires 34a of a first winding 33a wound in a winding slot of the rotary member 35. With this arrangement, since the lead wires 34a and 34b are arranged at positions in the rotary drum shifted by 180°, a connection distance from the recording circuit 45 to the winding 33b of the rotary transformer and that from the reproduction circuit 46 to the winding 33a of the rotary transformer can be minimized. As a result, a coupling capacitance between the circuits and the rotary transformer can be minimized to achieve minimum degradation in characteristics.

In this arrangement, the recording and reproduction circuits 45 and 46 are connected to the same rotary transformer apparatus 42. In order to prevent degradation in frequency characteristics of a circuit in an active state, therefore, an input of the recording circuit in an inactive state and an output of the reproduction circuit in an inactive state are set in a high-impedance state. A method of obtaining a high impedance is the same as that of the above two embodiments.

In each of the above third to fifth embodiments, an arrangement in which the above technique is applied to only a rotary member has been described by taking a flat type one-channel rotary transformer apparatus as an example. The above technique, however, can be applied to a stationary member. In addition, the above technique can be applied also to a coaxial type rotary transformer apparatus. Furthermore, the above technique can be applied regardless of the number of channels or the number of turns of a winding of a rotary transformer apparatus.

In a rotary transformer apparatus as described above, transmission characteristics may be changed due to rotation of a rotary drum, i.e., rotation of a rotary transformer. Such a change in transmission characteristics significantly appears when the number of turns of a winding is small and is most conspicuous when a winding has only one turn. Since the number of turns of a winding must be reduced as the frequency of a transmission signal is increased, the number of turns is reduced as the band and transmission rate of a VTR using the rotary transformer are widened and increased, respectively.

For example, an arrangement in which windings 53 and 54 each having one turn are wound in a winding slot of one member (one of stationary and rotary members) 51 of a rotary transformer and a winding 55 having one turn is wound in a winding slot of the other member 52 as shown in FIGS. 27 and 28 will be described below.

Referring to FIG. 27, the one-turn winding 55 of the member 52 is wound in a central portion of the winding slot. With this arrangement, it is assumed that transmission characteristics between the windings 53 and 54 wound around the member 51 and the winding 55 wound around the member 52 are substantially equal to each other provided that the members and the windings are ideally arranged. Actually, however, it is impossible to wind, e.g., the winding 55 in the central portion of the winding slot throughout 360°. Upon rotation, therefore, transmission characteristics between the windings 53 and 55 or windings 54 and 55 are changed.

As shown in FIG. 28, the one-turn winding 55 of the member 52 may be shifted to one side of the winding slot. In this case, a change in transmission characteristics caused upon rotation between the opposing windings 54 and 55 can be reduced to a negligible level. A change in transmission characteristics between the windings 53 and 55 which do not oppose each other, however, is caused more easily than when the winding 55 is wound in the central portion of the winding slot. In addition, a large difference is produced between the transmission characteristics between the windings 53 and 55 and those between the windings 54 and 55. When the rotary transformer is used, the windings 53 and 54 are selectively used. It is, therefore, not preferred that a difference is produced between the transmission characteristics between the windings 53 and 55 and those between the windings 54 and 55.

As described above, in a rotary transformer apparatus for transmitting signals between rotary and stationary members, in which a plurality of windings are arranged in a single slot of the rotary member and a single winding is arranged in a slot of the stationary member or a plurality of windings are arranged in a single slot of the stationary member and a single winding is arranged in a slot of the rotary member, transmission characteristics between a plurality of transmission paths are preferably, constantly uniform.

In the embodiments of the present invention, therefore, the thickness or width of a winding of a member in which a single winding is arranged is increased to be larger than that of each of a plurality of windings of a member in which a plurality of windings are arranged, thereby obtaining constantly uniform transmission characteristics between a plurality of transmission paths. As described above, this method is most effective when a winding has only one turn. In each of the following embodiments. therefore, an arrangement in which two one-turn windings are wound around one member and single one-turn winding is wound around the other member will be described.

FIG. 29 schematically shows a rotary transformer apparatus used in the sixth embodiment of the present invention.

In this embodiment, a winding 56 of a member 52 is constituted by a wire thicker than that of windings 53 and 54 of a member 51 and wound in a winding slot of the member 52 so that a portion corresponding to ½ of a wire diameter projects from the slot. When an opposing surface S of the member 52 with respect to the member 51 is polished, the winding 56 is simultaneously polished to obtain a semicircular section. Since the polished surface of the winding 56 uniformly opposes the windings 53 and 54, no difference is produced between transmission characteristics between the windings 53 and 56 and those between the windings 54 and 56, and a change in transmission characteristics caused upon rotation can be suppressed.

FIG. 30 schematically shows a rotary transformer apparatus used in the seventh embodiment of the present invention.

In this embodiment, since a winding 57 of a member 52 is constituted by a metal foil such as a copper foil, no difference is produced between transmission characteristics between windings 53 and 57 and those between windings 54 and 57, and a change in transmission characteristics caused upon rotation can be suppressed. In this arrangement, the metal foil is fixed on a member by an adhesive or the like.

FIG. 31 schematically shows a rotary transformer apparatus used in the eighth embodiment of the present invention.

In this embodiment, since a winding 58 of a member 52 is constituted by a metal plate, no difference is produced between transmission characteristics between windings 53 and 58 and those between windings 54 and 58, and a change in transmission characteristics caused upon rotation can be suppressed. In this arrangement, the metal plate is formed to have a shape corresponding to the shape of a winding slot and then fitted in the slot. If, however, the member 52 consists of a conductor, a problem may be posed in characteristics unless the member 52 and the winding 58 are electrically insulated from each other.

FIG. 32 schematically shows a rotary transformer apparatus used in the ninth embodiment of the present invention which solves the above problem of insulation.

In this embodiment, since a winding 59 of a member 52 is constituted by a printed wiring board composed of an insulating plate 59A and a conductor foil 59B, no difference is produced between transmission characteristics between windings 53 and 59 and those between windings 54 and 59, and a change in transmission characteristics caused upon rotation can be suppressed. In this arrangement, although not shown in FIG. 32, two side portions of the conductor foil 59B are not in direct contact with the inner walls of a winding slot of the member 52, thereby electrically insulating the member 52 and the winding 59 from each other.

FIG. 33 schematically shows a rotary transformer apparutus used in the tenth embodiment of the present invention.

In this embodiment, since a winding 60 of a member 52 is formed by deposition of a conductive metal, no difference is produced between transmission characteristics between windings 53 and 60 and those between windings 54 and 60, and a change in transmission characteristics caused upon rotation. In this arrangement, in order to electrically insulate the member 52 and the winding 60 from each other, an insulating material is preferably deposited before deposition of the metal. Alternatively, the winding 60 can be formed not by deposition but by, e.g., sputtering.

FIG. 34 schematically shows a rotary transformer apparatus used in the 11th embodiment of the present invention. FIG. 35 is a top view of a member 52 shown in FIG. 34.

In this embodiment, since a winding 61 of a member 52 is constituted by two windings 62 and 63 connected in parallel with each other to electrically form one turn, no difference is produced between transmission characteristics between windings 53 and 61 and those between windings 54 and 61, and a change in transmission characteristics caused upon rotation can be suppressed. The windings 62 and 63 are connected with each other at a lead port 64 and connected to external circuits via lead wires 65 and 66, respectively, of the rotary transformer.

In each of the above embodiments, the present invention has been described by taking a flat type one-channel rotary transformer as an example. The present invention, however, can be applied to a coaxial type rotary transformer apparatus. In addition, the present invention can be applied regardless of the number of channels of a rotary transformer apparatus.

In addition, in a rotary transformer apparatus for transmitting signals between a rotary member having a plurality of windings wound in a single slot and a stationary member having a single winding wound in a slot or between a stationary member having a plurality of windings wound in a single slot and a rotary member having a single winding wound in a slot, uniformity of transmission characteristics can be increased by setting a winding slot width of a member having a single winding to be different from that of a member having a plurality of windings.

For example, the width of a winding slot of a member having a single winding is set to be larger than that of a member having a plurality of slots so that a thicker (larger diameter) or wider winding can be wound. As a result, since a single winding and a plurality of windings oppose each other more easily, uniformity of transmission characteristics of a plurality of transmission paths can be improved.

With this arrangement, a core width of a member having a wider winding slot width can be made smaller than that of a member having a narrower winding slot width. Therefore, since a core opposing width is defined by the core width of the member having a wider winding slot width, an influence of variation caused by rotation can be reduced.

FIGS. 36 to 47 show arrangements of rotary transformer apparatuses according to the 12th to 23rd embodiments of the present invention obtained by adopting the above technique to the embodiments shown in FIGS. 29 to 34, respectively.

In these embodiments, similar to the embodiments shown in FIGS. 29 to 34, the effect of the present invention is remarkable when a winding is wound by one turn. In each of the following embodiments, therefore, an arrangement in which two one-turn windings are wound in one member and one one-turn winding is wound in the other member will be described.

FIGS. 36 and 37 schematically show rotary transformer apparatuses according to the 12th and 13th embodiments of the present invention, respectively.

These embodiments differ from the embodiment shown in FIG. 29 in that a winding slot width 76 of a member 52 is made wider than a winding slot width 77 of a member 51. With this arrangement, a winding 56' of the member 52 can be made thicker than the winding 56 shown in FIG. 29 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 36, the outer diameter of the member 52 can be made smaller than that of the member 51 as shown in FIG. 37. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

FIGS. 38 and 39 schematically show rotary transformer apparatuses according to the 14th and 15th embodiments of the present invention, respectively.

These embodiments differ from the embodiment shown in FIG. 30 in that a winding slot width 76 of a member 52 is made wider than a winding slot width 77 of a member 51. With this arrangement, a thin film 57' used as a winding of the member 52 can be made wider than the thin film 57 shown in FIG. 30 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 38, the outer diameter of the member 52 can be made smaller than that of the member 51 as shown in FIG. 39. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

FIGS. 40 and 41 schematically show rotary transformer apparatuses according to the 16th and 17th embodiments of the present invention, respectively.

These embodiments differ from the embodiment shown in FIG. 31 in that a winding slot width 76 of a member 52 is made wider than a winding slot width 77 of a member 51. With this arrangement, a metal plate 58' used as a winding of the member 52 can be made wider than the metal plate 58 shown in FIG. 31 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 40, the outer diameter of the member 52 can be made smaller than that of the member 51 as shown in FIG. 41. In this case, since the core opposing area is defined by core width of member 52×(core outer 25 diameter of member 52+core inner diameter of member 52)/2, a variation caused by rotation can be further reduced. As a result, a change in transmission characteristics caused by rotation can be suppressed.

FIGS. 42 and 43 schematically show rotary transformer apparatuses according to the 18th and 19th embodiments of the present invention, respectively.

These embodiments differ from the embodiment shown in FIG. 32 in that a winding slot width 76 of a member 52 is made wider than a winding slot width 77 of a member 51. With this arrangement, a printed wiring board 59' used as a winding of the member 52 can be made wider than the printed wiring board 59 shown in FIG. 32 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 42, the outer diameter of the member 52 can be made smaller than that of the member 51 as shown in FIG. 43. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 45:
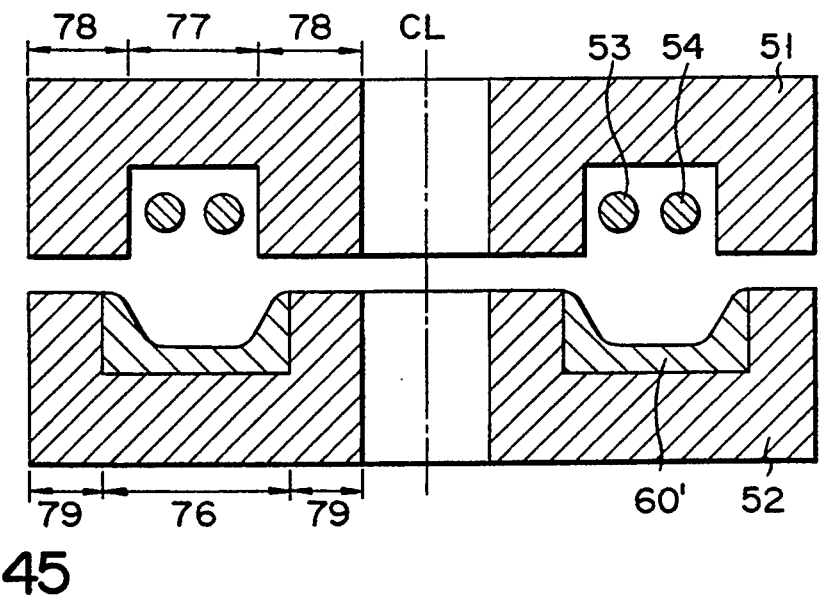
FIG. 45 is a sectional view schematically showing an arrangement of the 21st embodiment of the present invention.

FIGS. 44 and 45 schematically show rotary transformer apparatuses according to the 20th and 21st embodiments of the present invention, respectively.

These embodiments differ from the embodiment shown in FIG. 33 in that a winding slot width 76 of a member 52 is made wider than a winding slot width 77 of a member 51. With this arrangement, a deposited or sputtered film 60' used as a winding of the member 52 can be made wider than the deposited or sputtered film 60 shown in FIG. 33 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 44, the outer diameter of the member 52 can be made smaller than that of the member 51 as shown in FIG. 45. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

Figure 46:
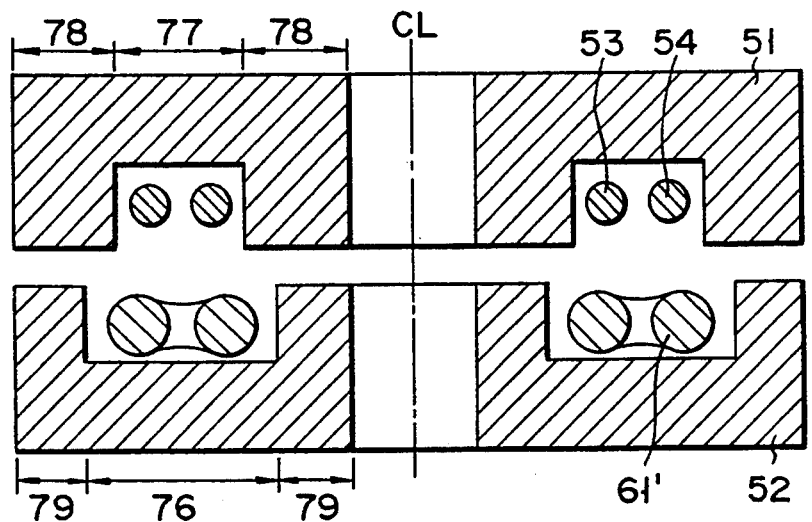
FIG. 46 is a sectional view schematically showing an arrangement of the 22nd embodiment of the present invention.
Figure 47:
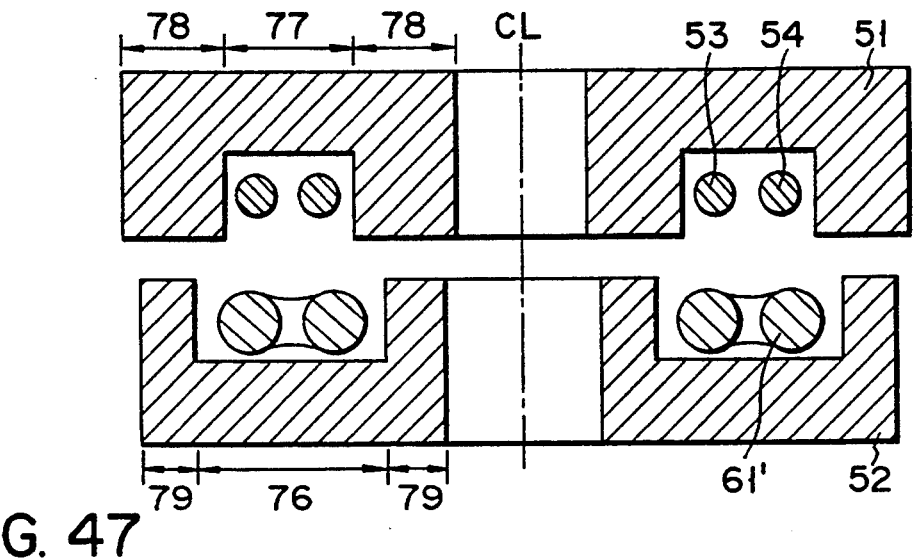
FIG. 47 is a sectional view schematically showing an arrangement of the 23rd embodiment of the present invention.

FIGS. 46 and 47 schematically show rotary transformer apparatuses according to the 22nd and 23rd embodiments of the present invention, respectively.

These embodiments differ from the embodiment shown in FIG. 34 in that a winding slot width 76 of a member 52 is made wider than a winding slot width 77 of a member 51. With this arrangement, a (double) winding 61' used as a winding of the member 52 can be made wider than the (double) winding 61 shown in FIG. 34 and therefore can be easily opposed both windings 53 and 54 of the member 51. In addition, since a core width 79 of the member 52 can be made smaller than a core width 78 of the member 51, a variation in core opposing area can be suppressed. Although only the winding slot width is changed in FIG. 46, the outer diameter of the member 52 can be made smaller than that of the member 51 as shown in FIG. 47. In this case, since the core opposing area is defined by core width of member 52×(core outer diameter of member 52+core inner diameter of member 52)/2, a variation caused by rotation can be further reduced. As a result, a change in transmission characteristics caused by rotation can be suppressed.

With a system that controls a circuit installed on a rotary drum as in the embodiments shown in FIGS. 16A, and 16B, rewriting portions of the recording track requires more rows of LEDs that control the circuit on the drum (hereinafter, referred to as the on-the-drum circuit), and reproduction needs a reproduction LED control signal to be supplied from outside the rotary drum.

To overcome these problems, an embodiment which will be explained below provides a rotary-scanning magnetic recording and reproduction apparatus that achieves various functions including partial rewriting needed in broadcasting stations, without increasing the number of LED rows controlling the on-the-drum circuit, and that enables the reproduction circuit control signal to be produced inside the rotary drum without using the LED rows controlling the on-the-drum circuit. Explanation will be made, referring to FIGS. 2, 16A, and 16B in the previous embodiments.

As shown in FIG. 2, in the scanner 1, the magnetic tape 2 is wound around the peripheral surface of the rotary drum 8 so that the effective recording area of information signal may correspond to 180°. That is, the winding angle of tape 2 to the rotary drum is 180°. On the rotary drum 8, magnetic recording heads R1 and R2 are installed 180° apart so as to face each other, and similarly magnetic reproduction heads P1 and P2 are mounted 180° apart so as to oppose one another. As shown in FIG. 16A, the fixed drum 9 is provided coaxially with the rotary drum 8 so as to face each other.

In the present embodiment, the rotary drum 8 is equipped with recording photodetectors 20a and 20b and reproduction photodetectors 21a and 21b so that those pairs of photodetectors may be located concentrically inside and in line with the recording heads R1 and R2 and reproduction heads P1 and P2, as shown in FIG. 16A. On the other hand, the fixed drum 9 is provided with recording LED rows 22 and reproduction LED rows 23, which are arranged semicircularly in the direction of rotation of the drum 8 and in the places where they are able to face the photodetectors 20a, 20b, 21a and 21b as the drum 8 rotates, so as to cover the effective recording area, that is, in this case, to cover an angle range of 180°. Each of those LED rows 22 and 23 is composed of a plurality of LEDs arranged in a semicircle.

The rotary drum 8 is equipped with recording circuits and reproduction circuits as explained later. The selection between the active and inactive states of the recording circuit is done by the recording LED rows 22, and the selection between the active and inactive states of the reproduction circuit is done by the reproduction LED rows 23, or those selection actions may be done based on the carrier sense result explained later. The selection between the active and inactive states of the recording circuit by the recording LED rows 22 is carried out for each recording circuit by, for example, turning on or off the power supply to the respective recording circuits. The control of the recording LED rows 22 and reproduction LED rows 23 is performed by a recording and reproduction control circuit 24.

The recording and reproduction apparatus of the embodiment will be explained.

As shown in FIG. 48, the inputs of the recording circuits 3a and 3b, which are connected to two rotary-side windings of a rotary transformer 6c, amplify the information signal from outside the rotary drum to drive the respective recording heads R1 and R2 spaced 180° apart and opposite each other. The information signal recorded on the magnetic tape is reproduced by the reproduction heads P1 and P2 arranged 180° apart, and then amplified by the reproduction circuits 4a and 4b. The output signals of the reproduction circuits 4a and 4b are transferred via the rotary transformer 6d to outside the rotary drum, or a rotary transformer receiver circuit 7.

The information signal to be recorded onto the magnetic tape (hereinafter, referred to as the recording RF signal) is amplified by a rotary transformer driving circuit 5, and then transferred to the rotary drum internal circuit via the rotary transformer 6c. The recording RF signal supplied to the rotary transformer driving circuit 5 contains two information signals to be recorded by the recording heads R1 and R2.

For the rotary transformers 6c and 6d, the rotary transformers used in the previous embodiments are used. Specifically, in the recording system, the primary winding of the rotary transformer 6c has a coil 6c-1 located in a winding slot on the stator side thereof, and the recording RF signal is amplified by the rotary transformer driving circuit 5, and then transferred to the rotary drum internal circuit via the rotary transformer 6c. The secondary winding of the rotary transformer 6c has two coils 6c-2 and 6c-3 located in a winding slot on the rotor side thereof, and those coils are connected to the recording circuits 3a and 3b, respectively, which allows the recording RF signal to be received by the recording circuits 3a and 3b.

In the reproduction system, the primary winding of the rotary transformer 6d has two coils 6d-2 and 6d-3 located in a winding slot on the rotor side thereof, those coils being connected to the reproduction circuits 4a and 4b, respectively, whereas the secondary winding of the rotary transformer 6d has a coil 6d-1 and is located in a winding slot on the stator side thereof. The permits the reproduction circuits 4a and 4b receive the information signal reproduced at the reproduction heads P1 and P2 (hereinafter, referred to as the reproduction RF signal).

The selecting operation sequence of the recording and reproducing circuits of the embodiment shown in FIG. 48 is similar to that shown in FIG. 4. That is, the recording circuits 3a and 3b are selected alternately in the active state or the inactive state by R1 and R2 selection signals at intervals of 180°. When the recording circuits are in the active state, the input recording RF signal is supplied to the recording head R1 or R2 to record the RF signal corresponding to R1 or R2 recording current onto the magnetic tape.

On the other hand, the RF signal reproduced from the magnetic tape by the reproduction head P1 or P2 is amplified by the reproduction circuit 4a or 4b, and then transferred to outside the rotary drum via the rotary transformer 6d.

The reproduction circuits 4a and 4b are selected in the active state or the inactive state by P1 or P2 selection signal at intervals of 180°. When the reproduction circuit 4a or 4b is in the active state, the P1 reproduction signal reproduced from the reproduction head P1 or P2 is transferred to outside the rotary drum via the rotary transformer 6d. The reproduction RF signal from the rotary transformer 6d is received by the rotary transformer receiving circuit 7, which transfers the signal to a subsequent stage. The reproduction RF signal supplied from the rotary transformer receiving circuit 7 after the selection action consists of both RF signals reproduced by the reproduction heads P1 and P2.

Since the reproduction circuits 4a and 4b used in the above embodiment have the same circuit structure and operation as that of the reproduction circuit shown in FIG. 5, its detail explanation is omitted.

This embodiment also uses a rotary transformer. Accordingly, by making the output stage of the inactive reproduction circuit a high impedance, the frequency characteristic of the active reproduction circuit is not deteriorated.

Next, the recording circuits 3a and 3b will be described. The recording circuits 3a and 3b have the function of sensing whether or not the recording RF signal is present, or a carrier detecting function. FIG. 49 is a circuit diagram of a recording circuit with such a carrier function. Only the circuit configuration of the recording circuit 3a is shown here. The recording circuit 3b also has the same arrangement.

In FIG. 49, the recording RF signal transferred from the rotary transformer 6c (FIG. 48) is supplied to input 1 and input 2 of the recording circuit 3a. The input recording RF signal is divided into two: one is supplied to an emitter follower 81 for current-amplifying the recording RF signal, and the other is supplied to a detector amplifier 82. The detector amplifier 82 amplifies the recording RF signal so that it may have a specified amplitude, and then supplies the amplified signal to a peak detector 83 of the next stage. The peak detector 83 senses the peak of the input recording RF signal and produces a sense signal voltage corresponding to the peak value detected. The sense signal voltage from the peak detector 83 is supplied to a comparator 84. The comparator 84, when the input sense signal voltage goes higher than a predetermined voltage, supplies a high level signal to an AND gate 85 of the next stage.

In this way, in the recording circuit 3a, when the recording RF signal higher than the specified amplitude is supplied, an RF detector made up of the detector amplifier 82, peak detector 83, and comparator 84 supplies a high level signal to the AND gate 85. Contrarily, when the recording RF signal lower than the specified amplitude is supplied, the RF detector supplies a low level signal to the AND gate 85. The other input of AND gate 85 is a recording circuit active input, to which a 180° selection signal (R1 selection signal) as shown in FIG. 47 is supplied from outside the recording circuit 3a.

The output signal of AND gate 85 is supplied as a control signal to an amplifier 87 via an output off circuit 86. The amplifier 87 further amplifies the recording RF signal current-amplified by the emitter follower 81, and supplies the resulting signal to output 1 and output 2.

Figure 51:
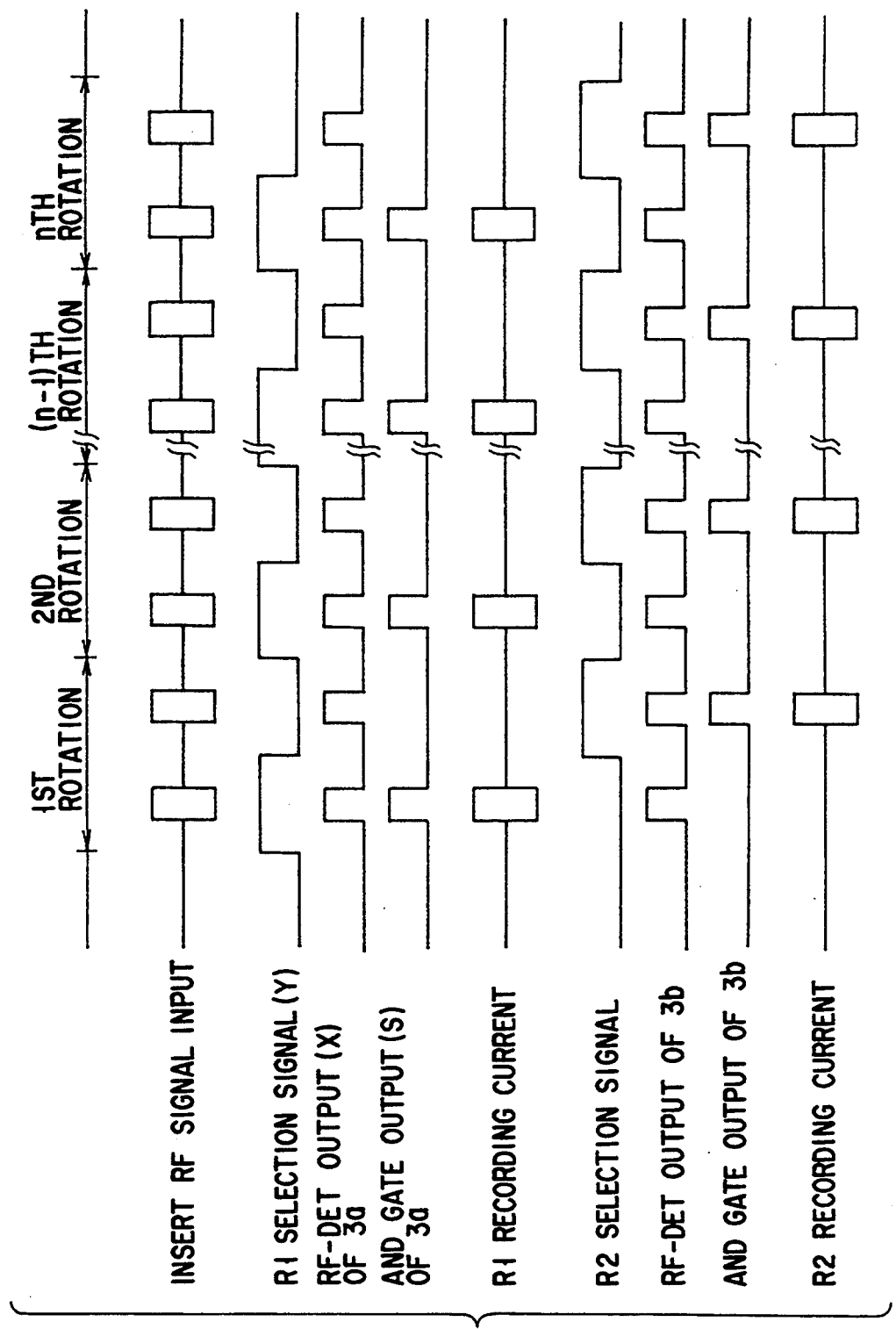
FIG. 51 is a time chart of the operation of the recording circuit of FIG. 49 during insert recording.

FIGS. 50 and 51 illustrate the operation sequence of each circuit section inside and outside the recording circuit 3a during normal recording and insert recording. As seen from the figures, when the RF detector-side input (X) and recording circuit active input (Y) of AND gate 85 both go high, the output signal (S) of AND gate 85 goes high. At this time, the output off circuit 86 brings the amplifier 87 at the output stage of the recording circuit 3a into the active state, allowing the amplifier 87 to supply to the magnetic head R1 the recording current corresponding to the recording RF signal.

Conversely, when either the RF detector-side input (X) or recording circuit active input (Y) of AND gate 85 goes low, the output signal (S) of AND gate 85 goes low, causing the output off circuit 86 to turn off the amplifier 87, and consequently the recording circuit 3a to be placed in the inactive state. This prevents the recording RF signal from being supplied, with the result that the amplifier 87 does not supply a recording current to the magnetic head R1.

This action has a significant effect particularly during insert recording in the operation sequence shown in FIG. 51. Specifically, because the rotary transformer 6c is shared by the two recording circuits 3a and 3b during insert recording, the recording circuits 3a and 3b use the R1 selection signal (Y) and RF detector output signal (X), respectively, to turn on and off the amplifier 87 by means of the AND gate 85 and output off circuit 86, thereby allowing the output of the recording RF signal. As seen from the operation sequence of FIG. 51, this makes it possible to easily rewrite portions of the track by simply transferring the recording RF signal to be inserted to the recording circuit 3a whenever insert recording is needed.

Figure 52:
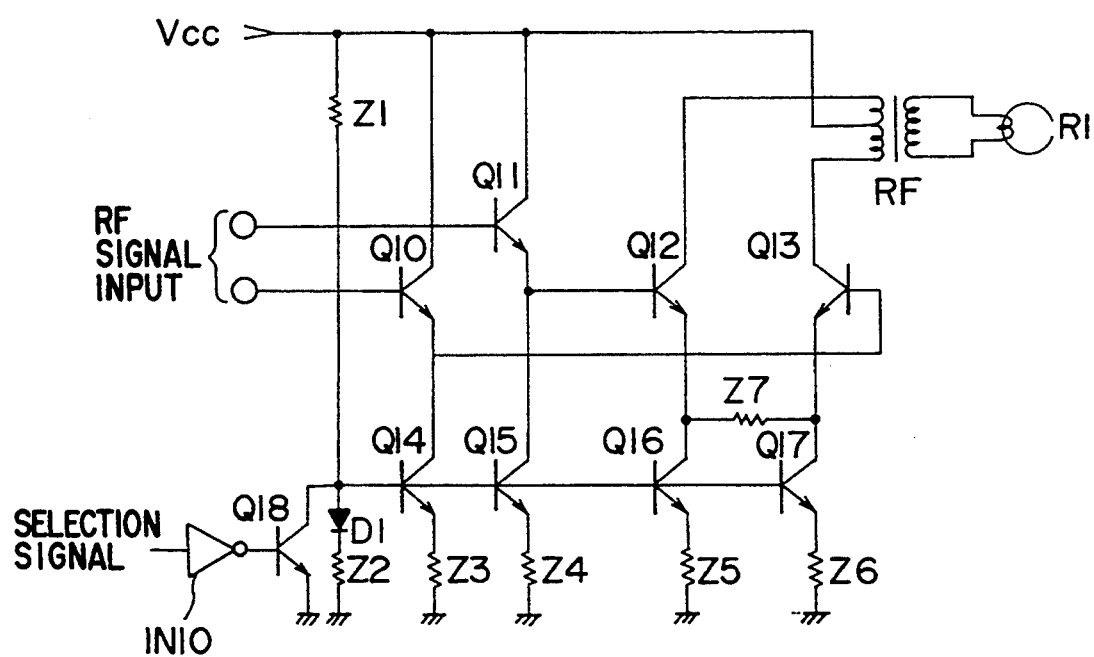
FIG. 52 is a detailed circuit diagram of an important portion of the recording circuit of FIG. 50.

Referring to FIG. 52, an embodiment of amplifier portions of the recording circuits 3a and 3b will be explained.

FIG. 52 is a detailed circuit diagram of a portion covering the emitter follower 81, output off circuit 86, and amplifier 86. This circuit includes a differential amplifier, a center-tapped RF transformer, and a constant-current circuit.

In FIG. 52, to prevent degradation of the frequency characteristics due to use of the rotary transformer 6c in the above embodiment (FIG. 48) for the input of the recording circuit, emitter followers Q10 and Q11 are used for the input stage to make the input impedance of the recording circuit high. Here, instead of normal emitter followers, Darlington emitter followers may be used. In FIG. 52, to simplify explanation, the bias of the input circuit is omitted. The recording RF signal current-amplified by emitter followers Q10 and Q11 is amplified by a differential amplifier composed of transistors Q12 and Q13 and a resistor Z7. The differential amplifier supplies the RF recording current to the recording head R1 via the RF transformer. A set of a transistor Q14 and a resistor Z3 and a set of a transistor Q15 and a resistor Z4 are constant-current circuits connected to emitter followers Q10 and Q11, respectively. A set of a transistor Q16 and a resistor Z5 and a set of a transistor Q17 and a resistor Z6 are constant-current circuits connected to the emitters of transistors Q12 and Q13, respectively. Resistors Z1 and Z2 and a diode D1 form a reference bias circuit for those constant-current circuits.

The selection signal is supplied via the inverter IN10 to the base of transistor Q18. When the selection signal is in the low level, the transistor Q18 turns on, which brings the reference bias circuit made up of the resistors Z1 and Z2 and diode D1 and the bases of transistors Q14 to Q17 into the ground potential GND, thereby preventing the recording current from flowing into the head R1.

That is, the amplifier (the emitter follower and differential amplifier) of FIG. 52 becomes inactive when the base potential of transistor Q18 is in the high level, and active when the base is in the low level. Because the selection signal is inverted by inverter IN10 and then supplied to the base of transistor Q18, when the selection signal is in the high level, the amplifier becomes active, allowing the recording current corresponding to the recording RF signal to flow into the recording head R1. In contrast, when the selection signal is in the low level, the amplifier goes inactive, preventing the recording current from flowing into the head R1. In this way, the operation explained in FIGS. 49 to 51 has been accomplished.

While in the above embodiment, the RF detector is added to the recording circuit, a similar RF detector may be added to the erasure circuit. In this case, supplying the erasure signal to the erasure circuit with the erasure timing eliminates use of the LED rows for control of the erasure circuit, which enables partial erasure similar to partial rewriting by the recording circuit.

Further, in FIG. 49, depending on the type of selection signal and the output type of the RF detector, another type of logic gate may be used in place of AND gate 85.

Next will be explained the reason why application of the present invention makes the circuit configuration of the VTR's recording and reproduction systems simpler and more compact.

Figures 53A, 53B:
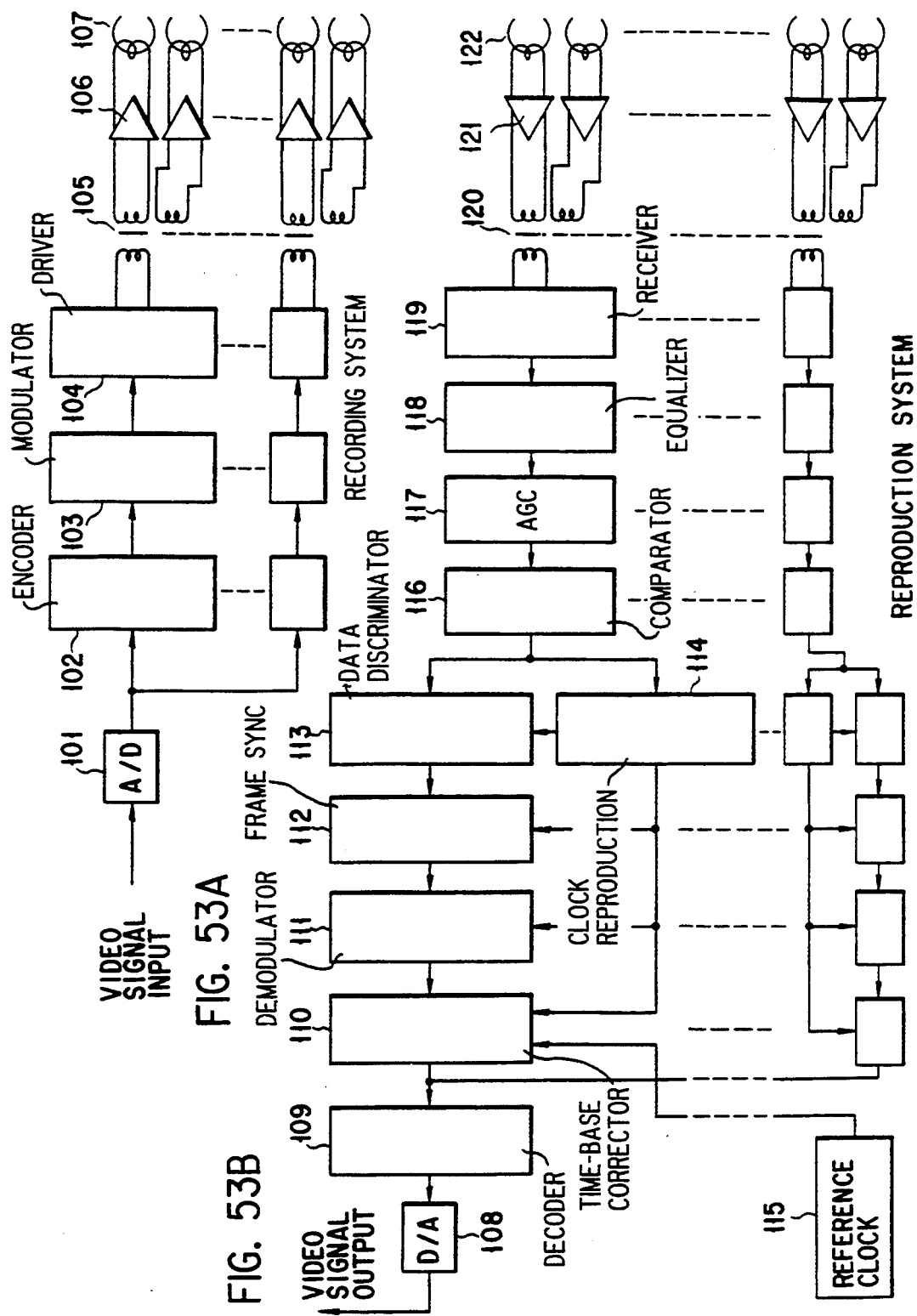
FIGS. 53A and 53B are block diagrams of the recording system and reproduction system of a VTR, respectively, to which the present invention has been applied.

FIGS. 53A and 53B are examples of the recording and reproduction systems to which the present invention has been applied, respectively. As compared with the conventional circuits of FIGS. 7A and 7B, the magnetic tape is wound around the rotary drum so as to cover an angle of 180° for both systems, with 16 magnetic heads arranged on the drum so that a set of two heads may face each other 180° apart.

In the FIG. 53A recording system, the input image signal is converted by an A/D converter 101 into a digital signal, which is in turn supplied to eight encoders 102 for encoding. The encoded image signal from each encoder 102 passes through a modulator 103 and a rotary transformer driver 104 in that order and enters one of the 8 channel stator-side (primary) windings of a rotary transformer 105. The two coils of the rotor-side (secondary) winding of each of 8 channels of the rotary transformer 105 are connected to the corresponding two of the 16 recording heads 107 via the corresponding two of the 16 recording amplifiers 106. In contrast, with the prior art, use of 16 heads has required 16 channel rotary transformers, 16 encoders, 16 modulators, and 16 rotary drivers.

Similarly, for the FIG. 53B reproduction system, use of 16 reproduction heads 122 needs the rotary transformer 120 with 8 channels, only half the number of reproduction heads. For a subsequent stage, only eight sets of a rotary transformer receiver 119, an equalizer 118, an AGC circuit 117, and a comparator 116 for binarization are required. In contrast, the prior art has required 16 sets of the rotary transformer 119, equalizer 118, AGC circuit 117, and comparator 116 as shown in FIG. 7B. Further, although not shown, the conventional equivalent requires a mixing circuit for mixing the reproduction signals from the heads 180° apart, between elements 116 to 118. The arrangement ranging from the data discriminator 113 to D/A converter 108 of FIG. 53B is basically the same as that of FIG. 7B.

A recording circuit according to another embodiment of the present invention will be explained, referring to FIG. 54.

In this embodiment, the information signal to be recorded is added with a code specifying a recording circuit that should record it, the code being called the recording circuit specifying code. The recording circuits 3a and 3b each have the function of deciding the recording circuit specifying code. Although how the recording circuit specifying code is treated is determined depending on the number of circuits mounted on the drum, one simple way is such that the code is converted into 2-bit binary signals, which are then added to the recording information signal. As the number of circuits on the drum increases, the specifying code may be converted into more bits such as 3 bits or 4 bits, or into modulated form, which is then added to the information signal.

Figure 54:
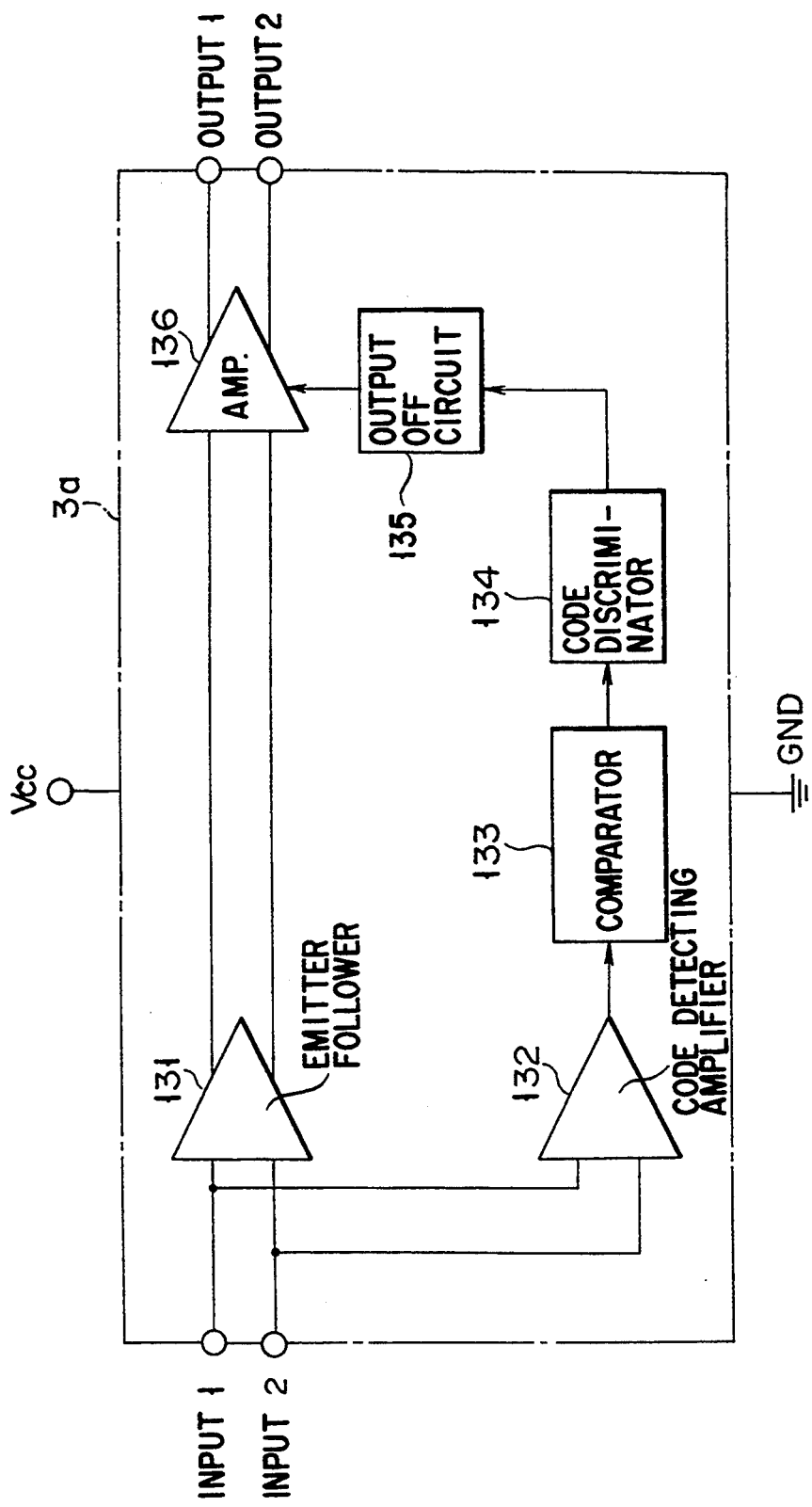
FIG. 54 is a block diagram of a recording circuit with a function for detecting a recording circuit specifying code.

The recording circuit 3b has the same configuration as that of the recording circuit 3a of FIG. 54. In FIG. 54, the recording RF signal transferred from the rotary transformer 6c is supplied to input 1 and input 2 of the recording circuit 3a. The input recording RF signal is divided into two: one is supplied to an emitter follower 131 for current-amplifying the recording RF signal, and the other is supplied to a code detecting amplifier 132. The code detecting amplifier 132 amplifies the recording RF signal so that the signal may have a specified amplitude, and supplies the amplified signal to a comparator 133 of the next stage. The comparator 33 converts the RF signal to a binary signal and supplies it to a code discriminator 134. The code discriminator 134, which stores a unique code allocated to the recording circuit 3a, compares this code with the recording circuit specifying code in the binarized RF signal from the comparator 133, and when the two codes agree with each other, supplies a high level signal as an arrangement signal to an output off circuit 135.

In this way, when the recording circuit 3a receives the recording RF signal added with the recording circuit specifying code equal to the unique code that the recording circuit 3a has, a code detecting circuit composed of the code detecting amplifier 132, comparator 133, and code discriminator 134 supplies a high level signal to the output off circuit 135. Conversely, when the recording circuit 3a receives the recording RF signal added with the recording circuit specifying code different from the unique code for the recording circuit 3a, the code detecting circuit supplies a low level signal to the output off circuit 135. The output of the output off circuit 135 is supplied as a control signal to an amplifier 136. The amplifier 136 further amplifies the recording RF signal current-amplified by the emitter follower 131, and supplies the amplified signal to output 1 and output 2.

Figure 55:
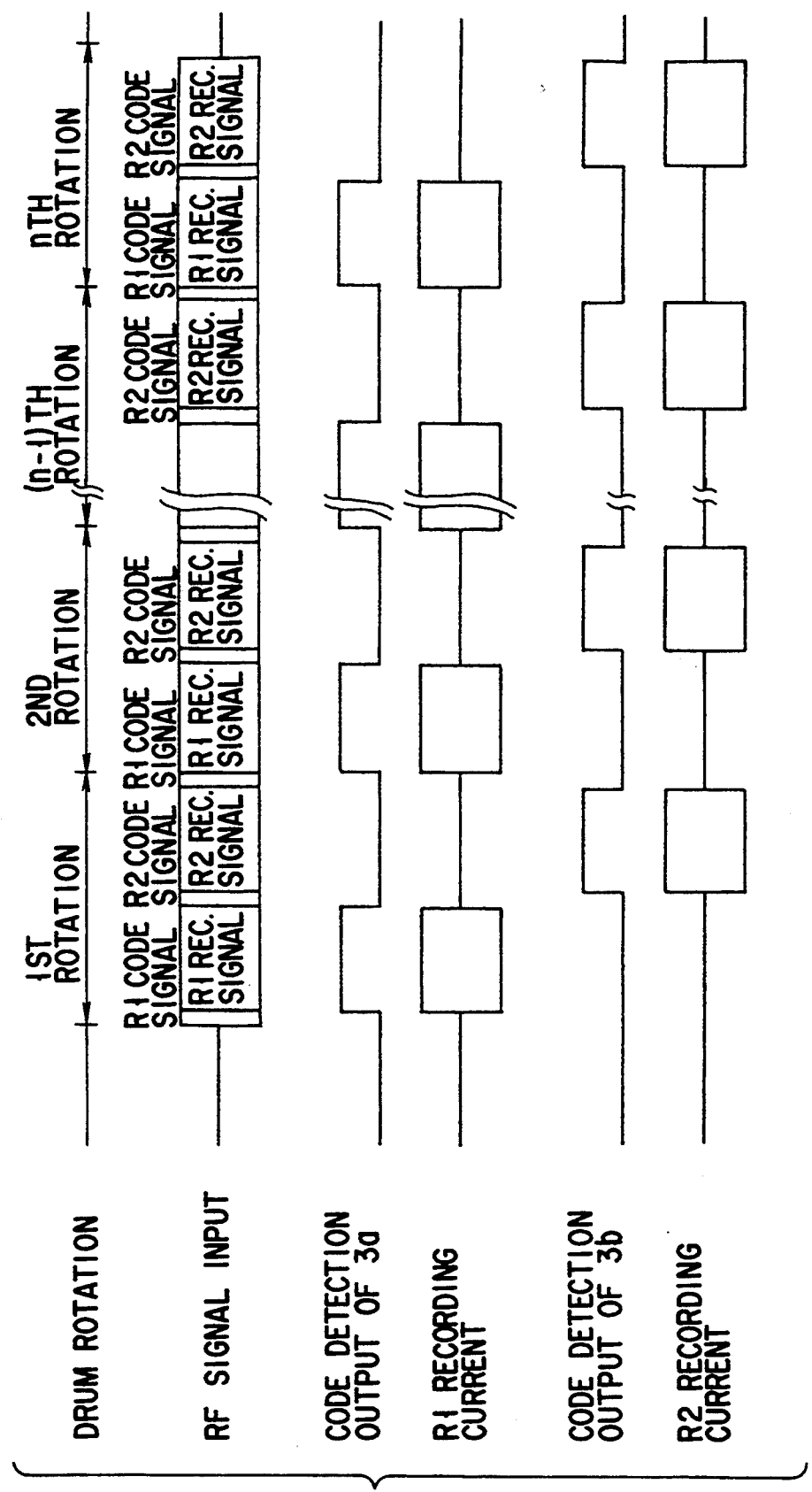
FIG. 55 is a time chart of the operation of the recording circuit of FIG. 54 during normal recording.

FIGS. 55 and 56 show the operation sequence of each circuit section inside and outside the recording circuit 3a of FIG. 54 during normal recording and insert recording. When the recording circuit 3a receives the recording RF signal added with the recording circuit specifying code equal to the unique code that the recording circuit 3a has, the code detecting circuit composed of the code detecting amplifier 132, comparator 133, and code discriminator 134 supplies a high level signal to the output off circuit 135. At this time, the output off circuit 135 brings the amplifier 136 of the output stage of the recording circuit 3a into the active state, which allows the recording current corresponding to the recording RF signal to be supplied to the magnetic head R1.

Conversely, when the recording circuit 3a receives the recording RF signal added with the recording circuit specifying code different from the unique code for the recording circuit 3a, the code detecting circuit made up of the code sensing amplifier 132, comparator 133, and code discriminator 134 supplies a low level signal to the output off circuit 135. Thus, as shown in FIG. 55, this permits the output off circuit 135 to make the amplifier 136 inactive, which prevents the recording RF signal from being supplied, with the result that the amplifier 136 does not supply the recording current to the magnetic head.

During insert recording, the recording information signal to undergo insert recording is added with the recording circuit specifying code. This recording information signal is transferred to the recording circuits 3a and 3b via the rotary transformer 6c equally connected to the recording circuits 3a and 3b, which permits the recording circuits 3a and 3b to supply the recording RF signal. Thus, as seen from the operation sequence of FIG. 56, the recording RF signal for which insert recording is wanted is added with the recording circuit specifying code, and the resulting RF signal is transferred to the recording circuits 3a and 3b, which enables the track to be rewritten partially.

As with the previous embodiment, with the present embodiment, the circuit configuration of the VRT's recording and reproduction systems can be made simpler and more compact. The arrangement of the amplifier section of each of the recording circuits 3a and 3b may be constructed as shown in FIG. 52.

FIG. 57 shows another arrangement of the recording circuit 3a with a recording circuit specifying code decision function. With this recording circuit, to prevent faulty operation of the code detecting circuit composed of the code sensing amplifier 132, comparator 133, and code discriminator 134, a carrier detecting circuit 137 for sensing whether or not the recording information signal is present is added to the recording circuit 3a. In this example, an AND gate 138 ANDs the output of the code discriminator 134 of the code detecting circuit with the output of the carrier detecting circuit 137. The output of AND gate 138 is used to control the output off circuit 135 in such a manner that only when both the specific code for the recording circuit 3a and the carrier are sensed, the amplifier 136 of the output stage of the recording circuit 3a is brought into the active state.

For another configuration, the code detecting circuit composed of the code detecting amplifier 132, comparator 133, and code discriminator 134 may be controlled directly by the output of the carrier detecting circuit 137 instead of using AND gate 138, in order to prevent faulty operation of the code sensing circuit.

While in the above embodiment, the recording circuit 3a has been added with the code detecting circuit, a similar code detecting circuit may be added to the erasure circuit. In this case, by supplying the erasure signal added with the erasure circuit specifying code to the erasure circuit with the erasure timing, it is unnecessary to use the LED row for control of the erasure circuit, which provides the same effect as with the recording circuit.

In the above embodiment, the recording circuit specifying code is added only to the beginning of the recording information signal. To simplify the configuration of the code discriminator and clarify the recording range of the recording information signal, however, the recording circuit specifying code may be added to the beginning and end of the recording information signal. To expand this idea, the recording circuit specifying code and the code indicating the beginning of the recording information signal may be added to the beginning of the recording information signal, and the code indicating the end of the recording information signal be added to the end of the recording information signal.

When the recording circuit specifying code and recording information signal are transferred from outside to inside the rotary drum, a rotary transformer is normally used as noted earlier. Since low-frequency transfer is difficult with the rotary drum, modulation or conversion into frequencies of high transfer efficiency before transmission is very effective from a view point of prevention of faulty signal transmission.

Further, with a system for reproducing both the recording circuit specifying code and recording information signal, for example, if the recording circuit specifying code were not reproduced during normal reproduction, since it might be considered that a failure had occurred in the circuit or magnetic head, it would be possible to report this situation to the system controller to inform the VTR operator of what happened on the display or the like for repair.

Next, the reproduction circuits 4a and 4b will be explained.

The reproduction circuits 4a and 4b has a carrier detecting function that senses whether or not the reproduction information signal (called the reproduction RF signal) reproduced by the reproduction heads P1 and P2 is present. FIG. 58 shows a practical example of a reproduction circuit with such a carrier detecting function. The construction of the reproduction circuit 4a is shown in the figure. The reproduction circuit 4b has the same construction as that of the reproduction circuit 4a.

In FIG. 58, the reproduction RF signal reproduced at the reproduction head P1 is supplied to input 1 and input 2. Since the input reproduction RF signal has a very small signal, it is first amplified by a low-noise, high-gain head amplifier 141 and then divided into two, one of which is supplied to a detector amplifier 142. The detector amplifier 142 amplifies the reproduction RF signal so that it may have a sufficient amplitude, and supplies the amplified signal to a peak detector 143 of the next stage. The peak detector 143 senses the peak of the input reproduction RF signal and produces a sense signal voltage corresponding to the peak sensed. The sense signal voltage from the peak detector 143 is supplied to a comparator 144, which supplies a high level signal to an output off circuit 145 of the next stage when the input sense signal voltage goes high.

In this way, when the reproduction circuit 4a receives the reproduction RF signal whose amplitude is larger than the specified level, an RF detector made up of the detector amplifier 142, peak detector 143, and comparator 144 supplies a high level signal to the output off circuit 145. Conversely, when the reproduction circuit 4a receives the reproduction RF signal whose amplitude is smaller than the specified level, the RF detector supplies a low level signal to the output off circuit 145. The output of the output off circuit 145 is supplied as a control signal to an amplifier 146. The amplifier 146 further amplifies the reproduction RF signal current-amplified by the head amplifier 141, and supplies the amplified signal to output 1 and output 2.

Figure 59:
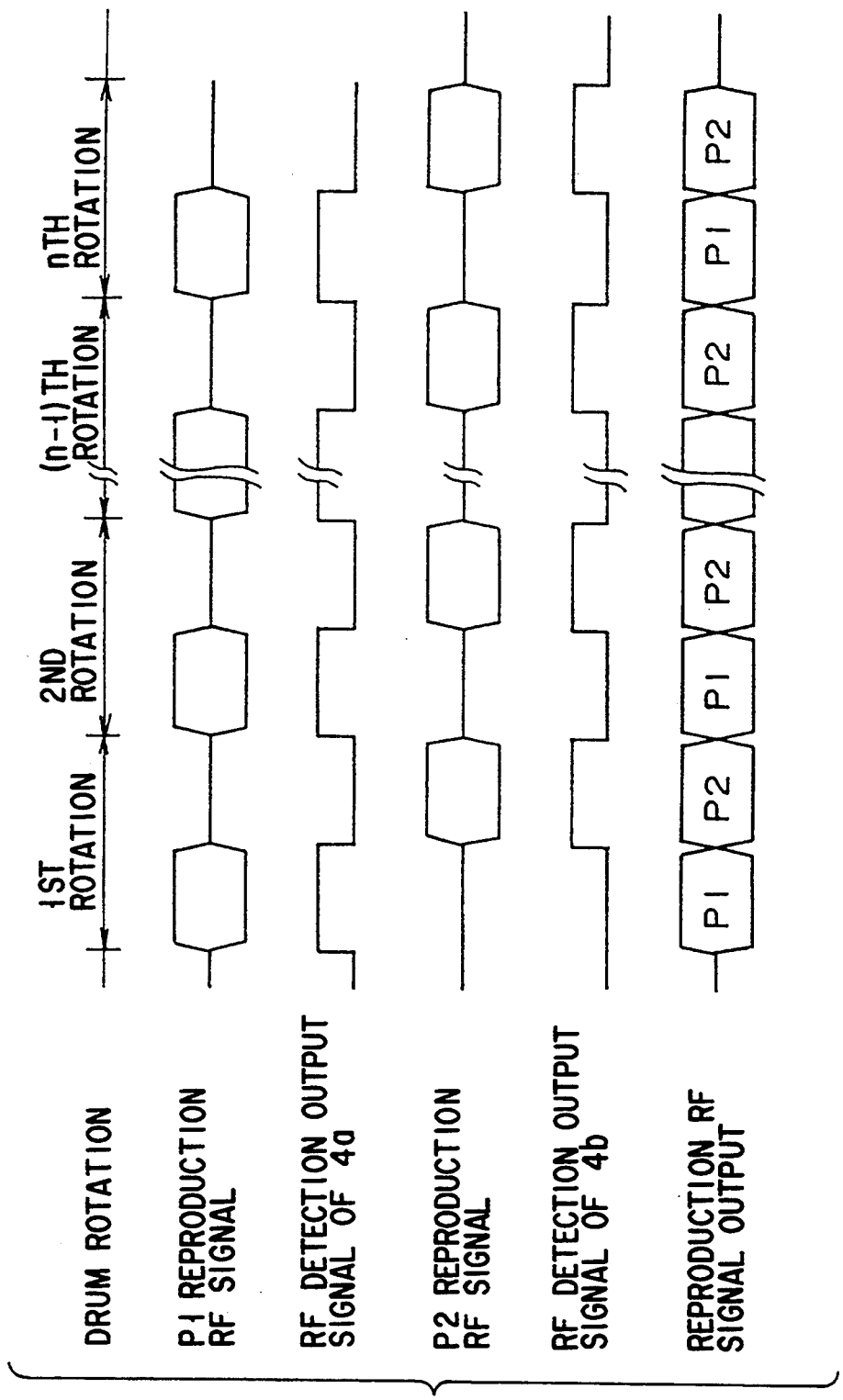
FIG. 59 is a time chart of the operation of the reproduction circuit of FIG. 58 during normal reproduction.

FIG. 59 shows the operation sequence of each circuit inside and outside the reproduction circuit 4a during normal reproduction in the present embodiment. When the output of the comparator 144 goes high, the output off circuit 145 turns on the amplifier 146, and consequently the reproduction circuit 4a is brought into the active state, thereby outputting the reproduction RF signal. The amplifier 146 drives the rotary transformer 6d to transfer the reproduction RF signal to outside the rotary drum. Conversely, when the output of the comparator 144 goes low, the output off circuit 145 makes the amplifier 146 of the reproduction circuit 4a inactive, which prevents the reproduction RF signal from being supplied to outside the rotary drum.

When fast-forward reproduction is carried out at the reproduction circuit 4a of FIG. 58, because the reproduction circuit 4a is provided with the RF detector made up of the amplifier 142, peak detector 143, and comparator 144, the reproduction circuit 4a does not supply a reproduction RF signal whose amplitude is lower than the specified level.

Generally, in the digital VTR, for example, when the signal-to-noise (SN) ratio of the reproduction RF signal drops below a specified value (20 dBp-p/rms), the value is said to be the practical limit of error correction-reference material: Introduction to Magnetic Recording Technology" by Katsuya Yokoyama), the error rate of digital signal becomes worse. For this reason, reproduction signals whose amplitude and SN ratio are lower than the respective specified values, are discarded before use. Therefore, when special reproduction such as fast-forward reproduction, fast-backward reproduction, slow reproduction, double speed reproduction, or reverse reproduction is performed, setting the sensing level of the RF detector to a level that provides a specified SN ratio eliminates a need to discard reproduction RF signals at a later stage, which makes a discarding circuit unnecessary.

Some systems, however, need reproduction RF signals whose SN ratio is lower than the specified value. For example, when the reproduction RF signal is used as reference data for another reproduction signal even if the error rate becomes worse, or when tape transport servo control during specific reproduction is done based on the envelope of the reproduction RF signal, all reproduction RF signals must be transferred to the reproduction signal processing circuit.

With this in mind, a reproduction circuit is provided which is designed, taking into account of special reproduction such as fast-forward reproduction, as shown in FIG. 60. The reproduction circuit 4a of FIG. 60 is such that the FIG. 58 RF detector is added with an input terminal of a specific reproduction selection signal that externally controls the output signal of the RF detector, and an OR gate 147 for masking the output signal of the RF detector with the specific reproduction selection signal supplied from this terminal.

Figure 61:
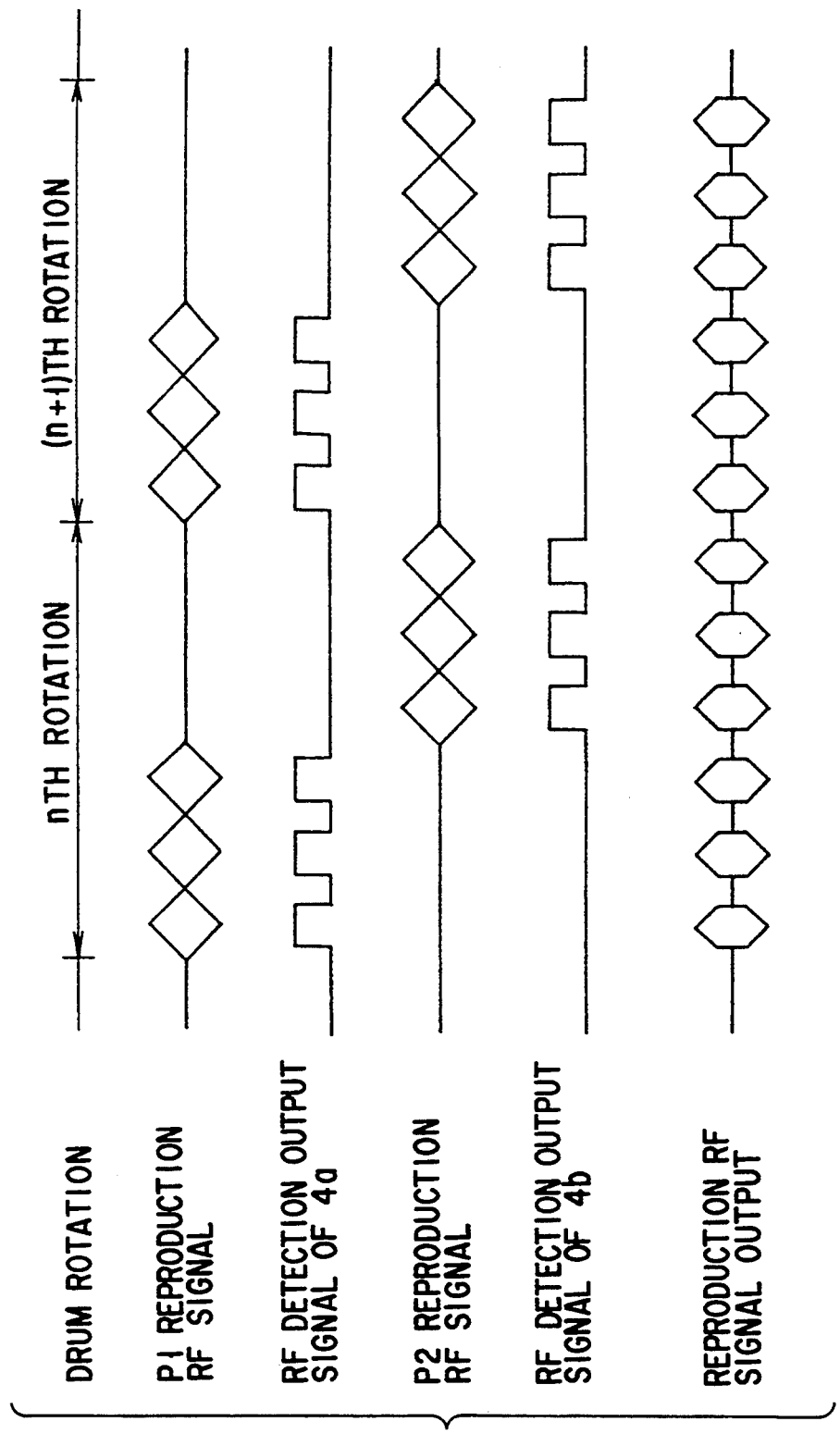
FIG. 61 is a time chart of the operation of the reproduction circuit of FIG. 58 during specific reproduction.
Figure 62:
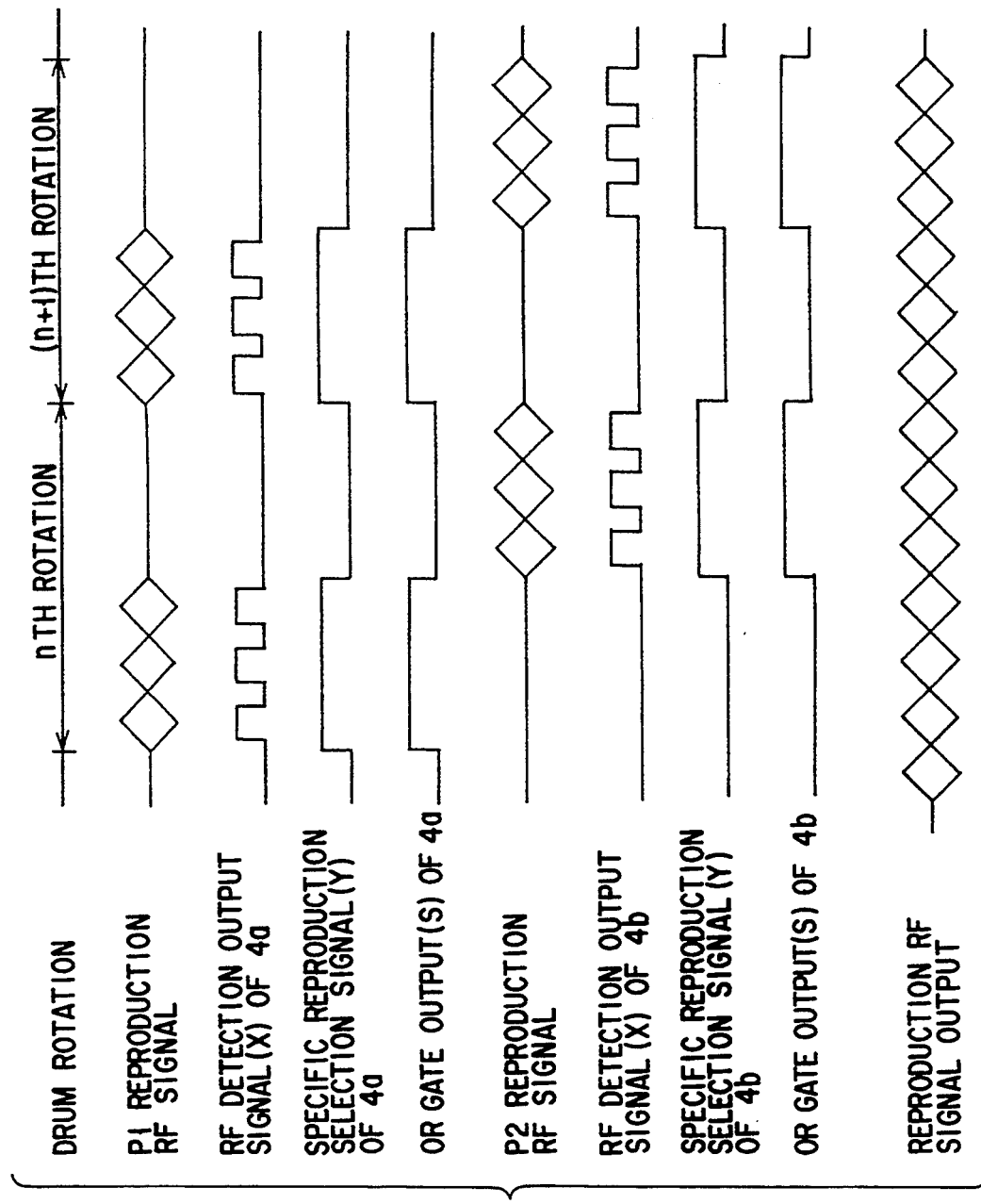
FIG. 62 is a time chart of the operation of the reproduction circuit of FIG. 60 during specific reproduction.

FIG. 61 shows the operation sequence of the FIG. 60 reproduction circuit during normal reproduction, and FIG. 62 illustrates the operation sequence of specific reproduction, that is, fast-forward reproduction of the VTR. The operation of the RF detector is the same as that of the RF detector of the FIG. 58 reproduction circuit.

In specific reproduction, the output signal of the comparator 144, or the sense signal of the RF detector is supplied as with the FIG. 58 embodiment. The sense signal (X), however, is masked by the OR gate 147 according to the specific reproduction selection signal input (Y), which prevents the signal from being transferred to the output off circuit 145. That is, during special reproduction, the reproduction RF signal is not supplied.

While in the embodiment of FIG. 60, the sense signal of the RF detector is masked by the OR gate 147, the specific reproduction selection signal input (Y) may be used to directly control the comparator 144, peak detector 143, or detector amplifier 142 for control of the amplifier 146 of the output stage of the reproduction circuit 4a via the output off circuit 145.

Although the specific reproduction selection signal (Y) must control the RF detector and selects the reproduction circuits 4a and 4b at intervals of 180°, this approach can be applied to the three systems including the one using LED rows explained referring to FIGS. 11A to 16B without modifying the system and circuits at all. The control signal may be transferred via the rotary transformer.

In general, part of the information signal reproduced from the magnetic tape by the magnetic head can drop out due to defects in the tape or a momentary increase in the space between the tape and head caused by dust. The effect of the dropout is more visible particularly during normal reproduction, which creates a serious problem. With the above-described embodiment of FIG. 58, the RF detector can sense the reproduction information signal when the dropout took place and prevent the reproduction circuit 4a from supplying the reproduction signal, as with specific reproduction. In this case, to prevent the output off circuit 145 from responding to a short-time dropout, for example, the output signal of the RF detector may be masked by a retriggerable multivibrator circuit.

Still another arrangement of the recording circuits 3a and 3b will be explained.

Figure 63:
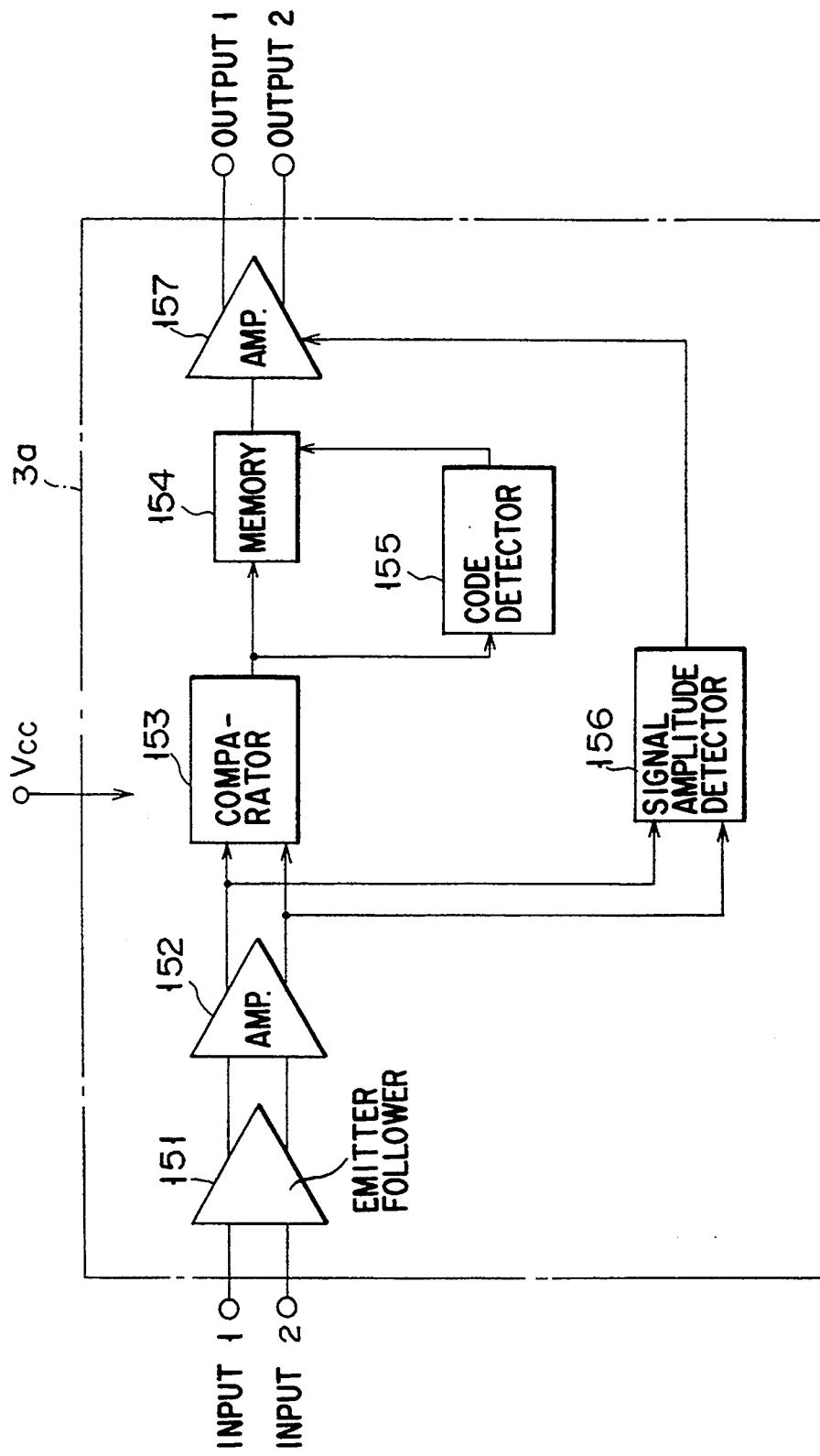
FIG. 63 is a block diagram illustrating an example of a construction of a recording circuit with a numerical code detecting function.

In the digital VTR, the recording information signal is generally added with various numerical codes unique to the recording format, that is, codes indicating the sync block number in the sync block, the track number in the sector ID, the segment number, the field number, and others. Thus, by detecting at least one of those numerical codes, deciding whether or not the sensed code agrees with the specific code allocated to each recording circuit, and using the decision result, the selection of the recording circuits 3a and 3b can be done between the active and inactive states. FIG. 63 is a block diagram showing the construction of a recording circuit with such a numerical code decision function. The figure illustrates the construction of the recording circuit 3a. The recording circuit 3b has the same construction as that of the recording circuit 3a.

In FIG. 63, the information signal to be recorded (the recording RF signal) transferred from the rotary transformer is supplied to input 1 and input 2 of the recording circuit 3a. The input recording RF signal is divided into two, one of which is supplied to an amplifier 152 via an emitter follower 151 for current-amplifying the recording RF signal. The recording RF signal amplified by the amplifier 152 so that it may has a specified amplitude is divided into two, one of which is supplied to a comparator 153. The comparator 153 convertes the input recording RF signal into a binary signal, and supplies the binary signal to a memory 154 for recording timing adjustment and a code detecting circuit 155. The other recording RF signal amplified by the amplifier 152 is supplied to a signal amplitude detecting circuit 156. The signal amplitude detecting circuit 156, which is composed of, for example, a peak detector, detects the amplitude of the input recording RF signal, and controls an amplifier 157 of the final stage so that it may have a gain corresponding to the signal amplitude detected. The amplifier 157 is made up of, for example, an ordinary AGC amplifier.

The code detecting circuit 155, which stores a specific code allocated to the recording circuit 3a, compares this code with the specified numerical code added to the binarized RF signal from the comparator 153, and when the two codes agree with each other, supplies an arrangement signal to the memory 154. The recording RF signal from the memory 154 is supplied to the recording head R1 via the final-stage amplifier 157 controlled by the signal amplitude detecting circuit 156 so that it may have a gain corresponding to the amplitude of the input signal.

In this way, when the recording circuit 3a receives the recording RF signal added with the numerical code equal to the specific code that the recording circuit 3a has, the code detecting circuit 155 reads the recording RF signal from the memory 154, which is in turn amplified by the amplifier 157 and then supplied to the recording head R1.

Conversely, when the recording circuit 3a receives the recording RF signal added with a code different from the specific code for the recording circuit 3a, the code detecting circuit 155 prevents the memory 154 from supplying the recording RF signal to the recording head R1.

Figure 65:
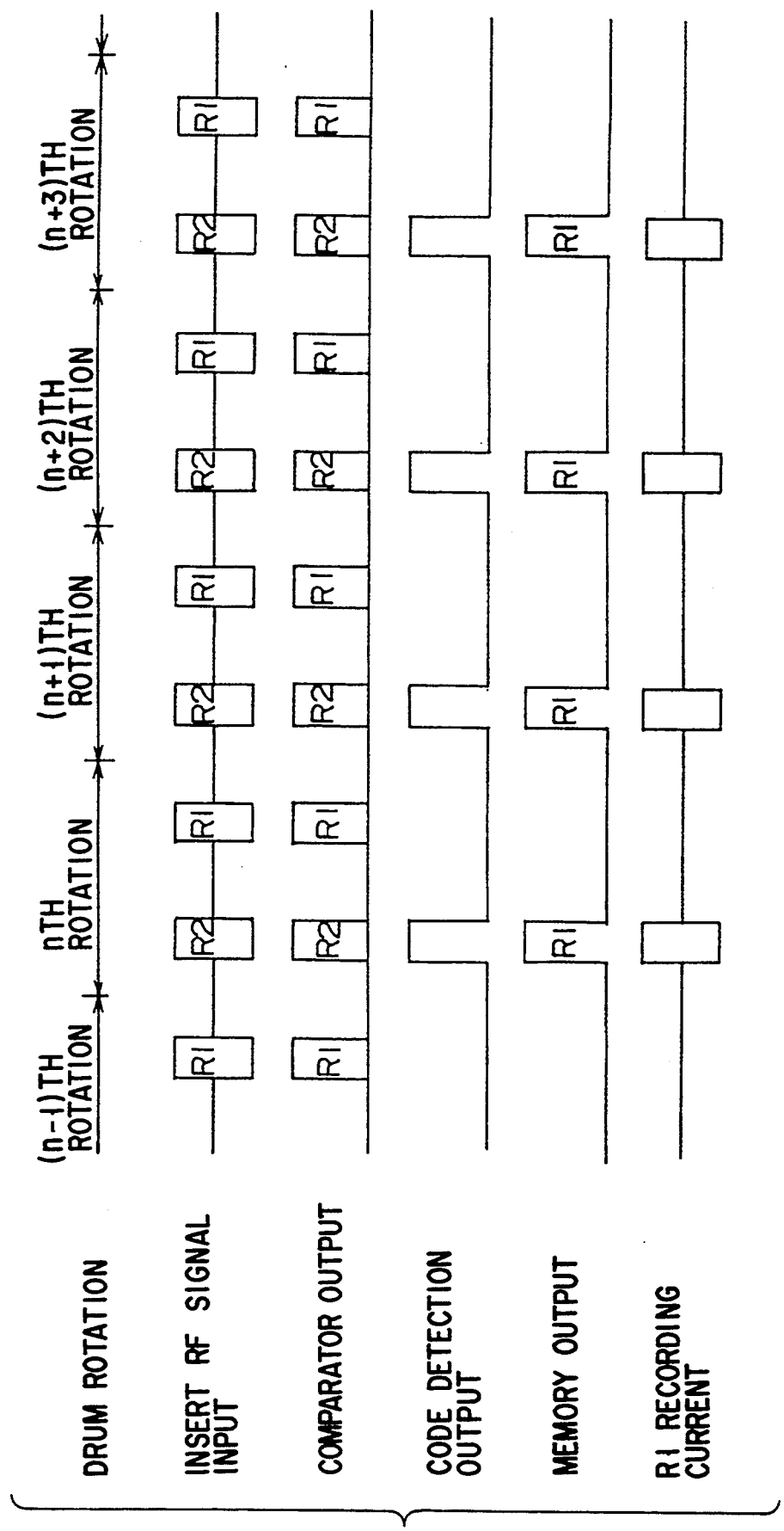
FIG. 65 is a time chart of the operation of the recording circuit of FIG. 63 during insert recording.

The operation sequence of each circuit inside and outside, the FIG. 63 recording circuit 3a during normal recording and insert recording is shown in FIGS. 64 and 65.

A code sensing system used at the code detecting circuit 155 of the FIG. 63 recording circuit 3a will be explained, using a practical digital VTR recording format.

Figure 68:
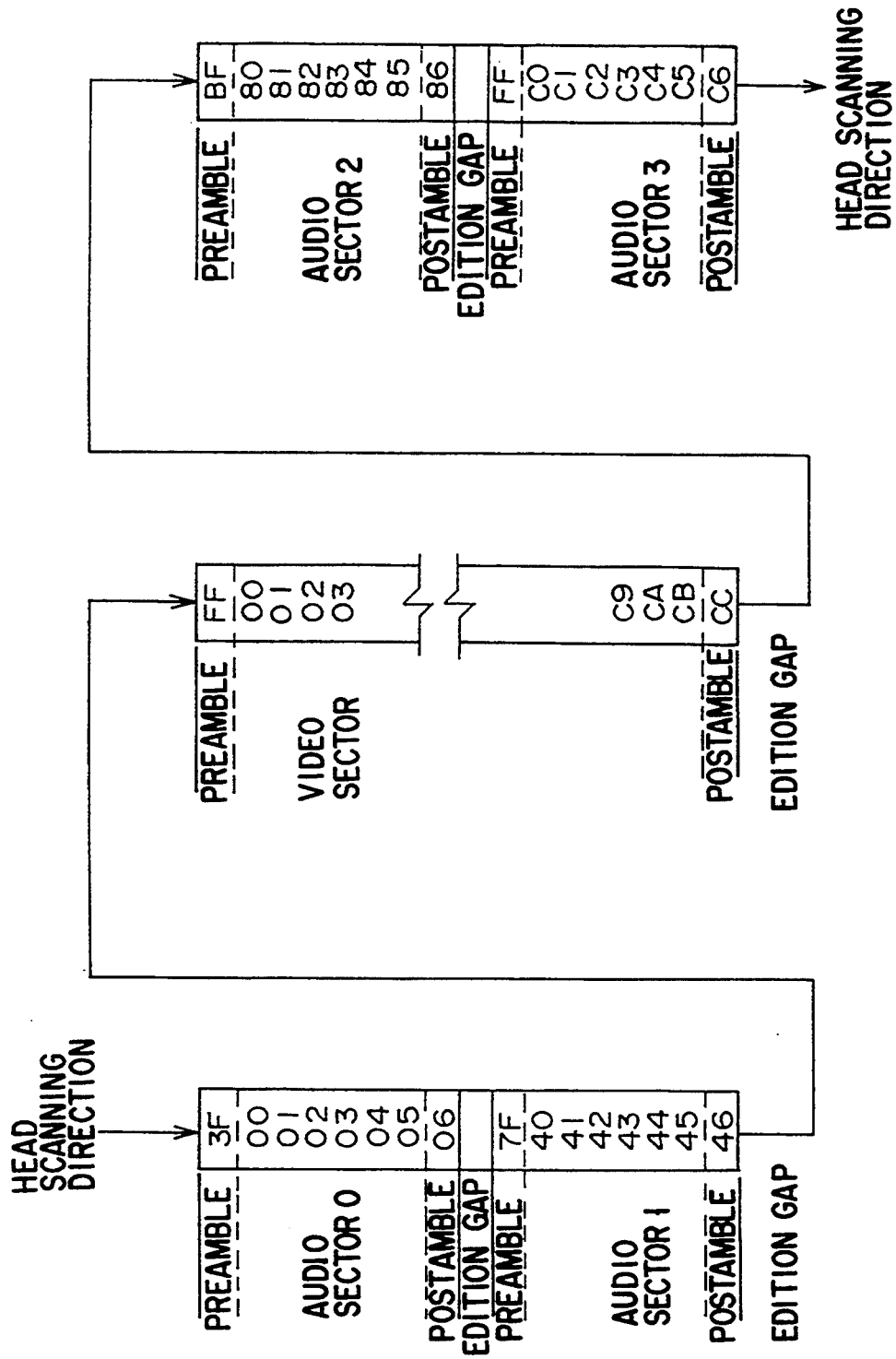
FIG. 68 is a diagram listing sync block ID numbers in D-2 format.
Figure 70:
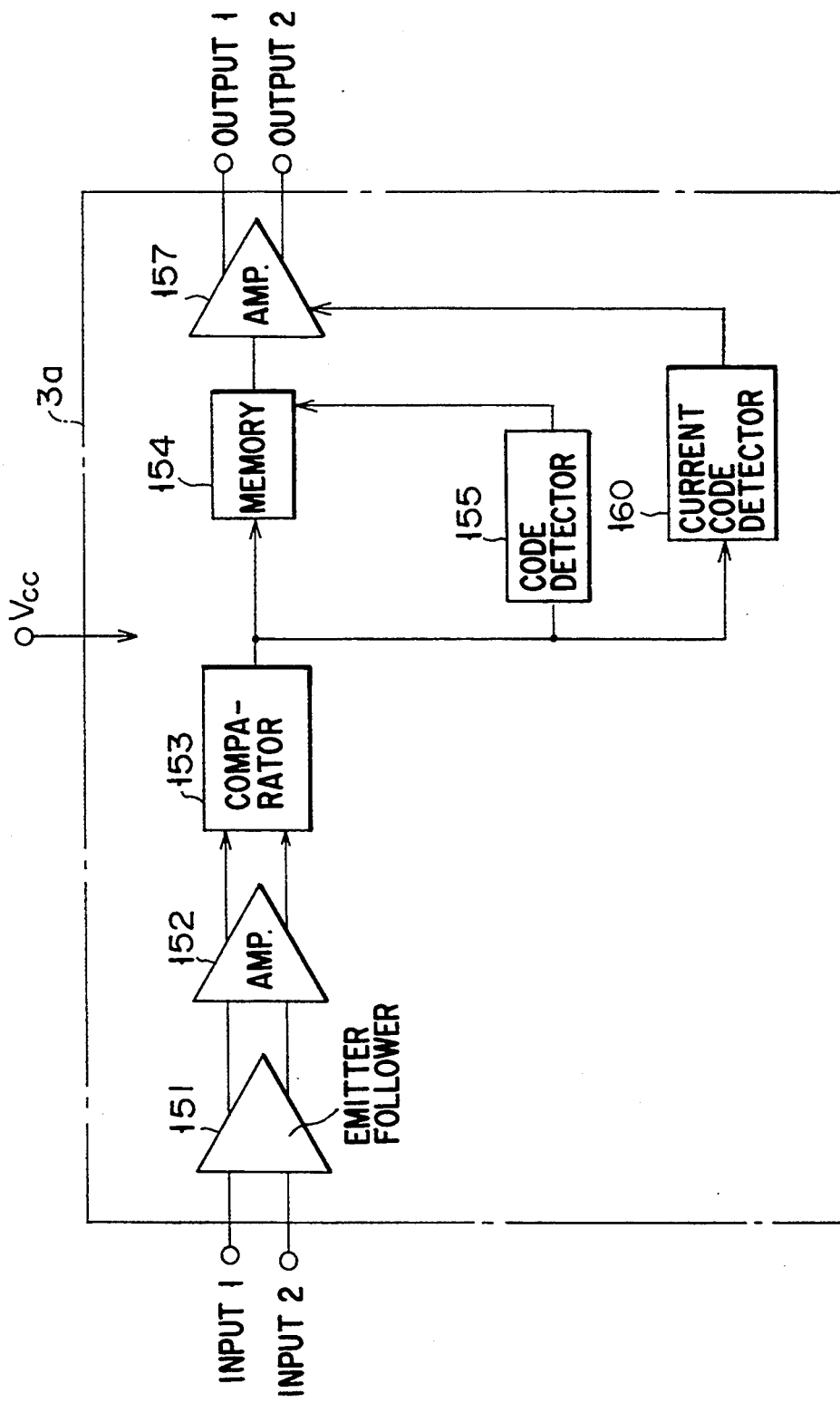
FIG. 70 is a block diagram illustrating another example of construction of a recording circuit with a numerical code detecting function.

FIGS. 66 to 68 are explanatory diagrams of a digital, signal recording format of NTSC composite signals:, such as D-2 format, quoted from the Journal of "Broadcasting Technology," November special issue, Vol. 43, No. 12, 1990. FIG. 66 is a diagram showing the data structure of a helical track, FIGS. 67A to 67C show the sync block ID format, and FIG. 68 is a diagram listing sync block ID numbers. As shown in FIGS. 68 to 70, after the video signal and audio signal have been converted into digital signals, those digital signals are added with the error correction code and various identification signals and then recorded onto the magnetic tape.

In the present embodiment, the numerical codes including the track number, the segment number, and the field number as shown in FIGS. 67A to 67C are sensed by the code detecting circuit 155 of FIG. 63, and the selection of the recording circuit 3a between the active and inactive states is done based on the decision signal indicating whether or not the sensed code agrees with a predetermined specific code. Since those numerical codes are in the signal to be recorded as shown in FIGS. 68 to 70, if the recording circuit 3a is made active for recording after those numerical codes have been detected, the recording timing is delayed, preventing proper recording. For this reason, in the present embodiment, a memory 154 for recording timing adjustment is built in the recording circuit 3a. Additionally, as shown in the operation sequence of FIGS. 64 and 65, the recording RF signal transferred via the rotary transformer is supplied to the recording circuit 3a, for example, a drum rotation angle of 180° earlier than the actual recording timing. This signal passes through the emitter follower 151, amplifier 152, and comparator 153, and is temporarily stored in the memory 154. After the code detecting circuit 155 has sensed the numerical code, the recording RF signal is read from the memory 154 with the recording timing of the recording head, and then recorded onto the recording medium via the amplifier 157.

As shown in FIG. 63, once the comparator 153 has converted the recording RF signal into a binary signal, it is difficult to control the recording current supplied from outside the rotary drum to the recording head. Thus, in FIG. 63, by changing the gain of the final-stage amplifier 157 corresponding to the amplitude of the recording RF signal from the signal amplitude detecting circuit 156, the recording current can be controlled from outside the rotary drum.

In the recording circuit 3a of FIG. 63, the comparator 153, amplifier 154, code detecting circuit 155, and signal amplitude detecting circuit 156 are added to a normal recording circuit. Since these circuits can be squeezed into an IC chip, however, it is easy to install the recording circuit 3a in the rotary drum.

While in FIG. 63, the output of the code detecting circuit 155 controls the output of the memory 154, which selects the recording circuit 3a between the active and inactive states, the output of the code detecting circuit 155 may be used to select the final-stage amplifier 157 between the active and inactive states. Specifically, with the timing that the recording RF signal is supplied from the memory 154 (the timing of supplying the recording current to the recording head), the amplifier 157 is made active, and at other times, it is placed in the inactive state. This enables the recording circuit to consume less power.

An embodiment constructed by modifying the FIG. 63 circuit will be explained, referring to FIG. 69.

While in the FIG. 63 embodiment, the memory 154 is used to adjust the recording timing related to the sensing at the code detecting circuit 155, the FIG. 69 embodiment employs a delay line 159 as an analog delay element.

In this case, the recording RF signal can undergo analog signal processing all the way from the input to the output of the recording circuit 3a. Specifically, in the present embodiment, the output of the amplifier 152 is divided into two: one is supplied to the delay line 159, and the other to the code detecting circuit 155 via the comparator 153 for binarization. The output signal from the code detecting circuit 155 is supplied as a control signal to the amplifier 157 via the output off circuit 158. This eliminates digital signal processing in the path of the recording RF signal, which permits the recording current to be controlled directly from outside the rotary drum, thereby making the signal amplitude detecting circuit 156 of FIG. 63 unnecessary.

Since the analog delay line is difficult to put in an IC package by the present technology, it has to be installed as a discrete part outside the IC chip. However, by using a charge transfer element such as a CCD (charge-coupled device) widely used as a semiconductor analog delay line for the FIG. 68 delay line 159, integration of the recording circuit becomes easier.

Another embodiment constructed by modifying the FIG. 63 circuit will be described, referring to FIGS. 70 and 71. In this embodiment, data (a current code) specifying the optimum recording current value to be flown through the recording head is inserted in the user bit in the recording RF signal. This data is sensed at the recording circuit 3a, and then used to control the recording current. To achieve this, instead of the signal detecting circuit 156 of FIG. 63, a current code detecting circuit 160 is connected between the comparator 153 and amplifier 157.

The user bit in the recording signal will be explained briefly.

FIG. 71 shows the data structure of the audio sector like FIGS. 66 to 68, the data structure is quoted from the Journal of "Broadcasting Technology," November special issue, Vol. 43, No. 12, 1990. In the area ranging from AUX to AUX3 in the figure, there is a user bit area into which the user can record data freely. In the present embodiment, the current code is put in this area.

Although the optimum value of the recording current varies with the gap depth of the magnetic head, the optimum value does not change during several hours or recording. Therefore, the current code can be inserted only in the beginning of the recording data for each recording, whereby the value of the current code is held in each recording to keep the recording current constant in that recording. This approach allows the current code to be inserted only in the beginning of the recording data, thereby enabling any other data to be placed in AUX0 to AUX3 user bits.

Another basic construction of the scanner of the present invention is shown in FIG. 72. A practical circuit of this basic construction is shown in FIG. 73. As with the FIG. 2, the magnetic tape 2 is wound around the peripheral surface of the rotary drum so that the effective area of the information signal may correspond to 180°. In this example, the recording circuit 3a and reproduction circuit 4a are connected equally to the rotary transformer 6c. Similarly, the recording circuit 3b and reproduction circuit 4b are connected equally to the rotary transformer 6d. The recording circuit 3a amplifies the recording RF signal from the rotary transformer 6c to drive the recording head R1.

In this example, the reproduction head P1 is arranged 180° apart from the recording head R1 so as to face each other. The recording RF signal is reproduced by the reproduction head P1 from the magnetic tape 2. After the reproduction circuit 4a has amplified the reproduced signal, the rotary transformer 6c connected to the output of the reproduction circuit transfers the amplified signal to outside the rotary drum.

On the other hand, the recording circuit 3b amplifies the recording RF signal form the rotary transformer 6d to drive the recording head R2. The reproduction head P2 is arranged 180° apart from the recording head R2 so as to face each other. The information signal reproduced by the reproduction head P2 is amplified by the reproduction circuit 4b. The rotary transformer 6d is used to transfer the RF signal to the recording circuit 3b. It is also used to transfer the RF signal from the reproduction circuit 4b to outside the rotary drum.

As shown in FIG. 73, the RF signal to be recorded onto the magnetic tape is amplified by the rotary transformer driving circuit 5a, and then transferred by the rotary transformer 6c to the internal circuit of the rotary drum. The recording circuit 3a amplifies the recording RF signal passing through the rotary transformer 6c. The R1 selection signal explained later selects: the recording circuit 3a alternately between the active and inactive states for every revolution of 180°. When the recording circuit 3a is in the active state, the recording head R1 is driven to record the RF signal onto the magnetic tape 2.

The reproduction of the RF signal from the magnetic tape 2 will be described.

The RF signal reproduced by the magnetic head P1 from the magnetic tape 2 is amplified by the reproduction circuit 4a. Then, the rotary transformer 6c to which the output of the reproduction circuit 4a and the input of the recording circuit 3a are connected is driven to transfer the reproduction RF signal to outside the rotary drum. The P1 selection signal explained later selects the reproduction circuit 4a alternately between the active and inactive states for every revolution of 180°. When the reproduction circuit 4a is in the active state, the RF signal reproduced by the reproduction head P1 is transferred from the rotary transformer 6c to outside the rotary drum. The reproduction. RF signal from the rotary transformer 6c is supplied to the rotary transformer receiving circuit 7a, which further transfers it to a circuit of a subsequent stage. Similarly, the route made up of the rotary transformer driving circuit 5b, rotary transformer 6d, recording circuit 3b, reproduction circuit 4b, and rotary transformer receiving circuit 7b operate the same manner as described above.

The output circuits of the reproduction circuits 4a and 4b and the rotary transformer receiving circuits 7a and 7b may be constructed in the same manner as with FIG. 5. For the selection circuits of the rotary transformer receiving circuits 7a and 7b, a selection system similar to the rotary drum internal circuit (not shown) may be used. The selection signal may be produced by an FG (frequency generator) for controlling the rotation of the drum, a rotary encoder, or the like, to perform the selection according to the selection signal.

Figure 74:
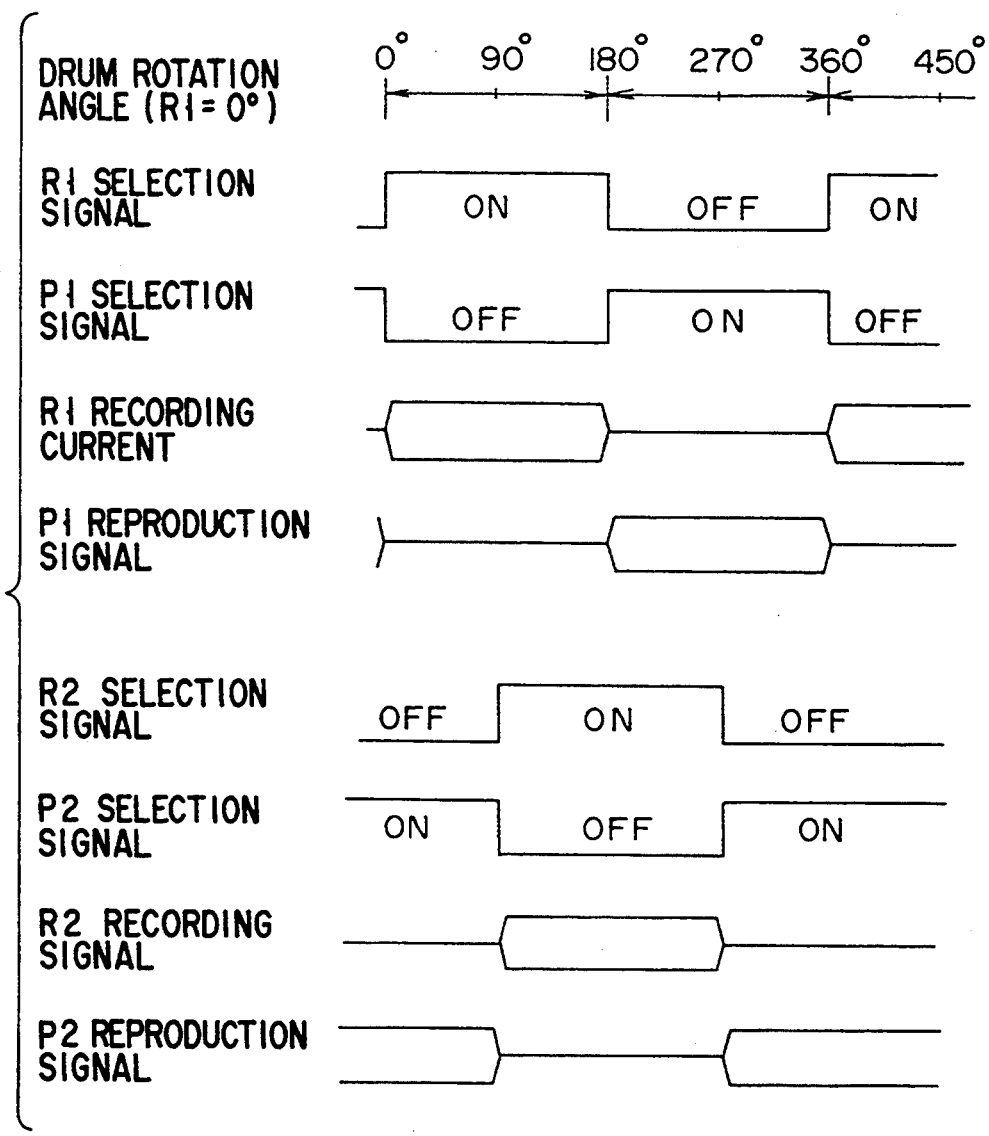
FIG. 74 is a diagram showing the time sequence of the selection operation of the recording and reproduction circuits in FIG. 73.

FIG. 74 shows the time sequence of the selection operation of the recording and reproduction circuits in the present embodiment. The time sequence of the selection operation of the recording circuit including the RF detector circuit is the same as that of the above-described circuit. In this case, based on the output of the reproduction circuit, the RF signal sensed by the RF detector of the recording circuit is supplied. Because the 180° selection signal is low, however, the recording circuit is inoperative.

While in the above-mentioned embodiments, the invention has been applied to a rotary drum-type VTR, it may be applicable to VTRs using other magnetic head mounting systems such as the disk type or the internal drum type.

while in the above-described embodiments, the one-channel rotary transformer and two channels of recording circuits or reproduction circuits are selected, the present invention may be applied to a case where more channels of the recording circuits or reproduction circuits or recording/reproduction circuits are selected. For instance, when eight channels of recording heads and recording circuits and eight channels of reproduction heads and reproduction circuits are used with an effective recording area angle (effective wrap angle) of 180°, the number of rotary transformers needed is Just eight.

while in the aforementioned embodiments, LED rows are used in the control method of the on-the-drum circuit, the recording circuits, reproduction circuits, and erasure circuits installed on the rotary drum may be controlled in other ways. The three control methods of the on-the-drum circuits shown in FIGS. 11A to 16B may be accomplished by separate circuits of different control methods. For instance, the recording circuits and erasure circuits may employ the LED row-based control method, and the reproduction circuits may use the photoreflector-based method.

For the erasure circuit, it is possible to use a control method of selecting between the active and inactive states as with the recording circuit. During insert editing, the erasure circuit operates whenever the recording circuit operates. Thus, if the tape format permits, for example, in controlling the erasure circuit, the recording LED row can be used as the erasure LED row as well. In this case, a full erase head is generally used in normal recording. Since the above RF detector will not operate unless the erasure RF signal is transferred to the erasure circuit in the rotary drum, the erasure circuit will never be made active.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rotary scanning-type magnetic tape apparatus for performing at least one of recording and reproduction operations, comprising:
   a rotary drum having a peripheral surface around which a magnetic tape is wound;
   a plurality of magnetic heads installed on said rotary drum, and arranged around said peripheral surface, said magnetic heads coming into contact with the magnetic tape which is wound around the peripheral surface of said rotary drum and runs thereon, for performing at least one of recording of an RF signal onto the magnetic tape and reproducing of a recorded RF signal from the magnetic tape;
   a plurality of recording circuits connected to at least some of said magnetic heads, respectively, for processing the RF signal which is to be recorded onto said magnetic tape and which is transferred from outside said rotary drum, and supplying the RF signal to said magnetic heads;
   a rotary transformer for transferring the RF signal from outside said rotary drum to said recording circuits, said rotary transformer including terminal means connected to at least two of said recording circuits for each head;
   first control means sensing a rotational position of said rotary drum for selecting said recording circuits;
   second control means provided in said recording circuits, for sensing the RF signal supplied to the recording circuits; and
   means for bringing, in combination with said first and second control means, one of said recording circuits into an active state, in order to record the RF signal onto said magnetic tape.

2. An apparatus according to claim 1, wherein said rotary transformer includes a rotary member mounted on said rotary drum and a stationary member, said rotary and stationary members each having at least one core with a circular slot, at least one primary coil being inserted in the circular slot of the core of said stationary member, at least first and second secondary coils being inserted in the circular slot of the core of said rotary member, said first secondary coil being coupled directly to an input terminal of a corresponding one of said recording circuits, said second secondary coil being coupled directly to an input terminal of a corresponding another of said recording circuits, and said first and second secondary coils being wound around an axis of rotation of said rotary drum.

3. An apparatus according to claim 1, wherein said magnetic tape is wounded around the peripheral surface at an effective wrap angle smaller than a total wrap angle and not more than 180°, said effective wrap angle being an angle which covers an effective area of the magnetic tape on which an RF signal can be recorded or reproduced, and said total wrap angle being an angle at which the magnetic tape is wound around said rotary drum.

4. An apparatus according to claim 1, which includes third control means for performing logical multiplication on outputs of said first control means and said second control means, to output a resultant signal to said recording circuits.

5. An apparatus according to claim 1, wherein said second control means contains peak detecting means for detecting the peak level of the RF signal, and means for selectively bringing said recording circuits into an active state or an inactive state according to the peak level.

6. An apparatus according to claim 1, wherein each of said recording circuits contains an input stage made up of an emitter follower circuit for current-amplifying the RF signal, and a differential amplifier for amplifying the RF signal from the input stage, and supplying the recording current to said magnetic heads.

7. A rotary scanning-type magnetic tape apparatus for performing at least one of recording and reproduction operations, comprising:
   a rotary drum having a peripheral surface around which a magnetic tape is wound;
   a plurality of magnetic heads installed on said rotary drum, and arranged around said peripheral surface, said magnetic heads coming into contact with the magnetic tape which is wound around the peripheral surface of said rotary drum and runs thereon, for performing at least one of recording of an RF signal onto the magnetic tape and reproducing of a recorded RF signal from the magnetic tape;
a plurality of reproduction circuits for amplifying the RF signal reproduced from said magnetic tape by said magnetic heads;
control means provided in said reproduction circuits, and including RF detecting means for detecting the reproduced RF signal from said reproduction circuits and means for sequentially bringing said reproduction circuits into an active state only during a period of time when said RF signal is detected by said RF detecting means, whereby an active one of said reproduction circuits has low output impedance, whereas an inactive another of said reproduction circuits has high output impedance; and
a rotary transformer for transferring the reproduced RF signal from said reproduction circuits to outside the rotary drum, said rotary transformer including terminals means connected to at least two of said reproducing circuits for each head.

8. An apparatus according to claim 7, wherein said transformer includes a rotary member mounted on said rotary drum and a stationary member, said rotary and stationary members each having at least one core with a circular slot, and at least first and second primary coils being inserted in the slot of the core of said rotary member, at least one secondary coil being inserted in the slot of the core of said stationary member, said first primary coil being coupled directly to an output terminal of a corresponding one of said reproduction circuits, said second primary coil being coupled directly to an output terminal of a corresponding another of said reproduction circuits, and said first and second primary coils being wound around an axis of rotation Of said rotary drum.

9. An apparatus according to claim 7, wherein said magnetic tape is wounded around the peripheral surface at an effective wrap angle smaller than a total wrap angle and not more than 180°, said effective wrap angle being an angle which covers an effective area of the magnetic tape on which an RF signal can be recorded or reproduced, and said total wrap angle being an angle at which the magnetic tape is wound around said rotary drum.

10. An apparatus according to claim 7, wherein each of said reproduction circuits contains peak detecting means for detecting the peak level of said reproduced RF signal, and means for selectively bringing said reproduction circuits into an active state or an inactive state according to the peak level.

11. A rotary scanning-type magnetic tape apparatus for performing at least one of recording and reproduction operations, comprising:
a rotary drum having a peripheral surface around which a magnetic tape is wound:
a plurality of magnetic heads installed on said rotary drum, and arranged around said peripheral surface, said magnetic heads coming into contact with the magnetic tape which is wound around the peripheral surface of said rotary drum and runs thereon, for performing at least one of recording of an RF signal onto the magnetic tape and reproducing of a recorded RF signal from the magnetic tape;
a plurality of reproduction circuits for amplifying the RF signal reproduced from said magnetic tape by said magnetic heads;
control means provided in said reproduction circuits, and including RF detecting means for detecting the reproduced RF signal from said reproduction circuits and means for sequentially bringing said reproduction circuits into an active state only during a period of time when said RF signal is detected by said RF detecting means, whereby an active one of said reproduction circuits has low output impedance, whereas an inactive another of said reproduction circuits has high output impedance; and
a rotary transformer for transferring the reproduced RF signal from said reproduction circuits to outside the rotary drum, said rotary transformer including terminals means connected to at least two of said reproducing circuits for each head, and
wherein each of said reproduction circuits contains means for preventing an output of the reproduced RF signal whose amplitude is lower than a specified level in a normal reproduction mode, and means for, in response to a mode control signal, and not preventing the output of the reproduced RF signal to outside said rotary drum in at least one of specific modes including fast-forward, fast-backward, slow-reproduction, double-speed reproduction, and reverse-reproduction modes.

12. A rotary scanning-type magnetic tape apparatus for performing at least one of recording and reproduction operations, comprising:
a rotary drum having a peripheral surface around which a magnetic tape is wound;
a plurality of magnetic heads installed on said rotary drum, and arranged around said peripheral surface, said magnetic heads coming into contact with the magnetic tape which is wound around the peripheral surface of said rotary drum and runs thereon, for performing at least one of recording of an RF signal onto the magnetic tape and reproducing of a recorded RF signal from the magnetic tape;
a plurality of recording circuits connected to at least some of said magnetic heads, respectively, for processing the RF signal which is to be recorded onto said magnetic tape and which is transferred from outside said rotary drum, and supplying a resultant RF signal to said magnetic heads;
a rotary transformer for transferring the resultant RF signal to said recording circuits, the resultant RF signal having a specifying code sequentially that specifies each of said recording circuits;
control means for detecting the specifying code from the resultant RF signal supplied via said rotary transformer to said recording circuits, and bringing one of said recording circuits, which corresponds to the specifying code, into an active state, and the other recording circuits into an inactive state.

13. An apparatus according to claim 12, wherein the specifying code which is not recorded on said magnetic tape is a code additionally appendant to the lead of an RF signal, the trade of an RF signal or both sides of an RF signal, sequentially.

14. An apparatus according to claim 12, wherein the specifying code is a code contained sequentially into the resultant RF signal.

15. A rotary scanning-type magnetic tape apparatus for performing selectively recording and reproduction operations, comprising:

a rotary drum having a peripheral surface around which a magnetic tape is wound;

a plurality of magnetic heads installed on said rotary drum, and arranged around said peripheral surface, said magnetic heads coming into contact with the magnetic tape which is wound around the peripheral surface of said rotary drum and runs thereon, for performing at least one of recording of an RF signal from the magnetic tape;

a plurality of recording circuits connected to at least some of said magnetic heads, respectively, for processing the RF signal which is to be recorded onto said magnetic tape and which is transferred from outside said rotary drum, and supplying the RF signal to said magnetic heads;

a first rotary transformer for transferring the RF signal from outside said rotary drum to said recording circuits, said first rotary transformer including terminals means connected to at least two of said recording circuits for each head;

first control means sensing a rotational position of said rotary drum for selecting said recording circuits;

second control means provided in said recording circuits, for sensing the RF signal supplied to the recording circuits;

means for bringing, in combination with said first and second control means, one of said recording circuits into an active state, in order to record the RF signal onto said magnetic tape;

a plurality of reproduction circuits for amplifying the RF signal reproduced from said magnetic tape by said magnetic heads;

third control means provided in said reproduction circuits, and including RF detecting means for detecting the reproduced RF signal from said reproduction circuits and means for sequentially bringing said reproduction circuits into an active state only during a period of time when said RF signal is detected by said RF detecting means, whereby an active one of said reproduction circuits has low output impedance, whereas an inactive another of said reproduction circuits has high output impedance; and a second rotary transformer for transferring the reproduced RF signal from said reproduction circuits to outside the rotary drum, said second rotary transformer including terminal means connected to at least two of said reproducing circuits for each head.

* * * * *